April 28, 1959 F. P. MAITINO 2,883,815
AUTOMATIC BATTERY MAKING MACHINE
Filed June 25, 1956 48 Sheets-Sheet 1

INVENTOR.
FRED P. MAITINO
BY Bosworth, Sessions,
Herretron & Lawler
ATTORNEYS.

INVENTOR.
FRED P. MAITINO
BY
ATTORNEYS.

April 28, 1959 — F. P. MAITINO — 2,883,815
AUTOMATIC BATTERY MAKING MACHINE
Filed June 25, 1956 — 48 Sheets-Sheet 4
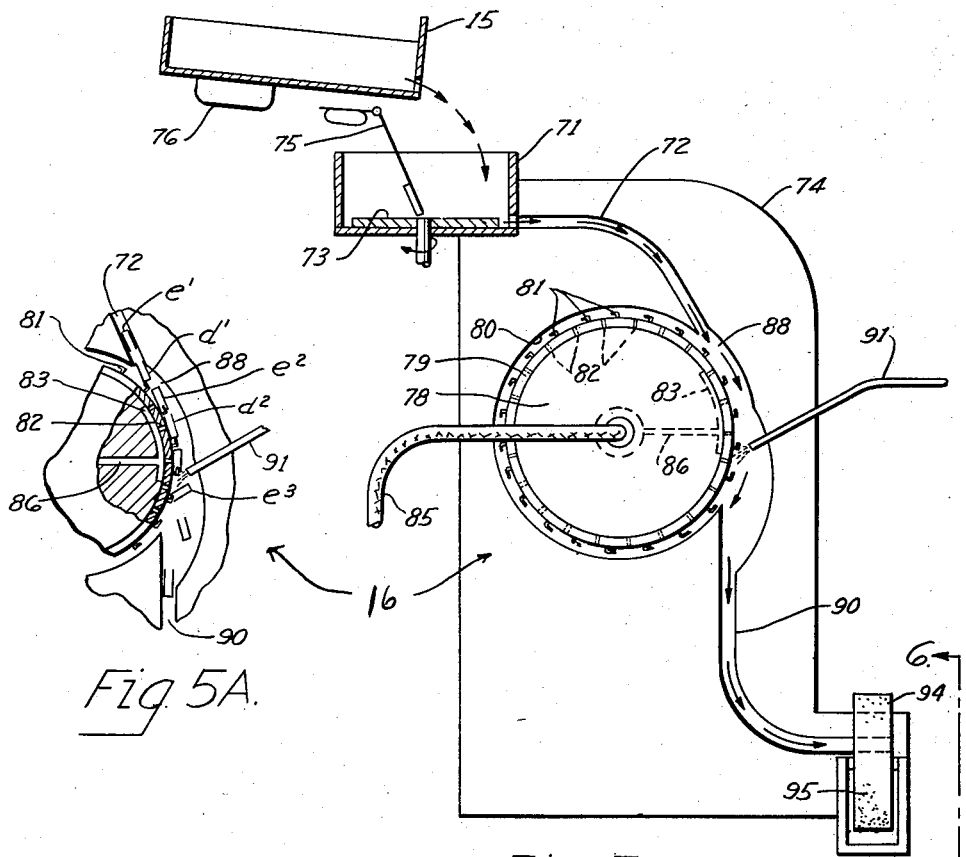
Fig. 5A.
Fig. 5.
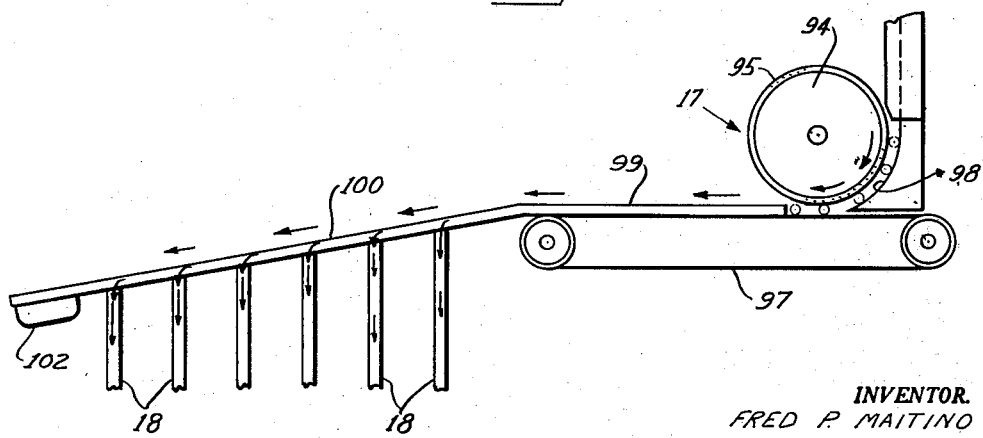
Fig. 6.
INVENTOR.
FRED P. MAITINO
BY Bosworth, Sessions
Hernstrom & Lawler
ATTORNEYS.

April 28, 1959

F. P. MAITINO 2,883,815

AUTOMATIC BATTERY MAKING MACHINE

Filed June 25, 1956

INVENTOR.
FRED P. MAITINO

BY Bosworth, Sessions,
Herrstrom & Lawler
ATTORNEYS.

April 28, 1959 F. P. MAITINO 2,883,815
AUTOMATIC BATTERY MAKING MACHINE
Filed June 25, 1956 48 Sheets-Sheet 7
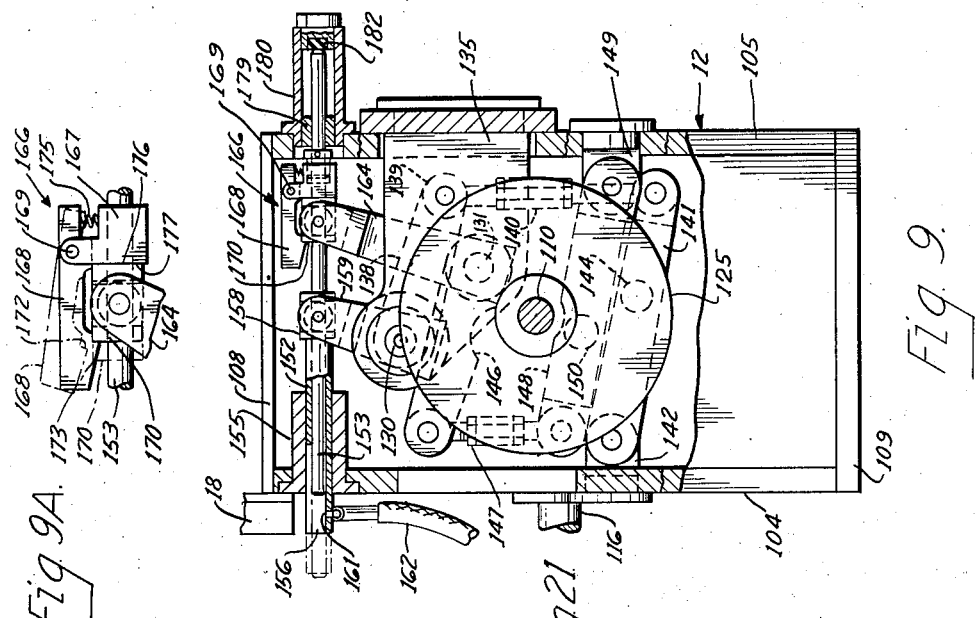
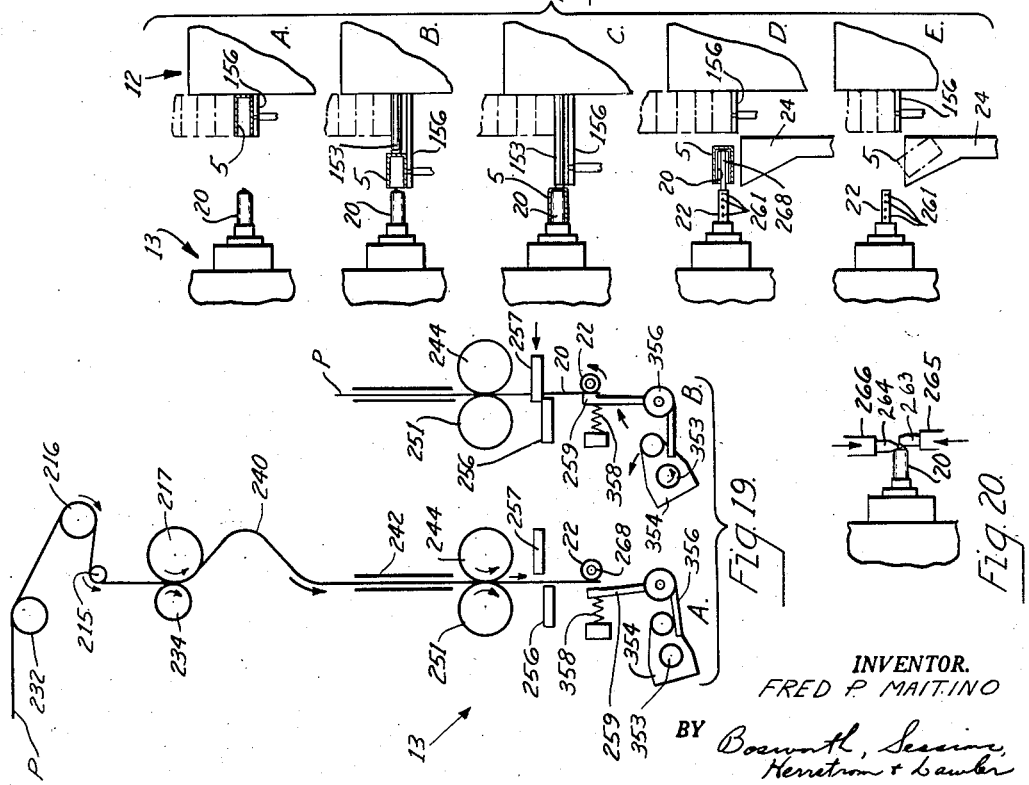
INVENTOR.
FRED P. MAITINO
BY Bosworth, Sessions,
Herrstrom & Lawler
ATTORNEYS.

April 28, 1959          F. P. MAITINO          2,883,815
AUTOMATIC BATTERY MAKING MACHINE
Filed June 25, 1956          48 Sheets-Sheet 8
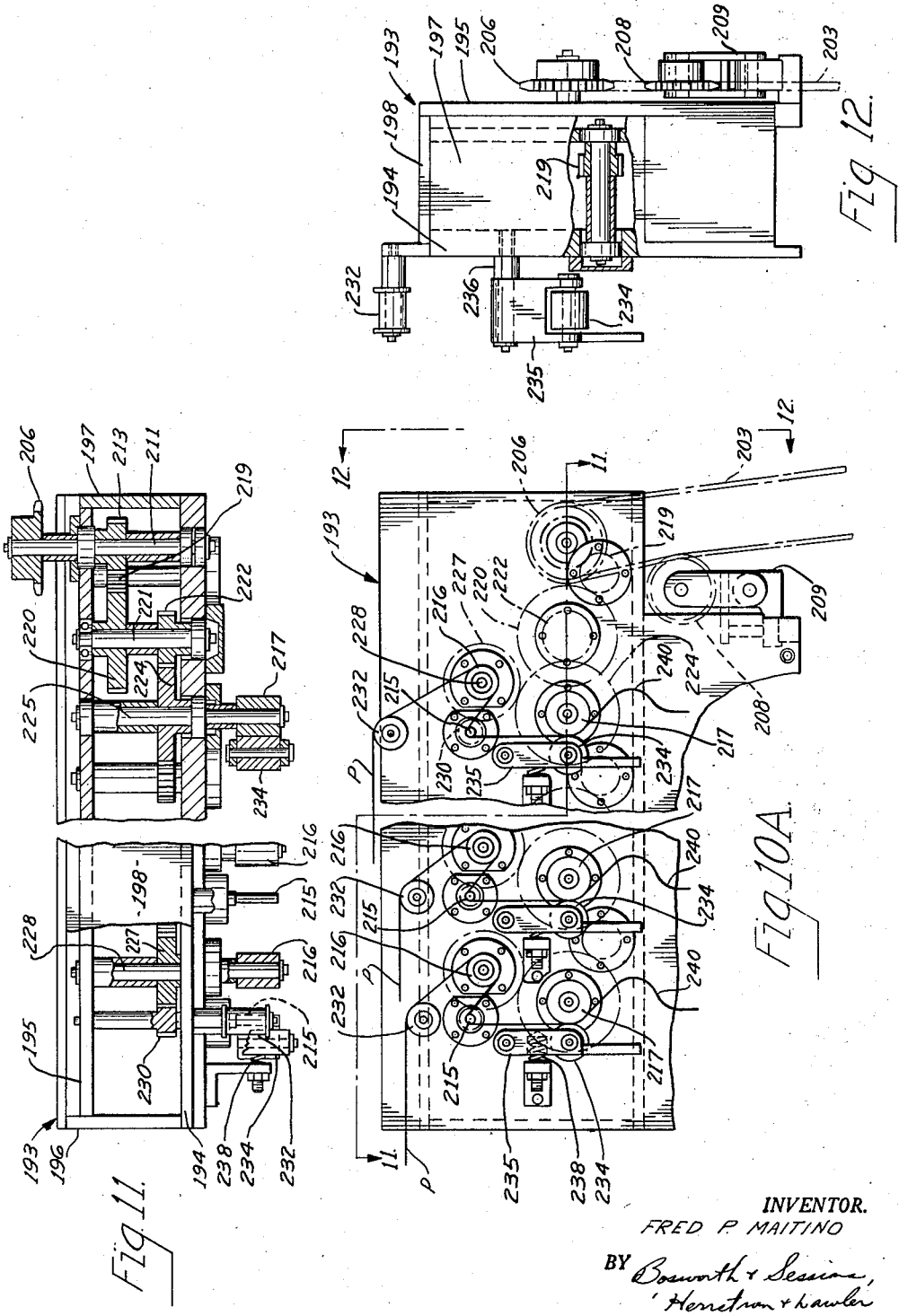
INVENTOR.
FRED P. MAITINO
BY Bosworth + Sessions,
Herestron + Lawler
ATTORNEYS.

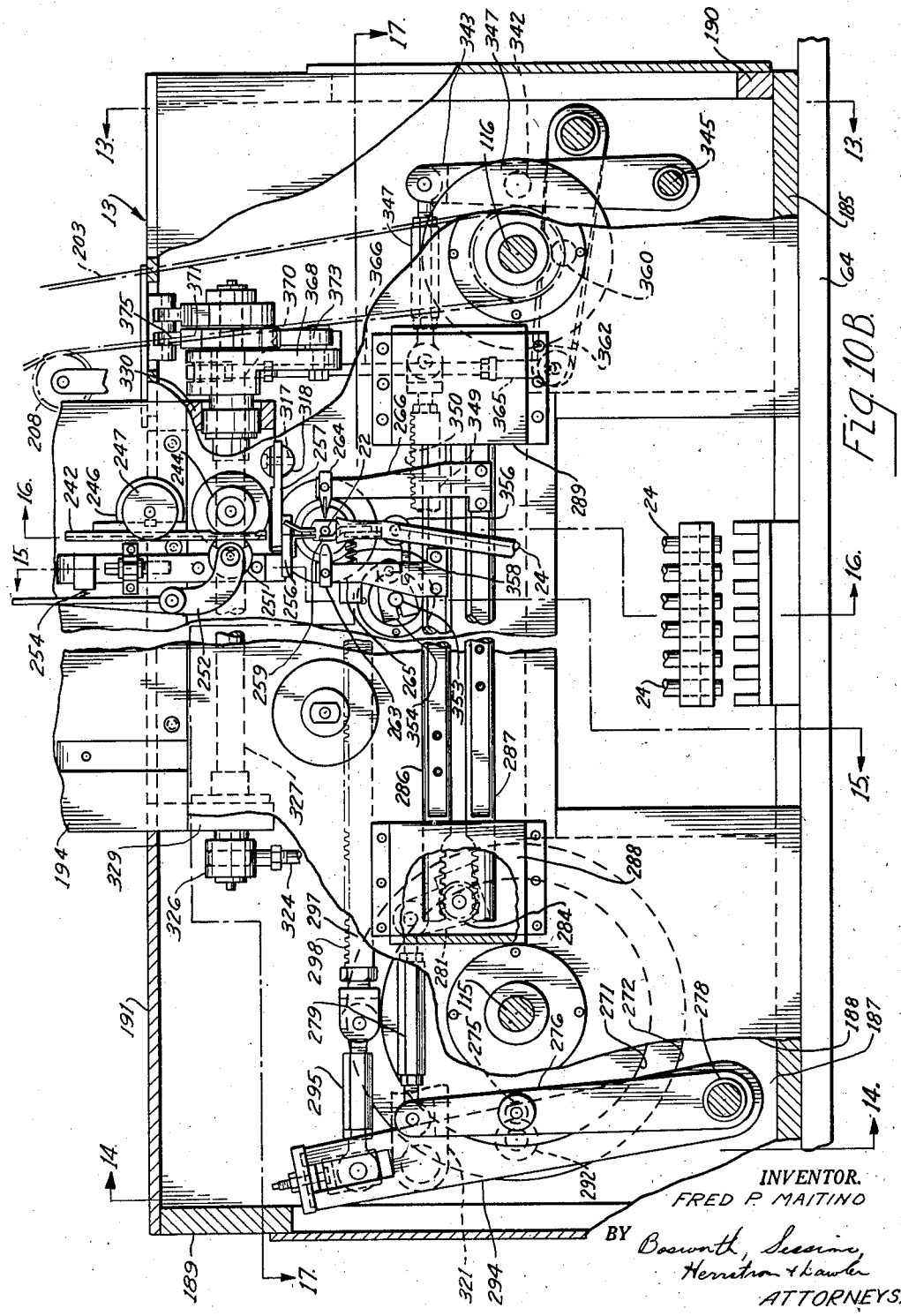

April 28, 1959
F. P. MAITINO
2,883,815
AUTOMATIC BATTERY MAKING MACHINE
Filed June 25, 1956
48 Sheets-Sheet 10
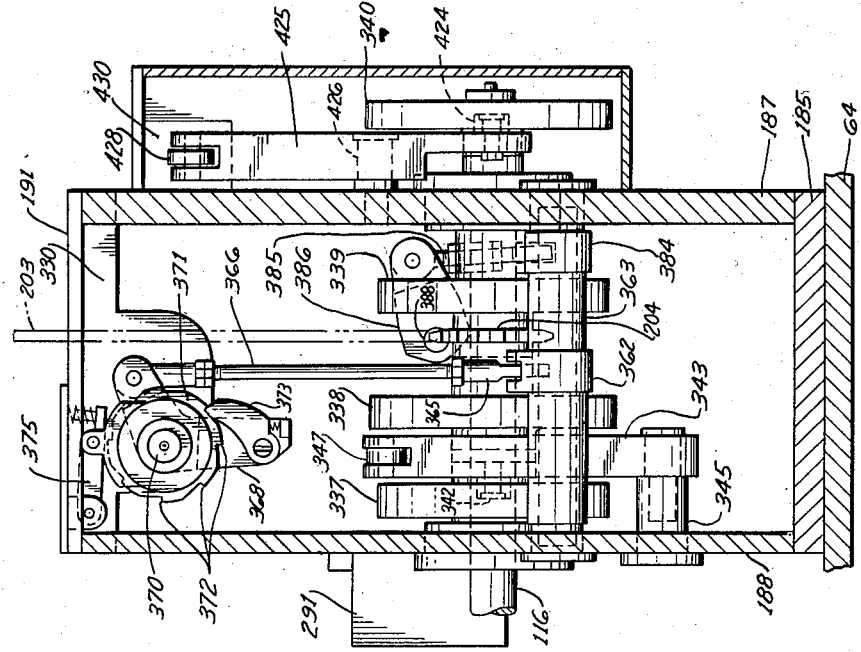
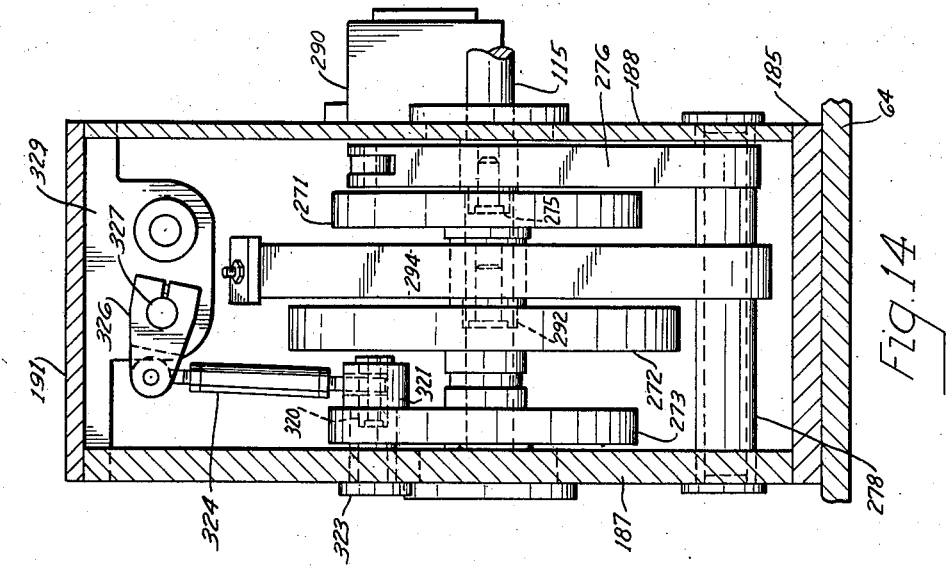
INVENTOR.
FRED P. MAITINO
BY Bosworth, Sessions,
Herrstrom & Lawler
ATTORNEYS.

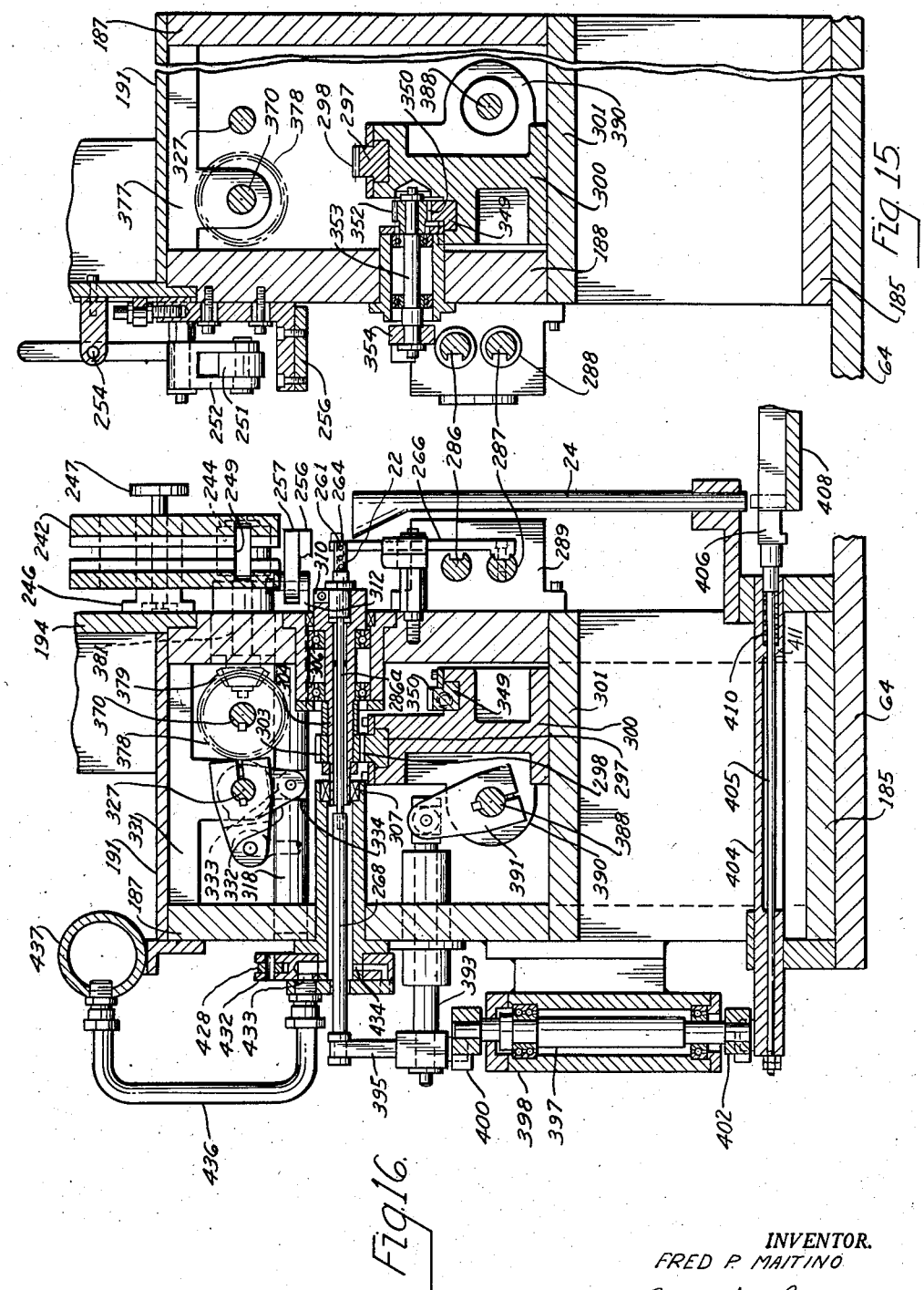

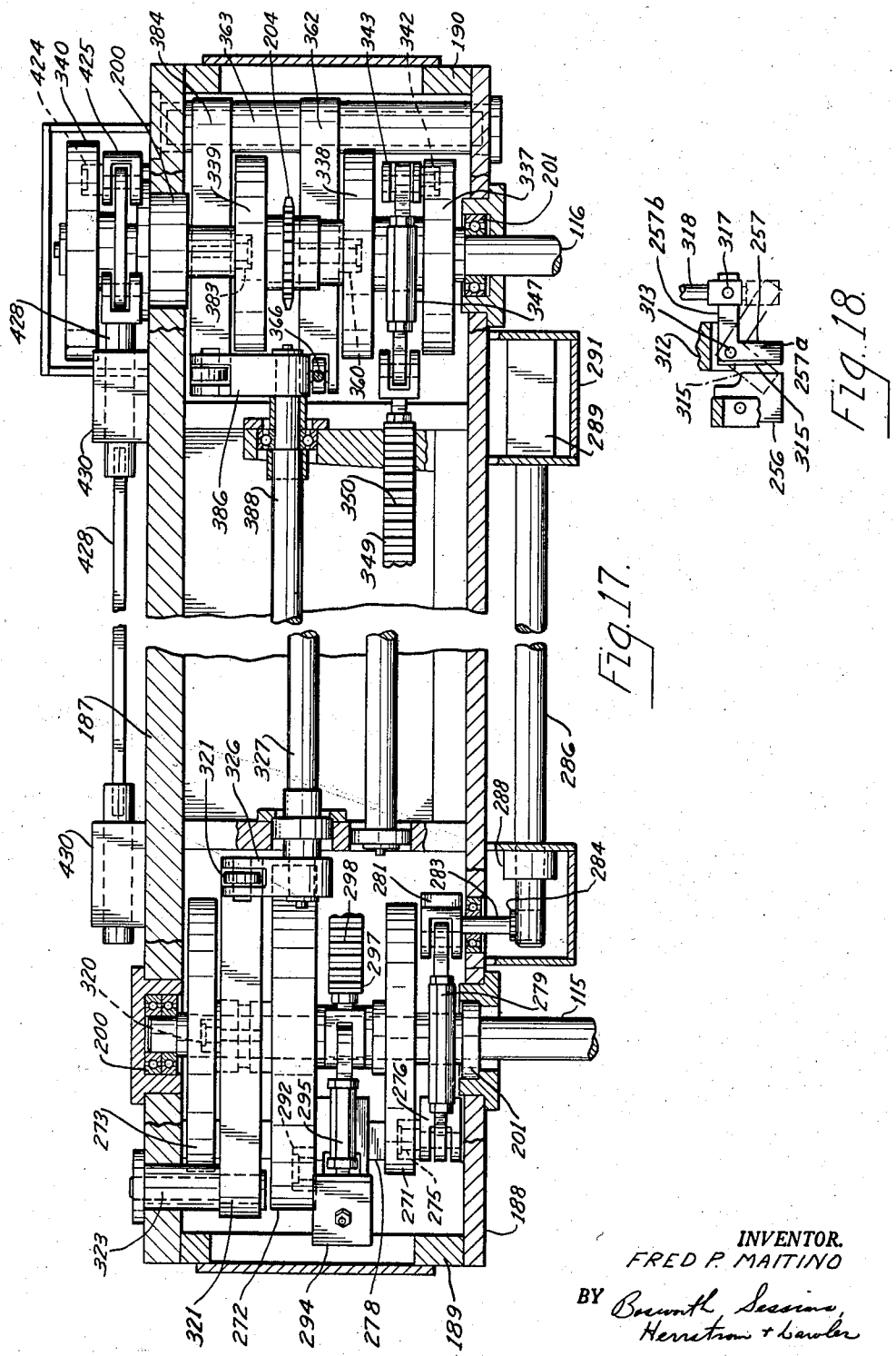

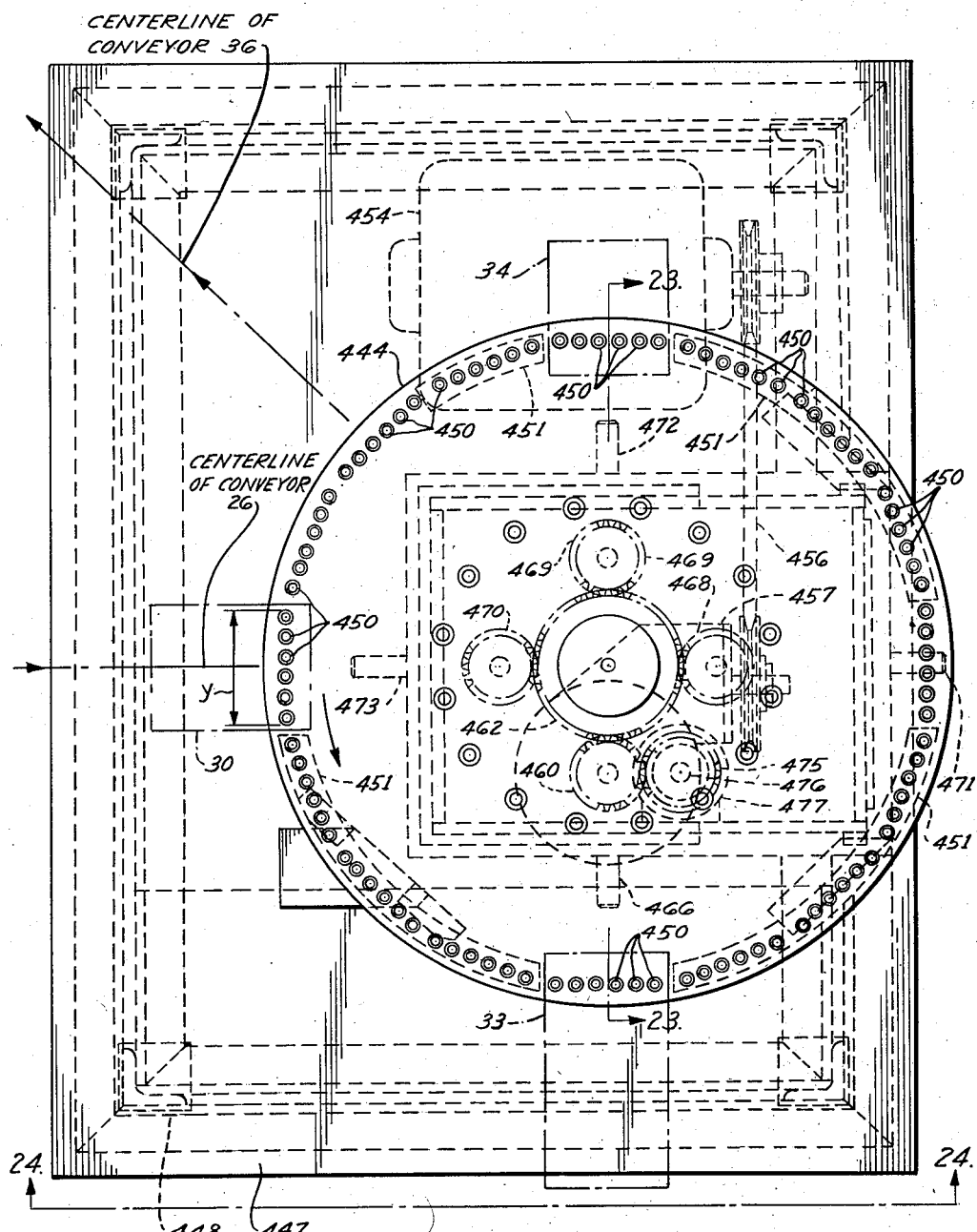

April 28, 1959     F. P. MAITINO     2,883,815
AUTOMATIC BATTERY MAKING MACHINE
Filed June 25, 1956     48 Sheets-Sheet 14

INVENTOR.
FRED P. MAITINO
BY Bosworth, Sessions, Herrstrom + Lawler
ATTORNEYS.

INVENTOR.
FRED P. MAITINO

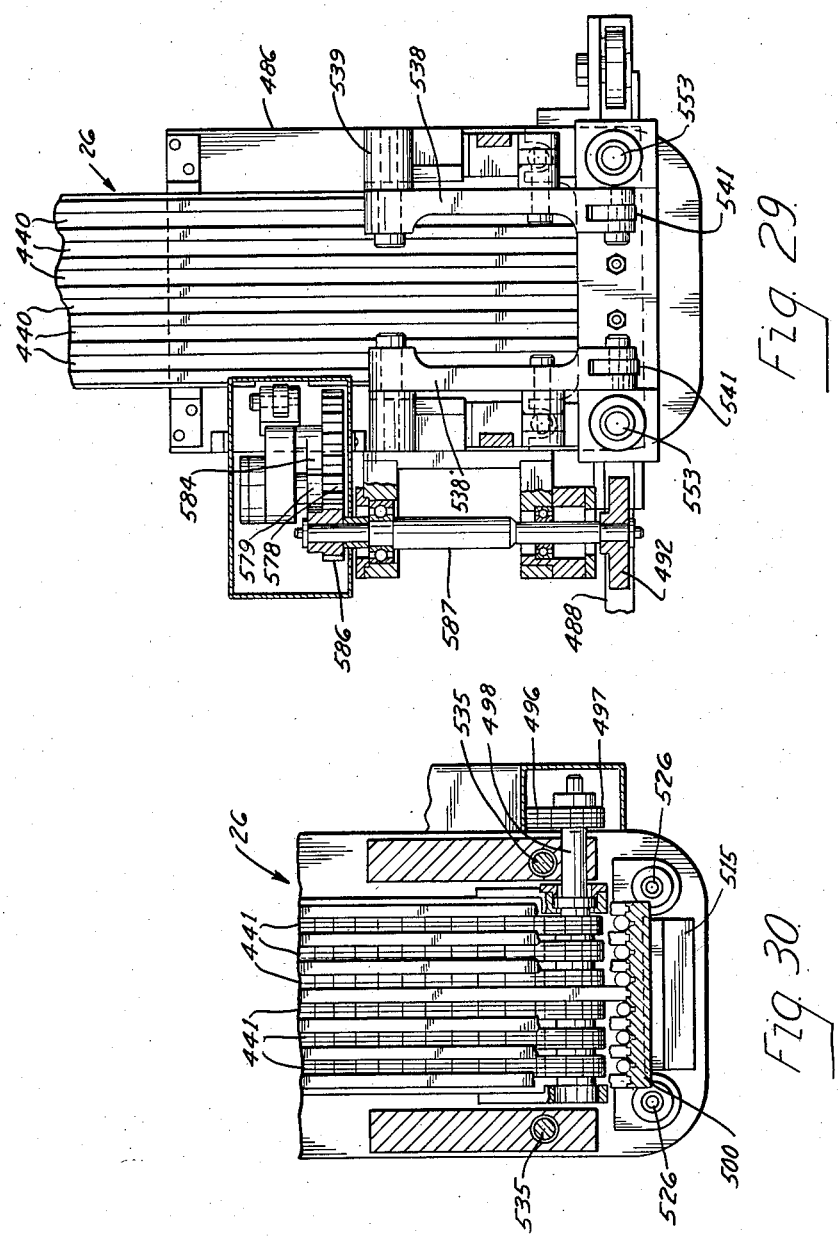

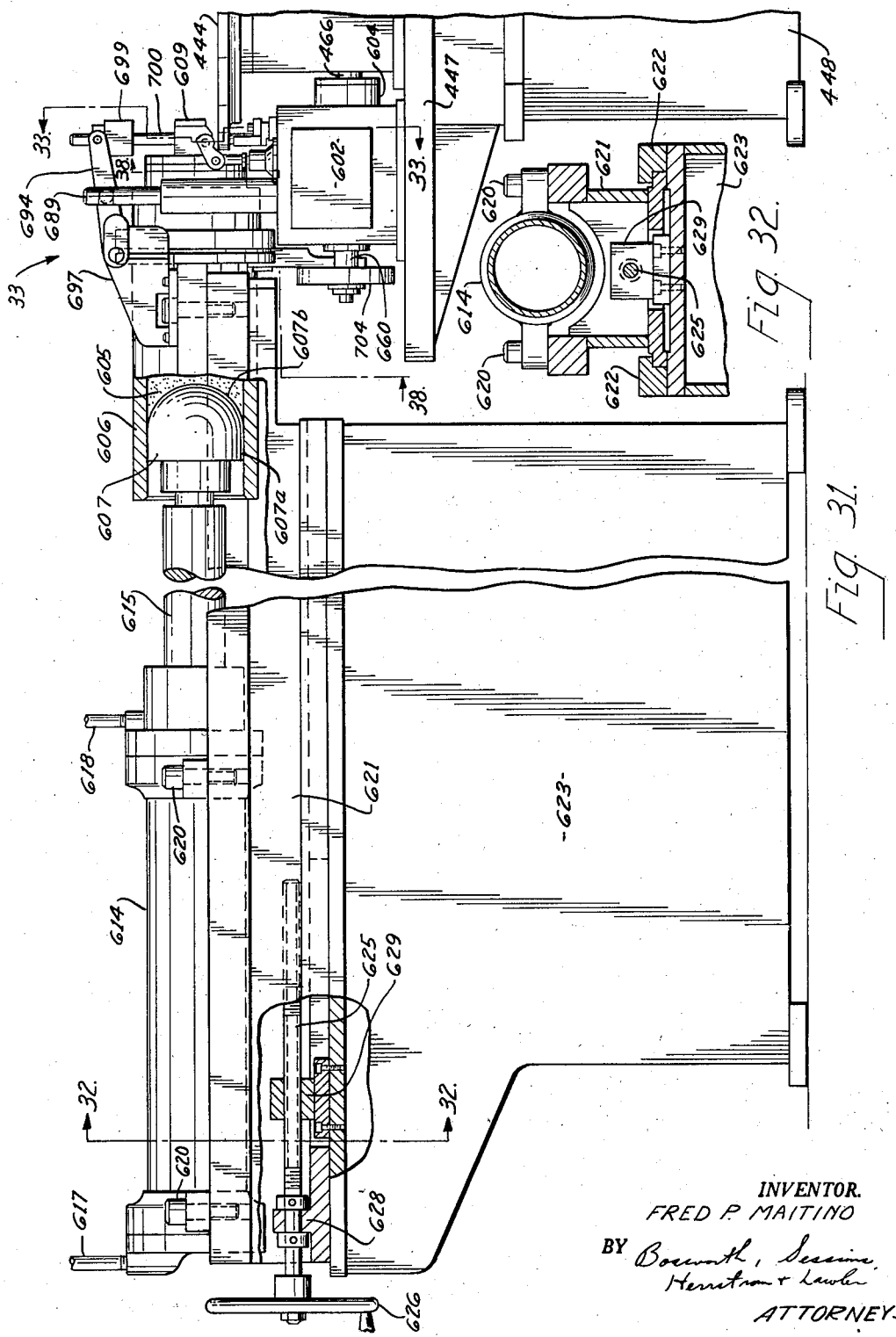

April 28, 1959     F. P. MAITINO     2,883,815
AUTOMATIC BATTERY MAKING MACHINE
Filed June 25, 1956     48 Sheets-Sheet 21

INVENTOR.
FRED P. MAITINO
BY Bosworth, Sessions,
Herrström & Lawler
ATTORNEYS.

April 28, 1959 F. P. MAITINO 2,883,815
AUTOMATIC BATTERY MAKING MACHINE
Filed June 25, 1956 48 Sheets-Sheet 22

INVENTOR.
FRED P. MAITINO
BY Bosworth, Sessions,
Herrstrom + Lawler
ATTORNEYS.

April 28, 1959 F. P. MAITINO 2,883,815
AUTOMATIC BATTERY MAKING MACHINE
Filed June 25, 1956 48 Sheets-Sheet 23

INVENTOR.
FRED P. MAITINO
BY Bosworth, Sessions,
Herrström & Lawler
ATTORNEYS.

INVENTOR.
FRED P. MAITINO

April 28, 1959 F. P. MAITINO 2,883,815
AUTOMATIC BATTERY MAKING MACHINE
Filed June 25, 1956 48 Sheets-Sheet 25

INVENTOR.
FRED P. MAITINO
BY Bosworth, Sessions
Herrston + Lawler
ATTORNEYS.

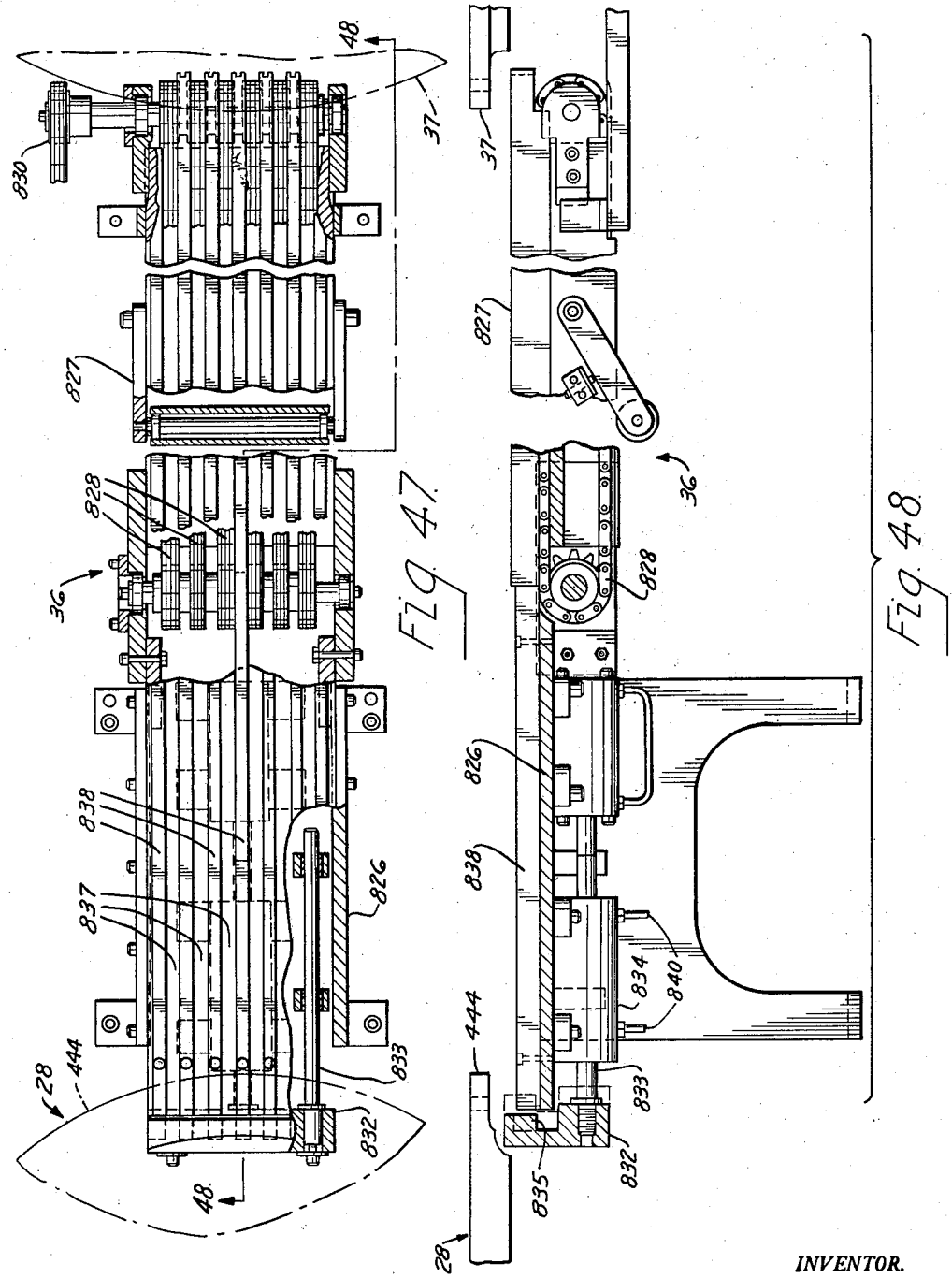

April 28, 1959  F. P. MAITINO  2,883,815
AUTOMATIC BATTERY MAKING MACHINE
Filed June 25, 1956  48 Sheets-Sheet 29
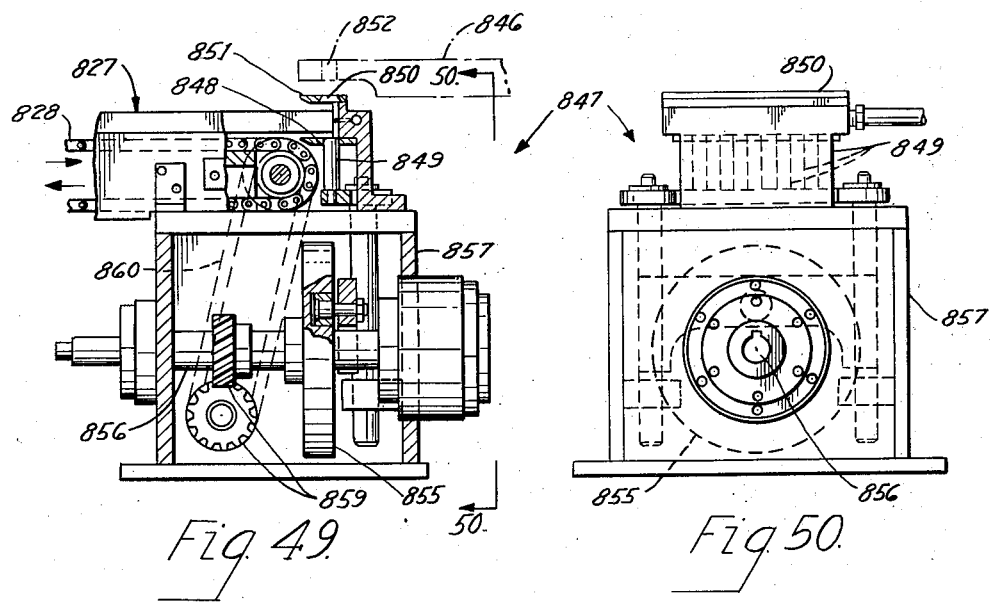
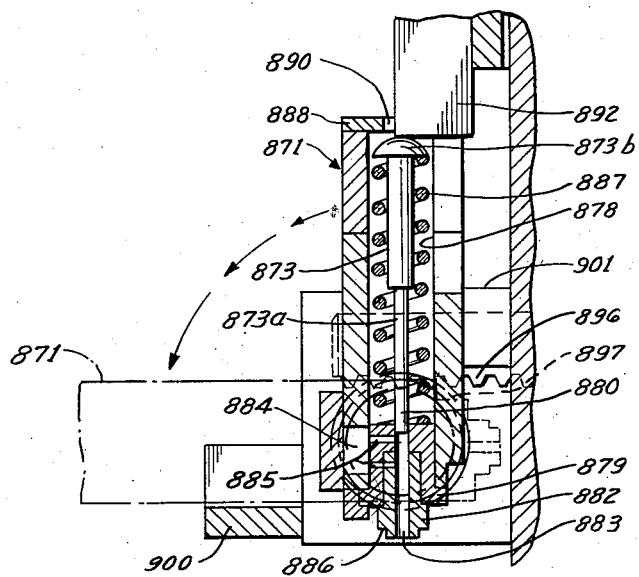
INVENTOR.
FRED P. MAITINO
BY Bosworth, Sessions,
Herrstrom + Lawler
ATTORNEYS.

April 28, 1959  F. P. MAITINO  2,883,815
AUTOMATIC BATTERY MAKING MACHINE
Filed June 25, 1956  48 Sheets-Sheet 30
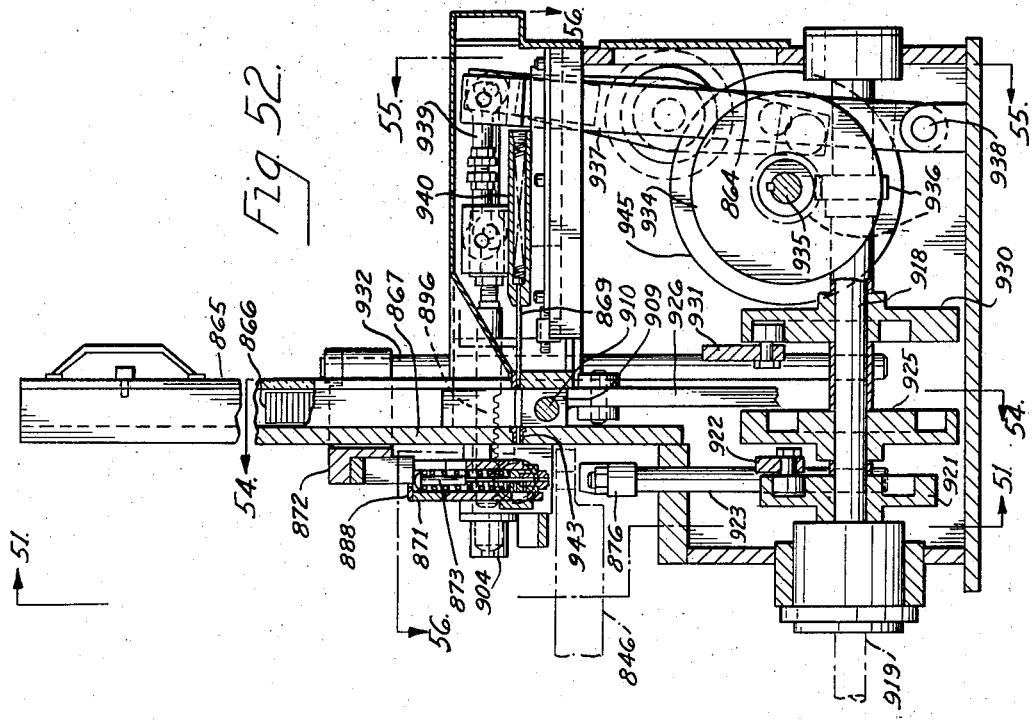
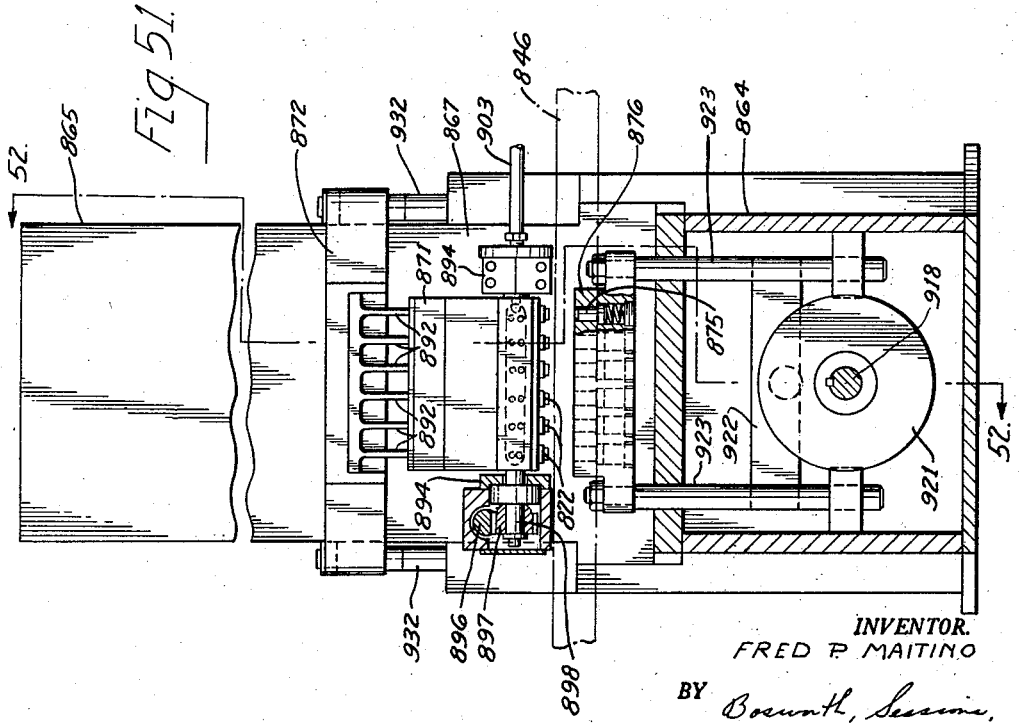
INVENTOR.
FRED P. MAITINO
BY Bosworth, Sessions,
Herrstrom + Lawler
ATTORNEYS

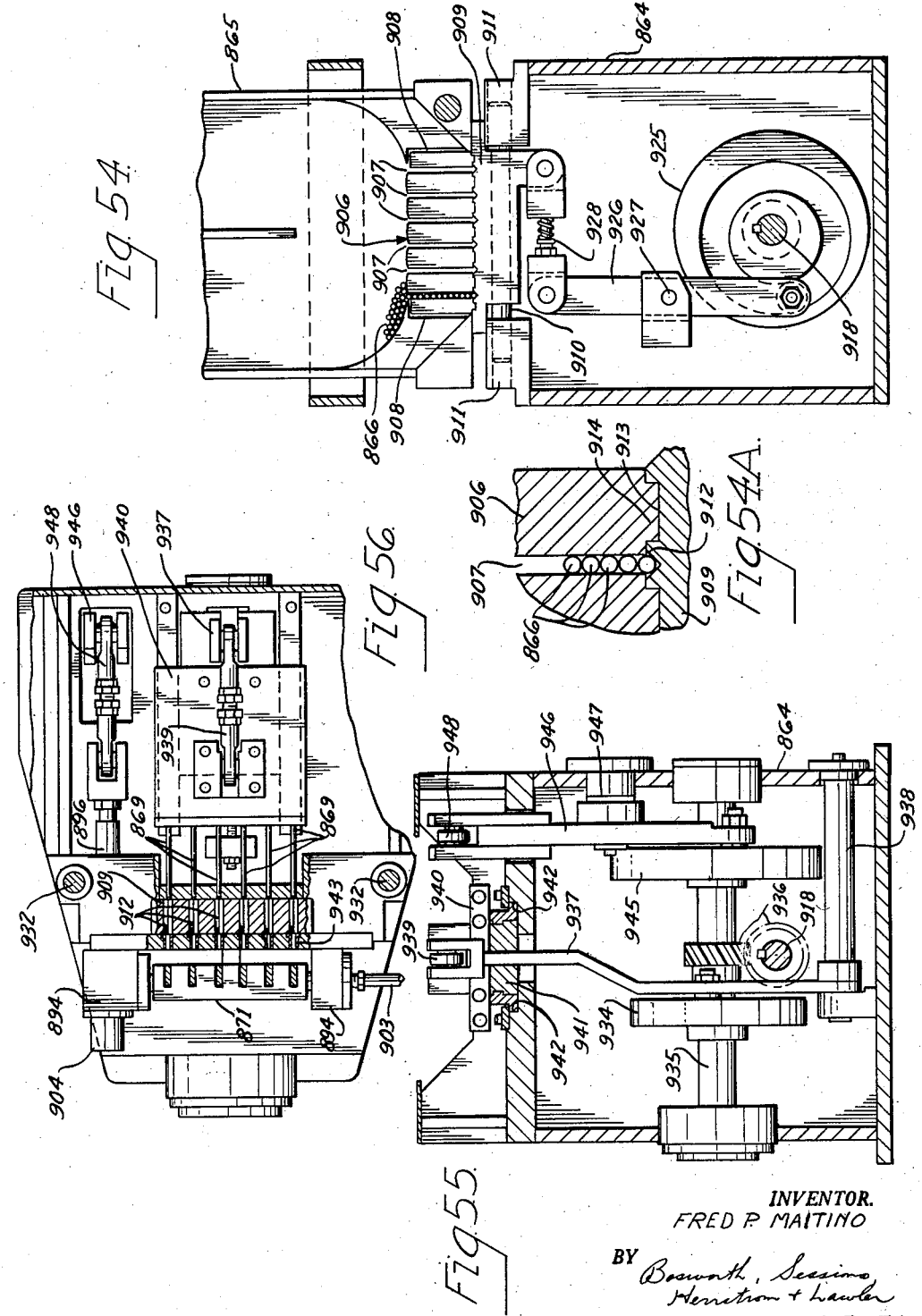

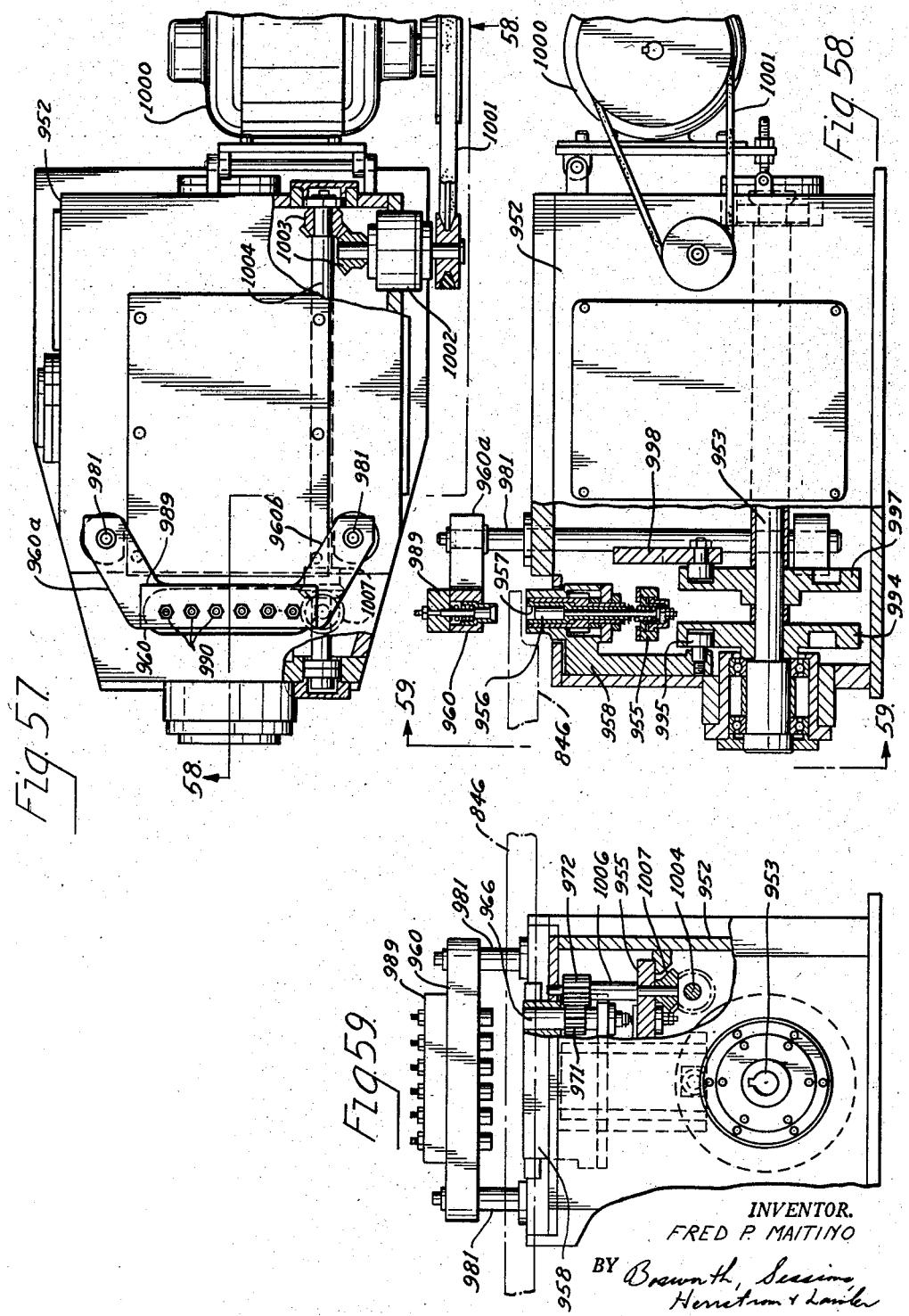

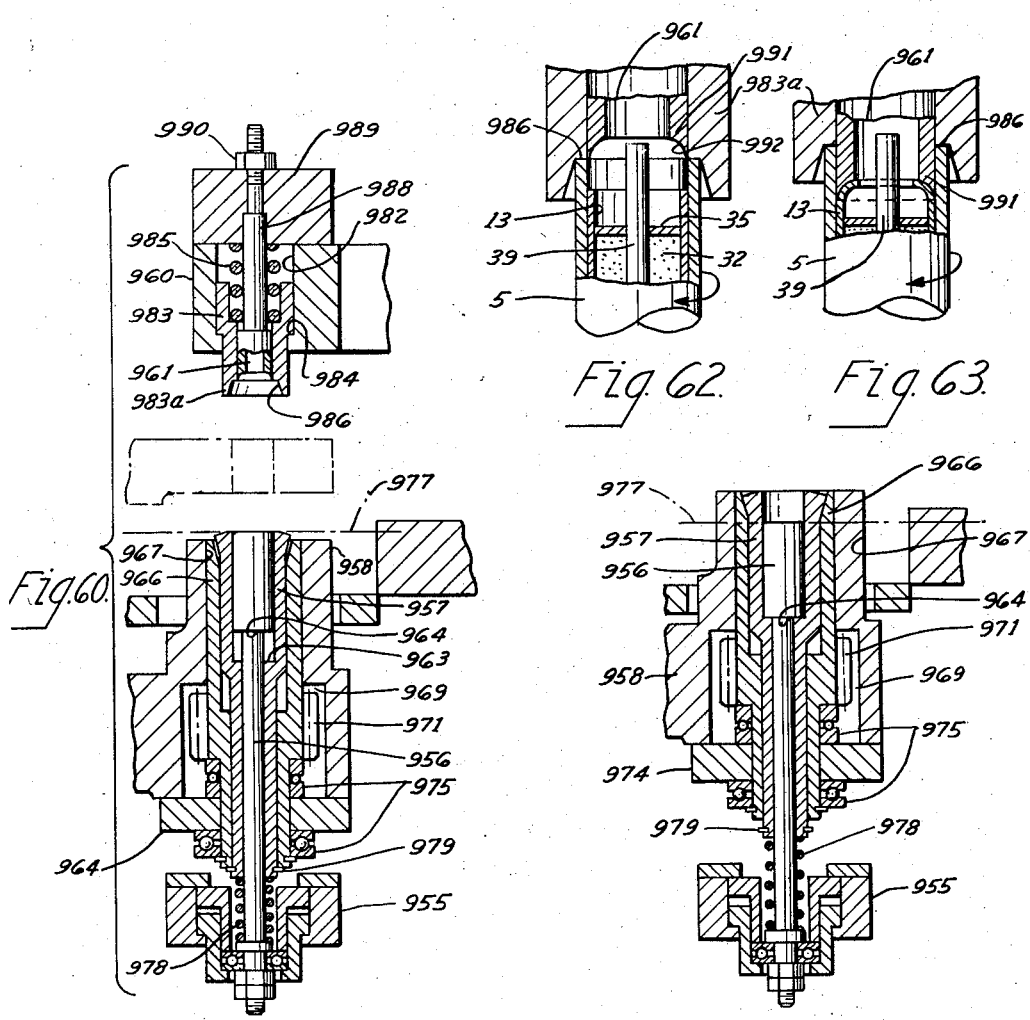

April 28, 1959
F. P. MAITINO
2,883,815
AUTOMATIC BATTERY MAKING MACHINE
Filed June 25, 1956
48 Sheets-Sheet 34
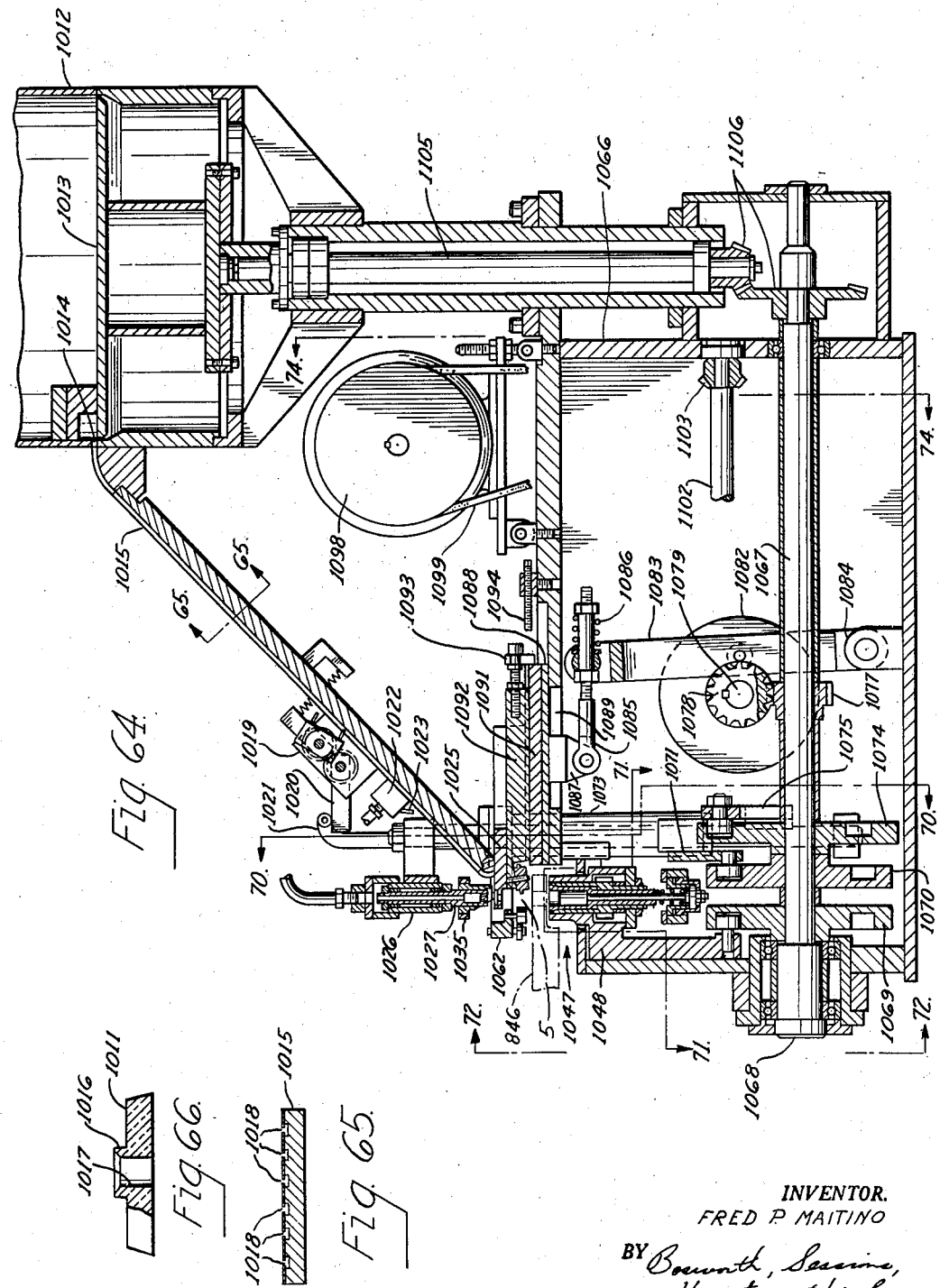
INVENTOR.
FRED P. MAITINO
BY Bosworth, Sessions,
Herrstrom & Lawler
ATTORNEYS.

April 28, 1959 F. P. MAITINO 2,883,815
AUTOMATIC BATTERY MAKING MACHINE
Filed June 25, 1956 48 Sheets-Sheet 35
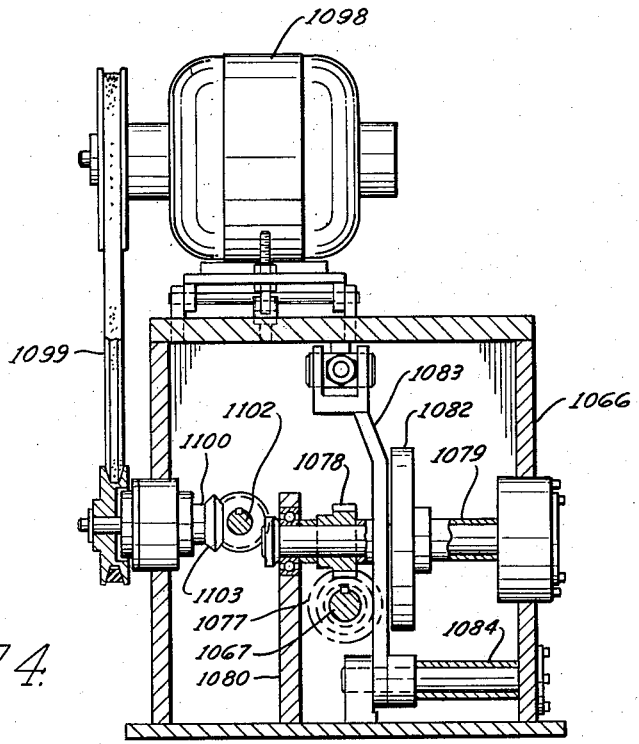
Fig. 74.
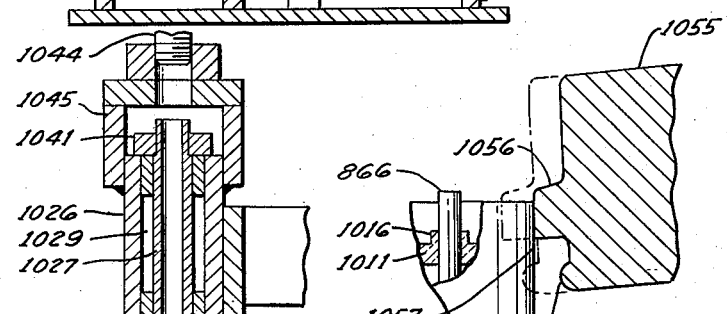
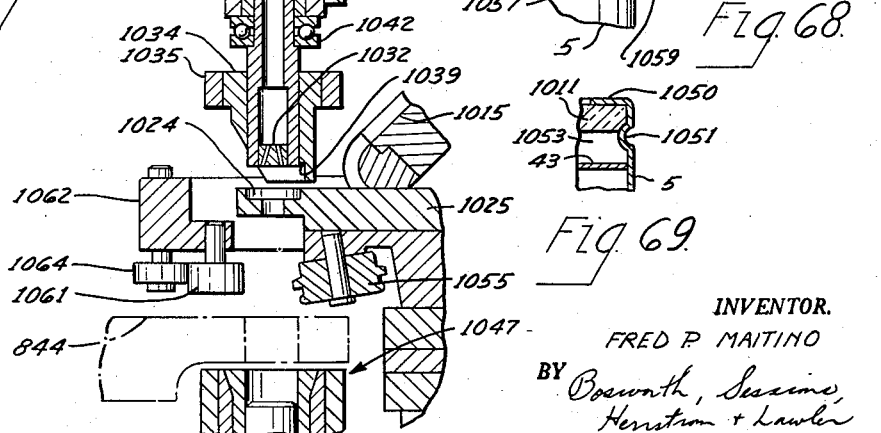
Fig. 67. Fig. 68. Fig. 69.
INVENTOR.
FRED P. MAITINO
BY Bosworth, Sessions,
Henstrom + Lawler
ATTORNEYS.

April 28, 1959 F. P. MAITINO 2,883,815
AUTOMATIC BATTERY MAKING MACHINE
Filed June 25, 1956 48 Sheets-Sheet 36

INVENTOR.
FRED P. MAITINO
BY Bosworth, Sessions,
Herndon + Lawler
ATTORNEYS.

April 28, 1959      F. P. MAITINO      2,883,815
AUTOMATIC BATTERY MAKING MACHINE
Filed June 25, 1956      48 Sheets-Sheet 37
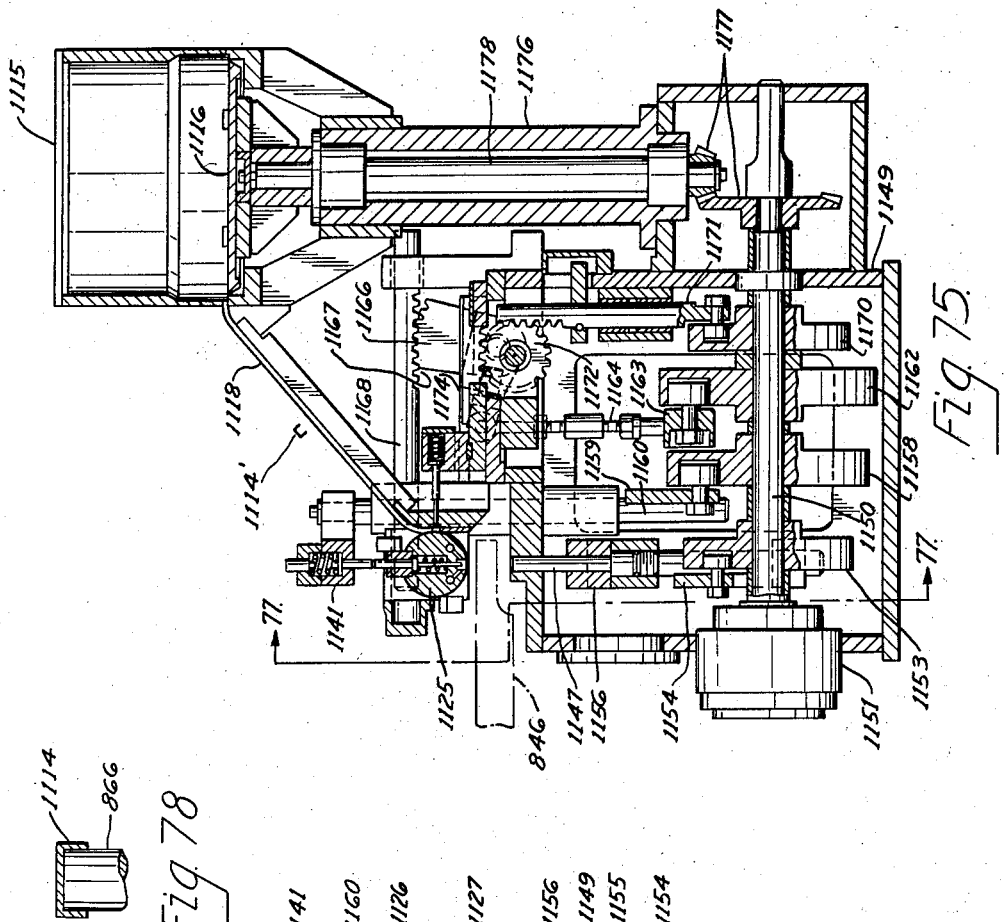
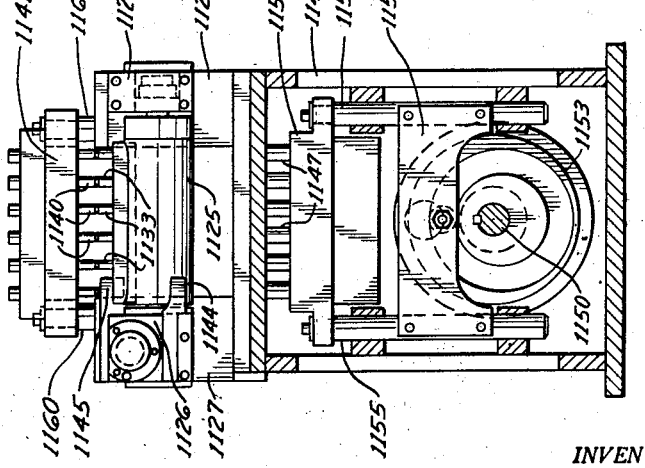
INVENTOR.
FRED P. MAITINO
BY
ATTORNEYS.

April 28, 1959  F. P. MAITINO  2,883,815
AUTOMATIC BATTERY MAKING MACHINE
Filed June 25, 1956  48 Sheets-Sheet 39
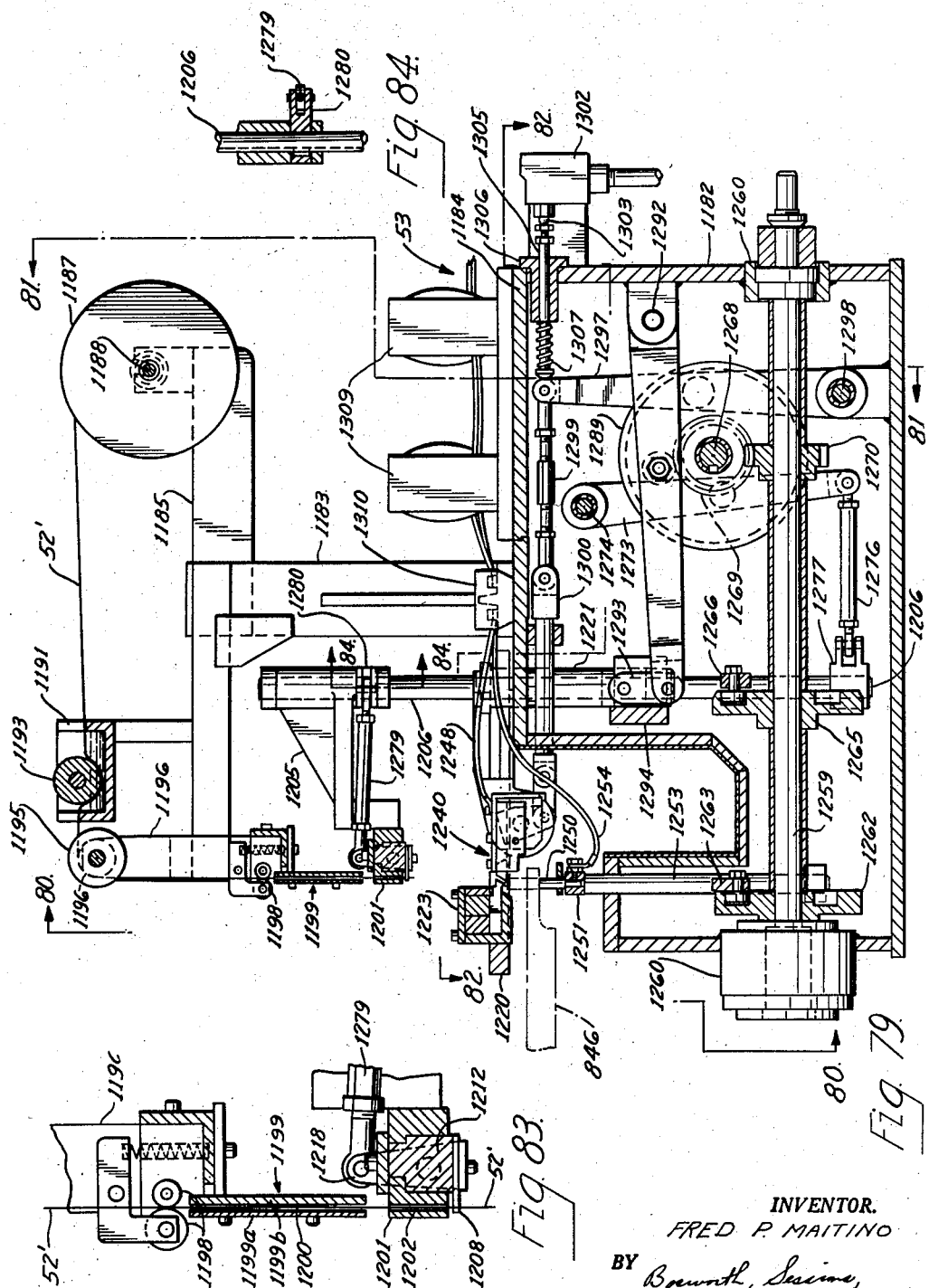
INVENTOR.
FRED P. MAITINO
BY
ATTORNEYS.

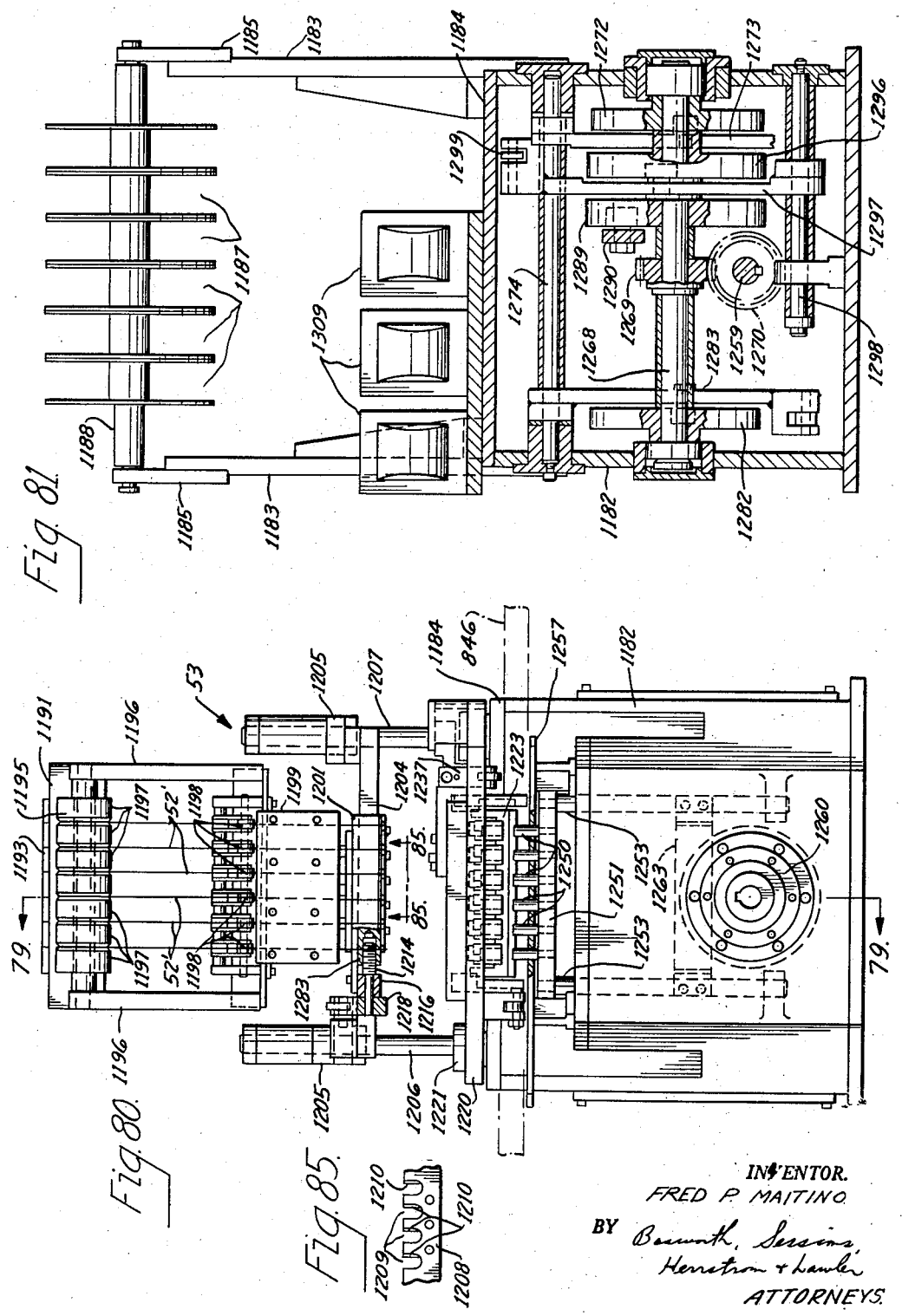

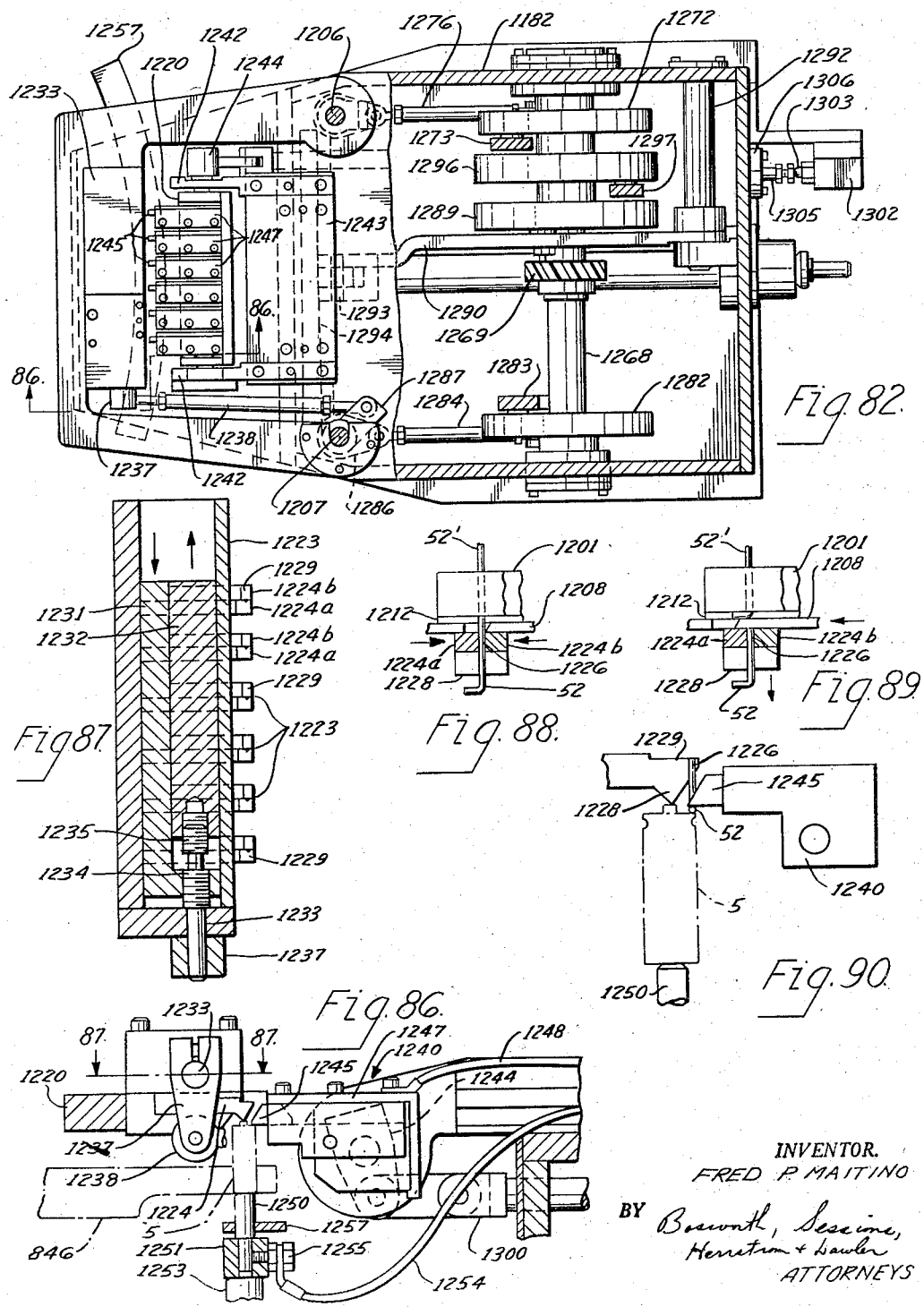

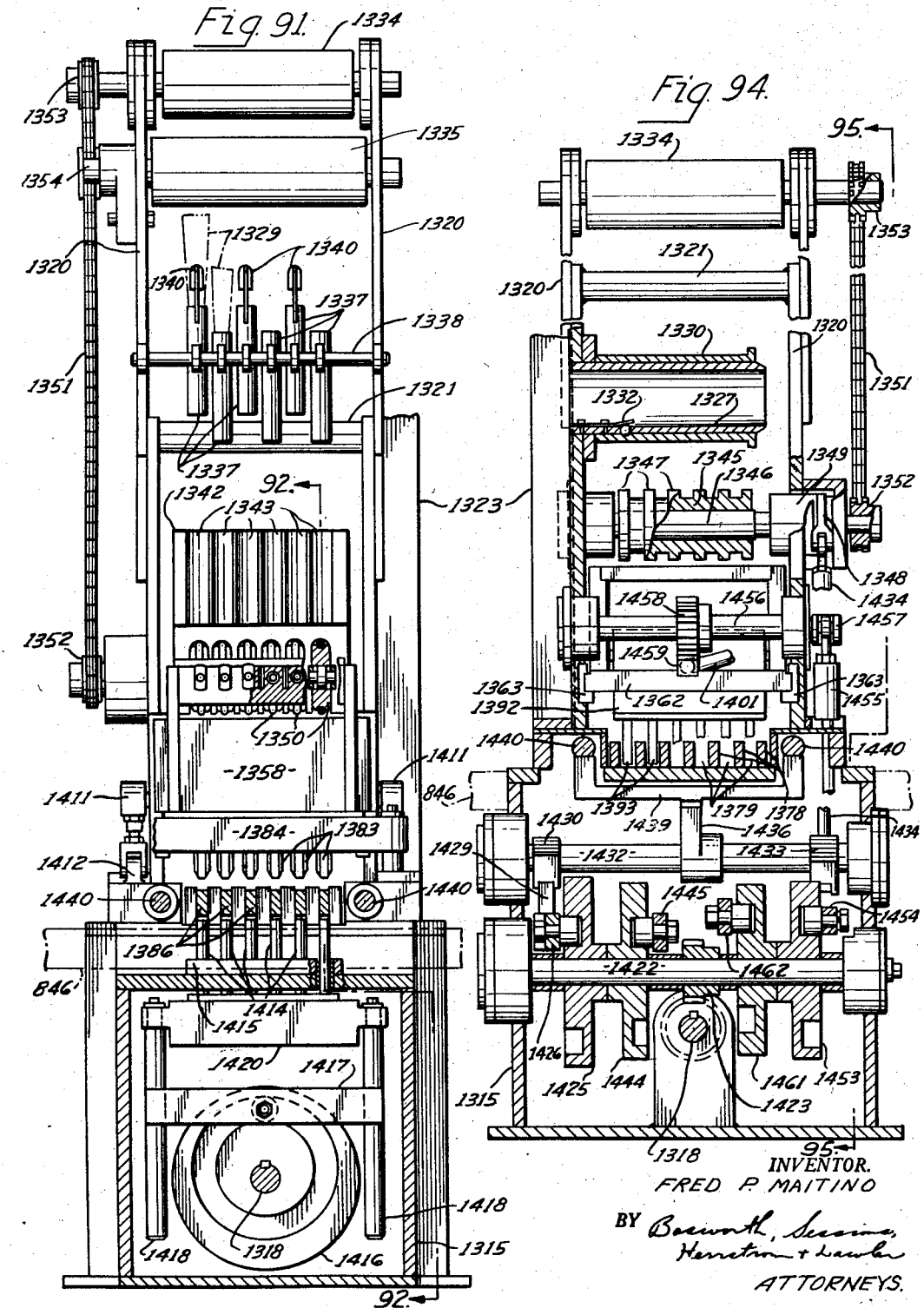

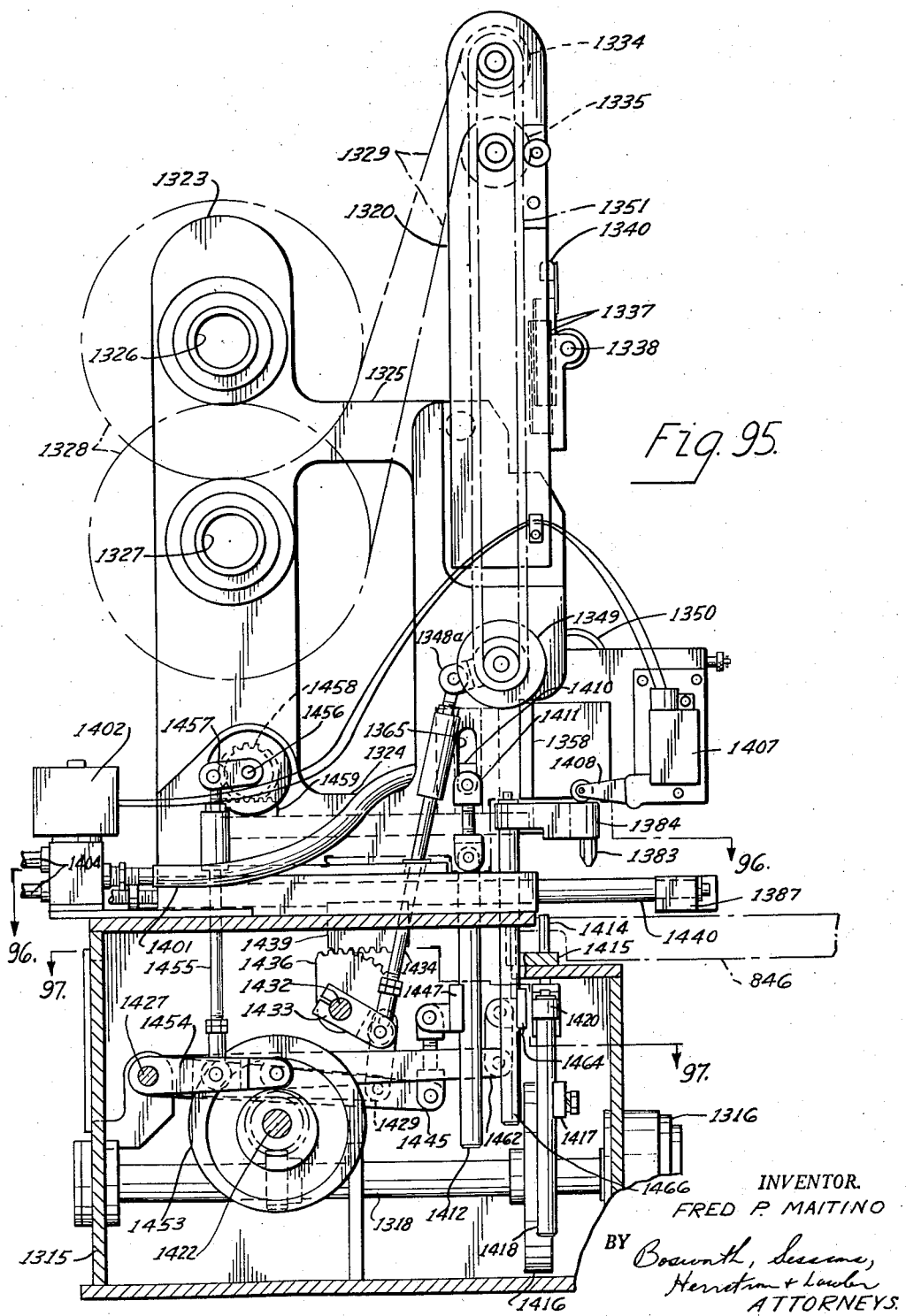

April 28, 1959  F. P. MAITINO  2,883,815
AUTOMATIC BATTERY MAKING MACHINE
Filed June 25, 1956  48 Sheets-Sheet 46

INVENTOR.
FRED P. MAITINO
BY Bosworth, Sessions, Herrstrom + Lauber
ATTORNEYS.

April 28, 1959 F. P. MAITINO 2,883,815
AUTOMATIC BATTERY MAKING MACHINE
Filed June 25, 1956 48 Sheets-Sheet 47
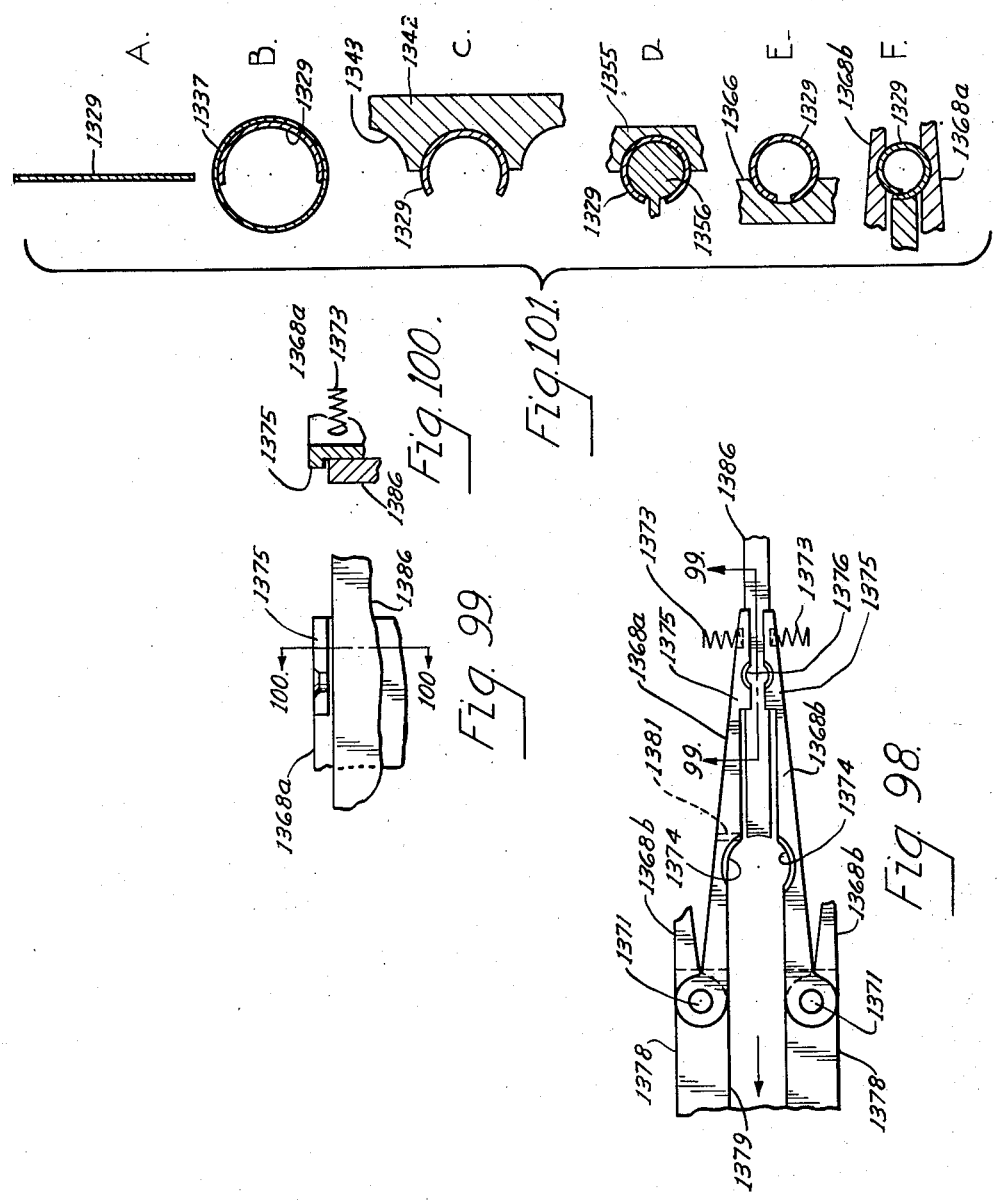
INVENTOR.
FRED P. MAITINO
BY
ATTORNEYS.

CELL WRAPPING MACHINE
TIME CHART OF OPERATIONS

A. TABLE

B.
- PAPER CUT — FWD. / REAR
- VACUUM BLOCK HORIZONTAL — FWD / REAR

C.
- JAW SPREADER PINS — DN. / UP / DN / UP
- VACUUM — ON

D. VACUUM BLOCK VERTICAL — DN. / UP

E. CELL LIFT — UP / DN

F.
- PAPER FEED
- HEATER BARS — R / REAR | FWD.

|← 1-CYCLE →|

*Fig. 102.*

INVENTOR.
FRED P. MAITINO
BY Bosworth, Sessions,
Hemstrom + Lawler
ATTORNEYS.

United States Patent Office 2,883,815
Patented Apr. 28, 1959

2,883,815
AUTOMATIC BATTERY MAKING MACHINE

Fred P. Maitino, South Euclid, Ohio, assignor to General Dry Batteries Company, Cleveland, Ohio, a division of P. R. Mallory & Co., Inc., Indianapolis, Ind., a corporation of Delaware Application June 25, 1956, Serial No. 593,729

26 Claims. (Cl. 53—239)

This invention relates to automatic dry cell assembling apparatus and in particular to a machine for progressively assembling automatically the elements of a dry cell of the Le Clanche type by a series of successive operations beginning with the empty cell can and ending with a finished and wrapped cell.

There are several distinct assembly operations involved in the manufacture of dry cells, including lining the cell can, inserting the exact amount of the depolarizing mix within the can, placing of the positive electrode, applying the top seal, connecting the negative electrode, and wrapping the exterior of the can. In the past, these steps have been performed on separate machines each having one or more operators. Such a system requires handling of the cells before and after each operation and results in loss of considerable time in the manufacture of the cells. Furthermore the use of several separate machines requires considerable factory space, personnel to handle the cells in addition to those necessary to attend the machines, and control of the movement of cells to and from the several disconnected operating stations.

According to the present invention, dry cells are assembled completely automatically by apparatus which performs the several assembly operations successively on the cell cans that are moved through the apparatus.

A general object of the invention is the provision of completely automatic apparatus for assembling dry cells, the apparatus being supplied with empty cell cans at the first station and producing the finished product ready for use at the last station.

Another object is the provision of apparatus which greatly increases the rate of production of dry cells.

Another object is the provision of apparatus which automatically loads and unloads cell cans at each operating station and transfers the cells from station to station, thus substantially eliminating manual handling of the cells during the assembly operation.

Another object is the provision of cell making apparatus in which a plurality of cells are processed simultaneously at each of the several operating stations of the apparatus, thus providing for increased productive capacity of the apparatus.

Another object is the provision of cell making apparatus having a plurality of stations arranged in groups and with the groups in series, and conveyor means for transferring cells from one group to the other whereby any one of the groups may be temporarily turned off without interrupting the operation of the other groups.

Another object is the provision of such apparatus which aligns a plurality of empty cell cans in one direction and automatically cuts, forms and simultaneously inserts paper liners into the several cans.

Another object is the provision of apparatus with a plurality of cell assembly stations spaced around an indexing table, and means for synchronizing the operations of the stations and the movement of the table.

Another object is the provision of a disc punch and insert machine which simultaneously punches a plurality of discs from a supply tape and inserts the discs into the bottom of the cell cans.

A further object is the provision of a cell mix measuring, packing and loading mechanism which automatically inserts the exact amount of cell mix of proper density into the cell cans.

Another object is the provision of apparatus for simultaneously punching and inserting a plurality of perforate mix washers into the cans on top of the cell mix.

Another object is the provision of an electrode inserting mechanism which feeds and orients a plurality of electrodes into axial alignment with the cell cans and inserts the electrodes through the mix washer into the mix and against the bottom disc therein.

Another object is the provision of liner folding mechanism which pre-folds the upper portions of cell can liners.

Another object is the provision of a top washer punch and insert machine which forms perforate washers, inserts same over the electrode and against the folded liner and tightly packs the mix against the carbons and liners.

Another object is the provision of cell can sealing mechanism which automatically inserts sealing elements in the tops of the cans and locks the sealing elements tightly within the tops of the cans.

Another object is the provision of a mechanism which places terminal caps on the upper ends respectively of the cell electrodes.

Another object is the provision of automatic mechanism which cuts, forms and positions negative terminal wires against tops of the cell cans, and thereafter permanently secures the wires to the cans.

Another object is the provision of automatic cell wrapping apparatus which forms, places and secures wrappers on the cell cans.

These and other objects of the invention will become apparent from the following description of a preferred form thereof, reference being made to the accompanying drawings in which.

I. GENERAL ARRANGEMENT

II. CAN FEED AND LINER FORMING APPARATUS

Figure 3:
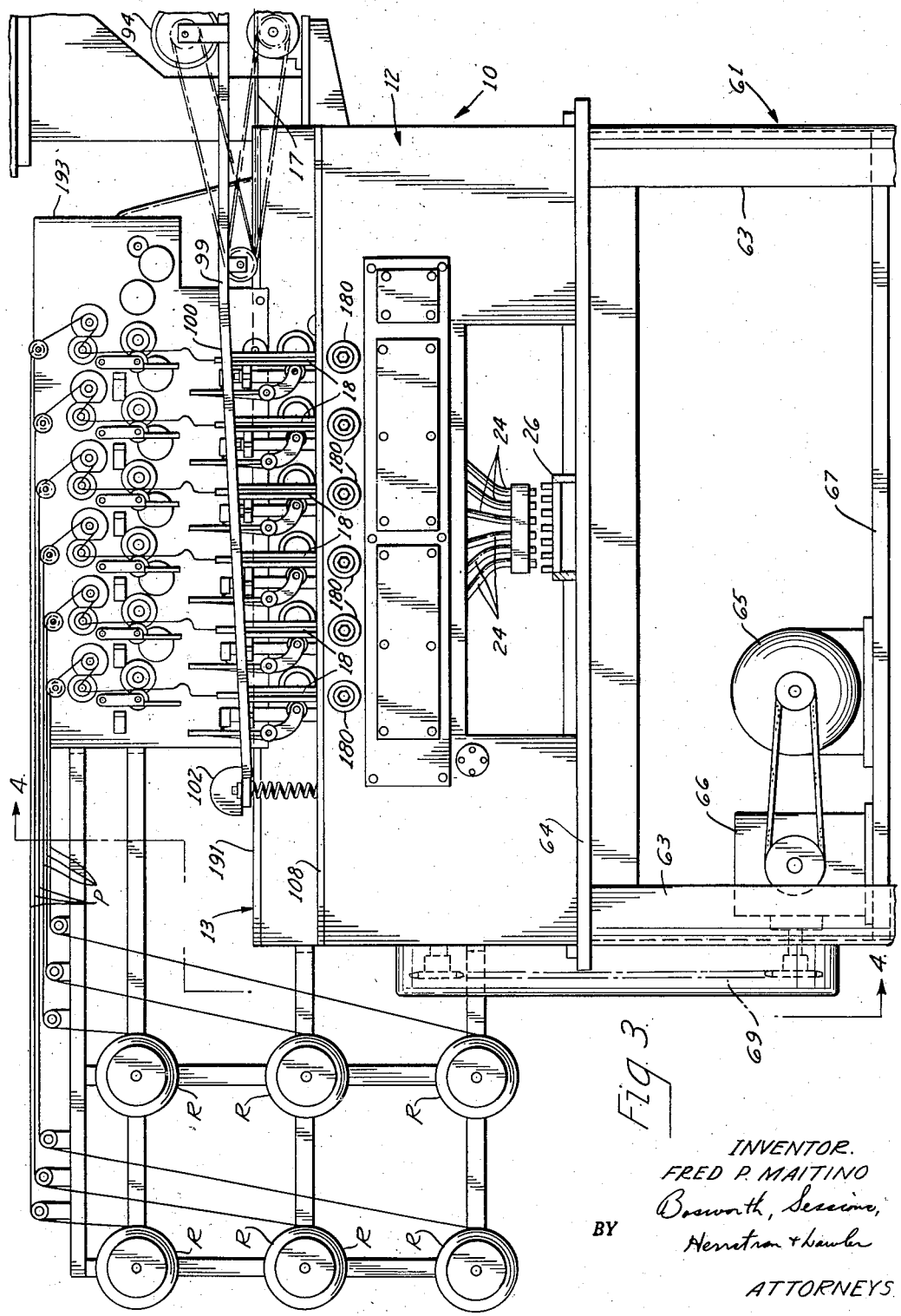

Figure 3 is a front elevational view of the can feed and liner forming apparatus which constitutes the first and second stations of the battery making machine.

Figure 4:
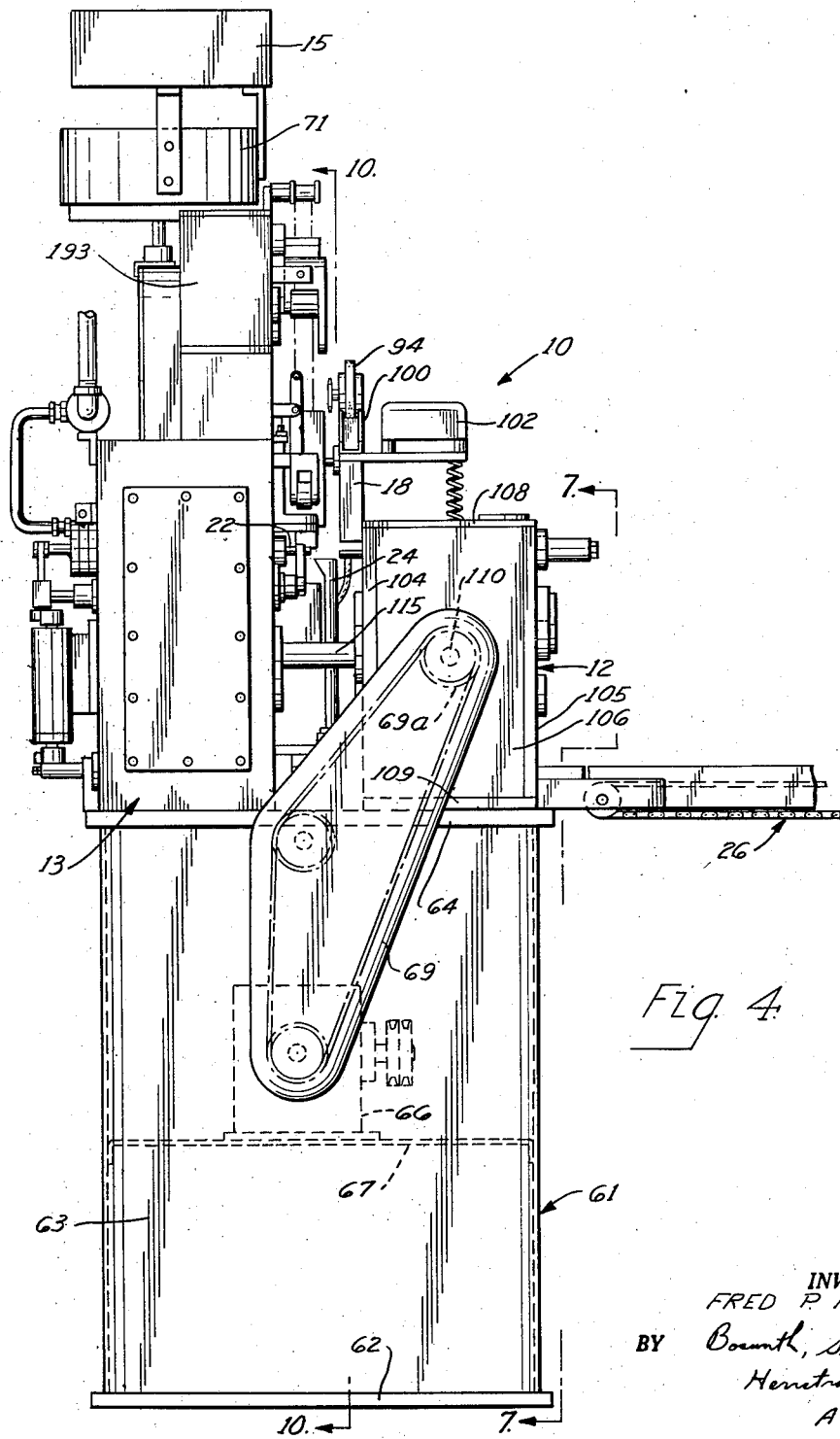

Figure 4 is an end elevation of the can feed and liner forming apparatus viewed along the line 4—4 of Figure 3.

Figures 5, 5A and 6 are schematic drawings showing cell can orienting and feeding mechanism forming a part of the can feed and liner forming apparatus.

Figure 7:
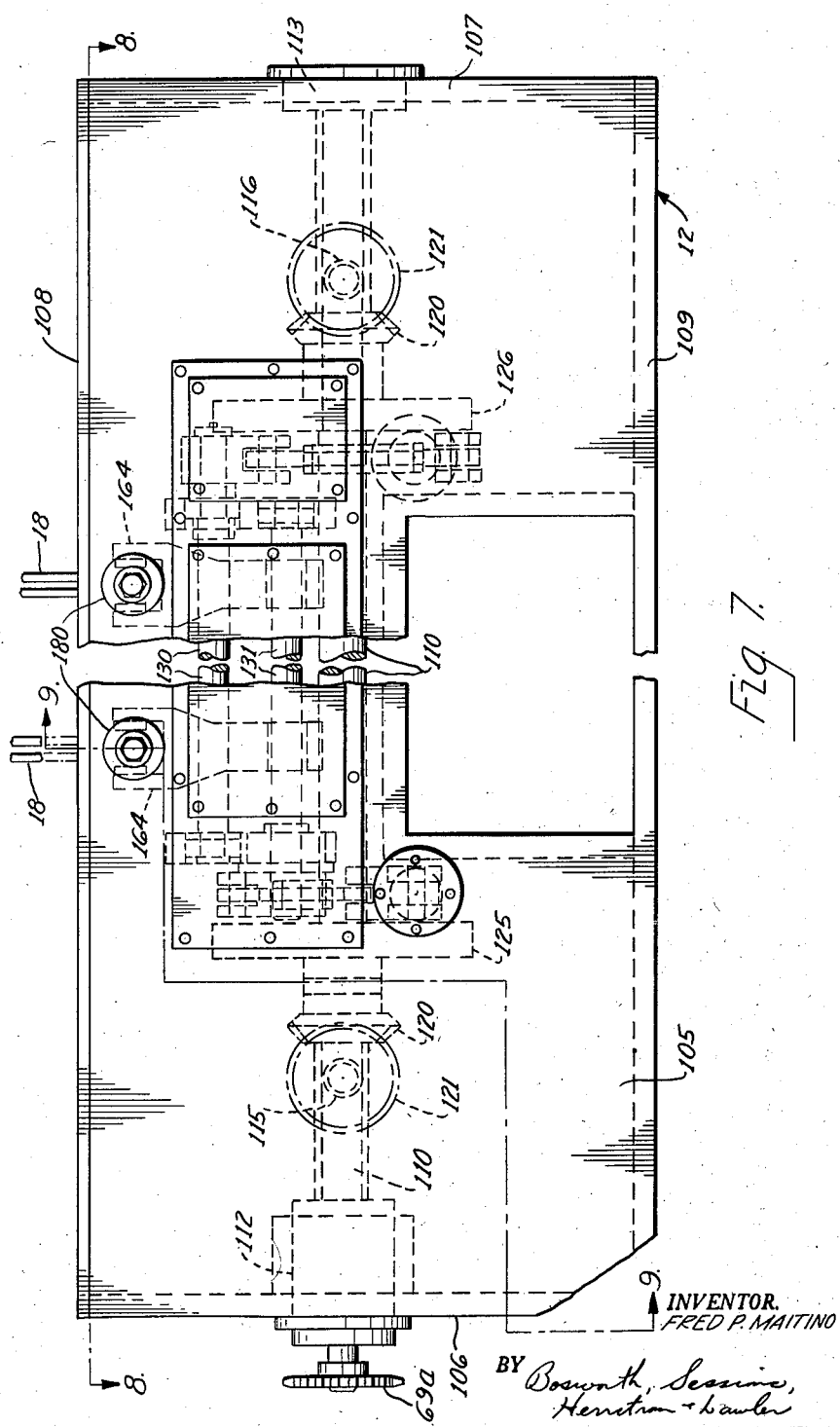

Figure 7 is a fragmentary front elevation of the can feed machine as viewed along the line 7—7 of Figure 4.

Figure 8:
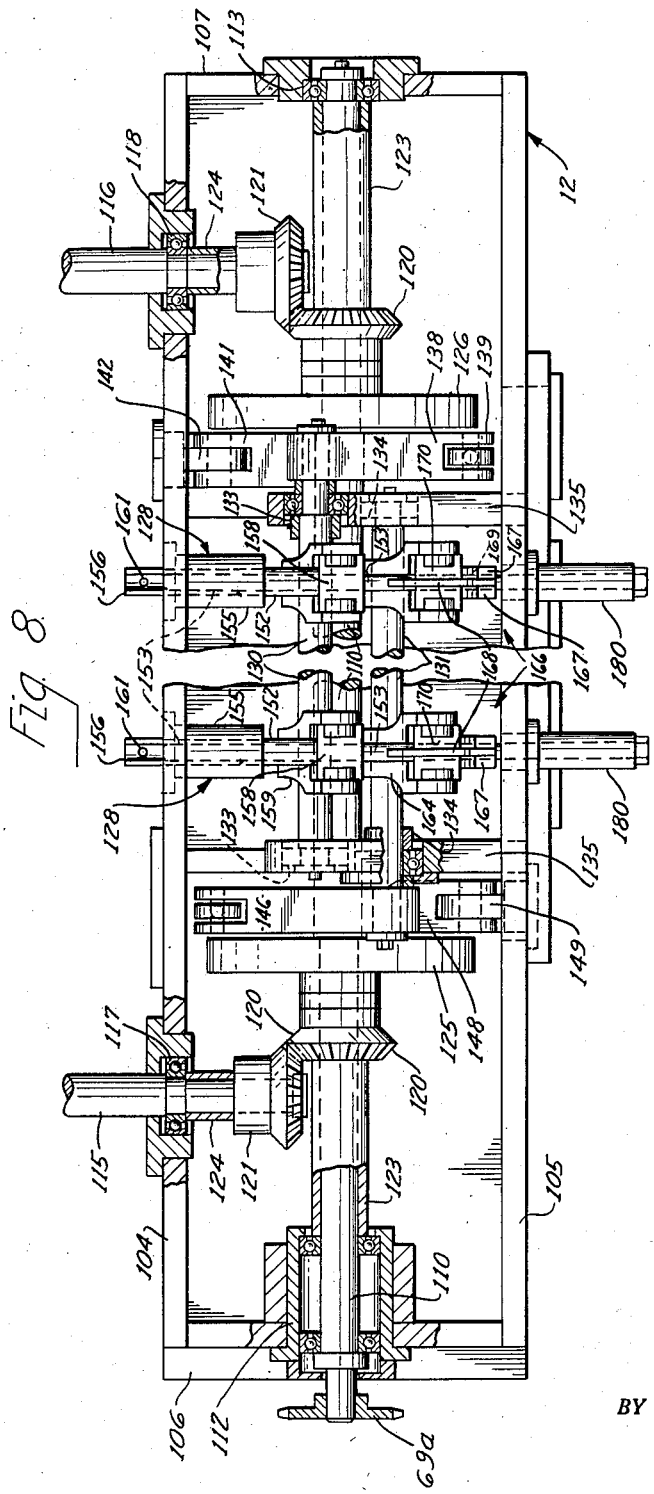

Figure 8 is a partially sectioned fragmentary top plan view of the can feed mechanism as viewed along the line 8—8 of Figure 7.

Figure 9 is a transverse section of the can feed mechanism as viewed on the line 9—9 of Figure 7.

Figures 10A and 10B are fragmentary front elevational views of the liner forming mechanism as viewed along the line 10—10 of Figure 4, the front plate of the apparatus being partially broken away to show the internal construction.

Figure 11 is a horizontal section of the paper feed housing of the liner forming mechanism, the section being taken along the line 11—11 of Figure 10B.

Figure 12 is an end elevation of the paper feed housing as viewed along the line 12—12 of Figure 10A.

Figures 13 and 14 are transverse sections of the lower portion of the liner forming mechanism showing the cam drive assemblies, the sections being taken along the lines 13—13 and 14—14, respectively, of Figure 10B.

Figure 15 is a vertical section of the liner forming mechanism showing the flapper operating mechanism, the section being taken along the line 15—15 of Figure 10B.

Figure 16 is a vertical section of the liner forming mechanism showing the spindle on which the liner is formed, the ratchet feed roll drive, the vacuum control valve, the shear blade actuating mechanism and the lined can feeding mechanism, the section being taken on the line 16—16 of Figure 10B.

Figure 16A is an enlarged view of a detail of the lined can ejecting mechanism shown in Figure 16.

Figure 17 is a fragmentary horizontal section of the liner forming mechanism showing the cam drive assemblies, the section being taken along the line 17—17 of Figure 10B.

Figure 18 is a top view of the paper shearing blades which are part of the liner forming mechanism.

Figures 19, 20 and 21 are schematic drawings showing the sequence of operations performed by the can feed and liner forming apparatus in lining the cell can, the spindle being viewed from the front in Figure 19, from the top in Figure 20, and from the side in Figure 21.

III. CELL LOADING APPARATUS (STATIONS 3, 4 AND 5)

A. Cell loading table

Figure 22 is a plan view of the revoluble cell loader table to which cells are transferred from the can feed and liner forming apparatus, the mechanism comprising stations 3, 4 and 5 which are located around the periphery of the table. These are omitted from Figure 22 for the purpose of simplifying the drawing.

Figure 23:
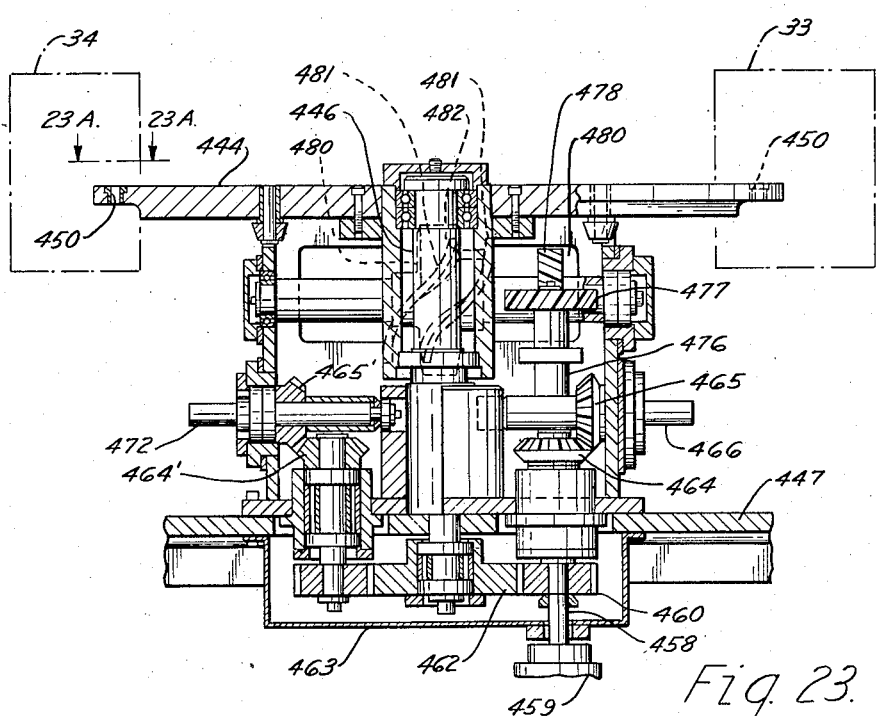

Figure 23 is a transverse section of the cell loader table taken on the line 23—23 of Figure 22.

Figure 23A:
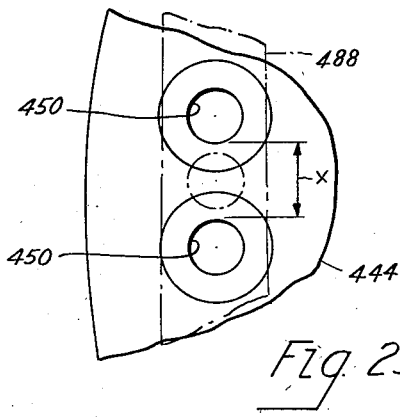

Figure 23A is a greatly enlarged fragmentary plan view of cell can holes in the loader table, taken on line 23A—23A of Figure 23.

Figure 24:
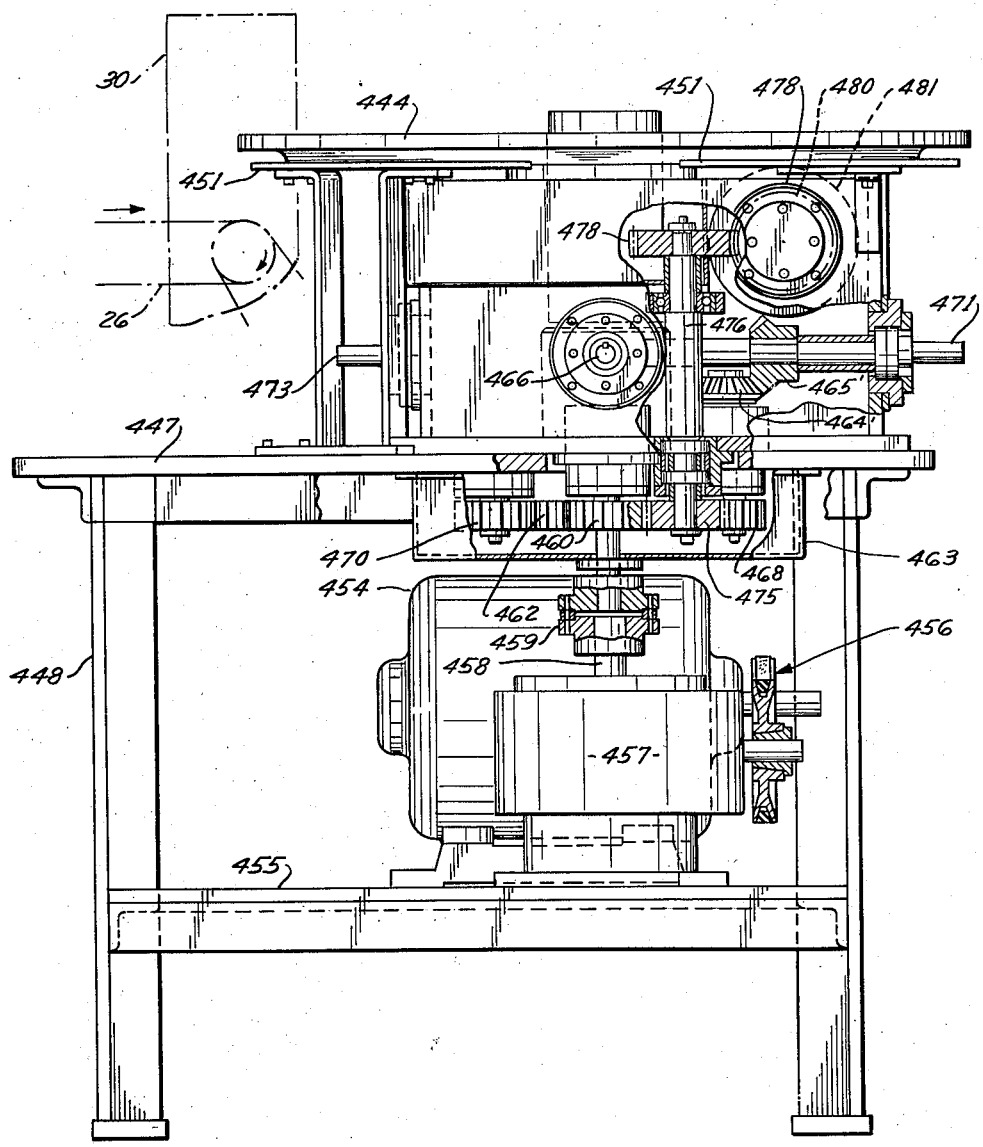

Figure 24 is an elevation of the cell loader table with certain parts broken away to show the details of construction, the view being taken on line 24—24 of Figure 22.

B. Bottom disc punching and inserting mechanism

Figure 25:
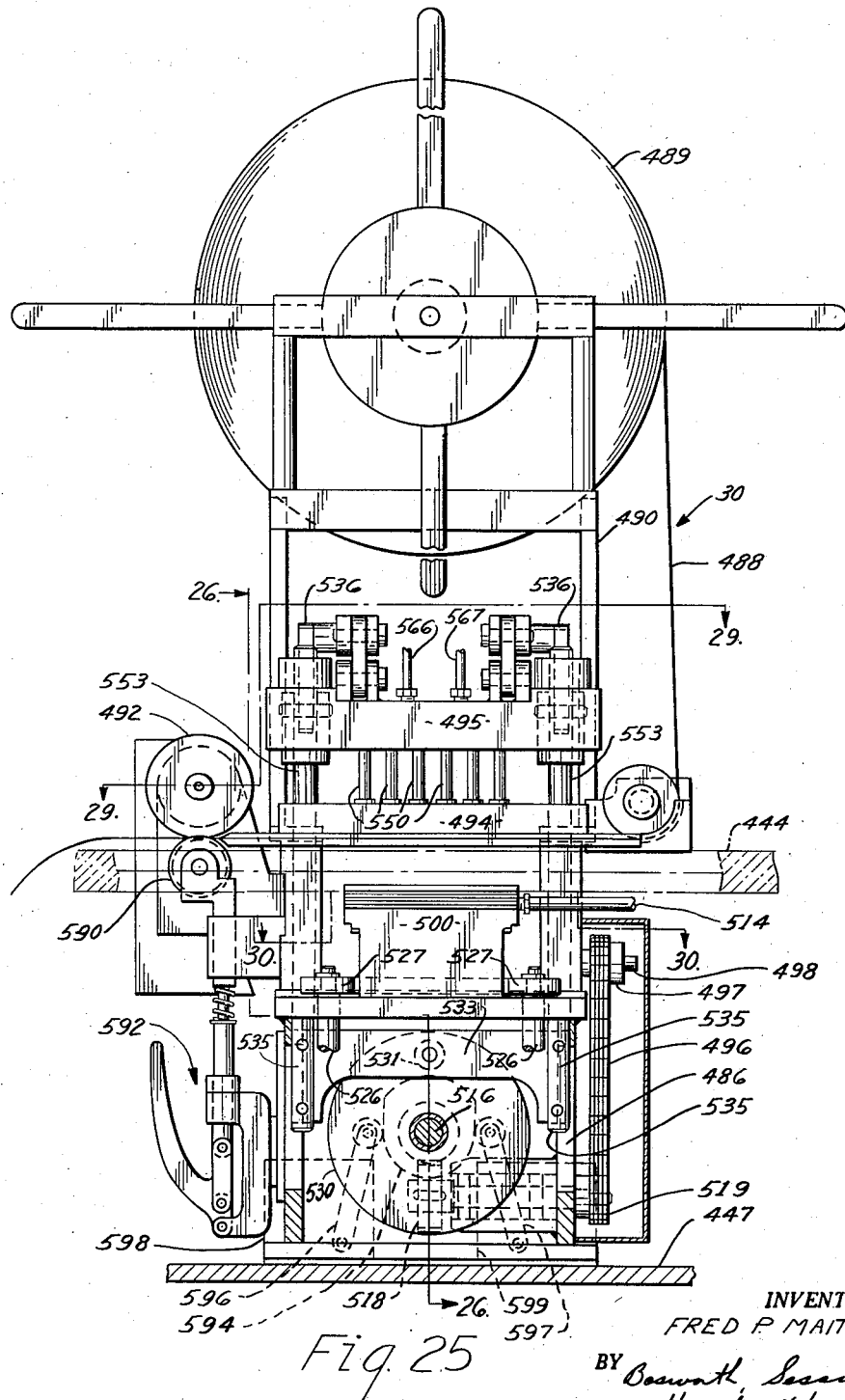
Figure 26:
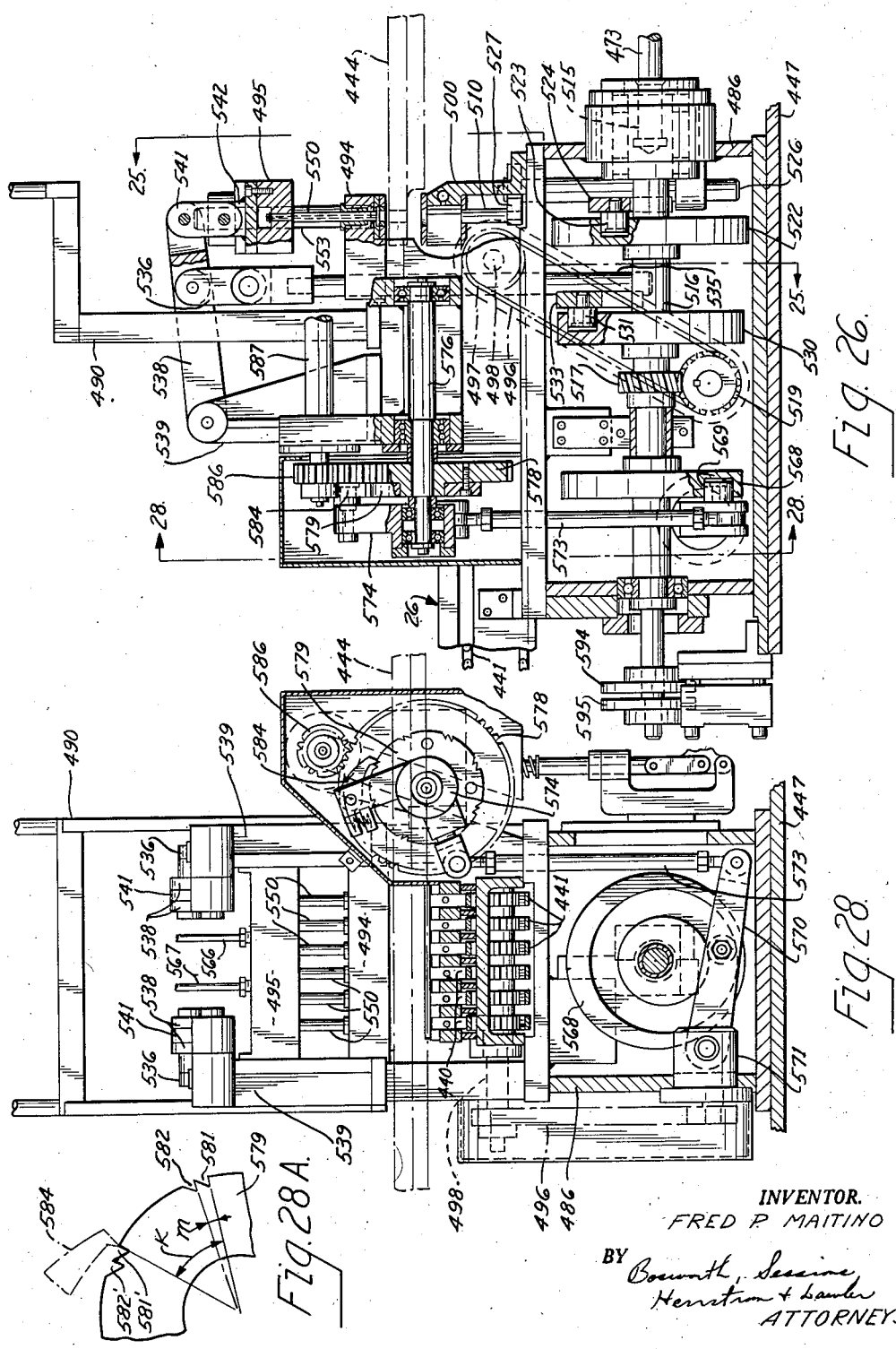

Figure 25 is a front elevational view of the bottom disc and punch insert mechanism, the view being taken along the radius of the cell loader table, looking outwardly toward the periphery of the table and along the line 25—25 of Figure 26.

Figure 26 is a side view partly in section of the bottom disc punch mechanism, the view being taken on the line 26—26 of Figure 25.

Figure 27:
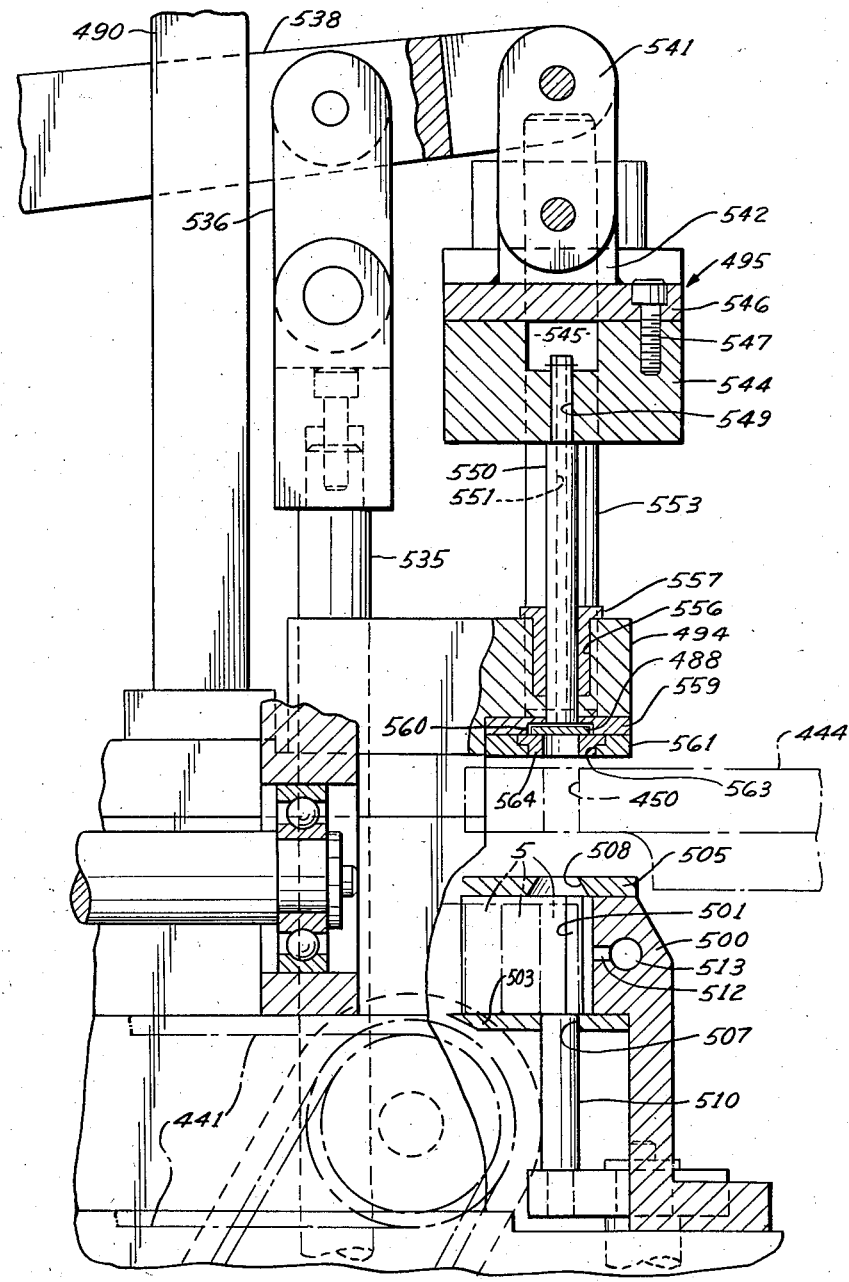

Figure 27 is a greatly enlarged portion of Figure 26 showing the details of disc punching dies and the cell lift rods.

Figure 28 is a section of the bottom disc punch machine and the cell conveyor taken on the line 28—28 of Figure 26.

Figure 28A is a greatly enlarged fragmentary view of the paper feed indexing ratchet wheel.

Figure 29 is a plan view partly in section of the bottom disc punch mechanism taken on line 29—29 of Figure 25.

Figure 30 is a horizontal section of the machine showing the end of the conveyor and the cell seats of the bottom disc punch mechanism taken on the line 30—30 of Figure 25.

C. Bobbin pack and local mechanism (Station 4)

Figure 31 is an elevation partly in section of the bobbin pack and load machine showing the cell mix feed mechanism and the bobbin forming and inserting apparatus.

Figure 32 is a transverse section showing the slide connection between the feed piston drive motor and the base and taken on line 32—32 of Figure 31.

Figures 33, 34, 35:
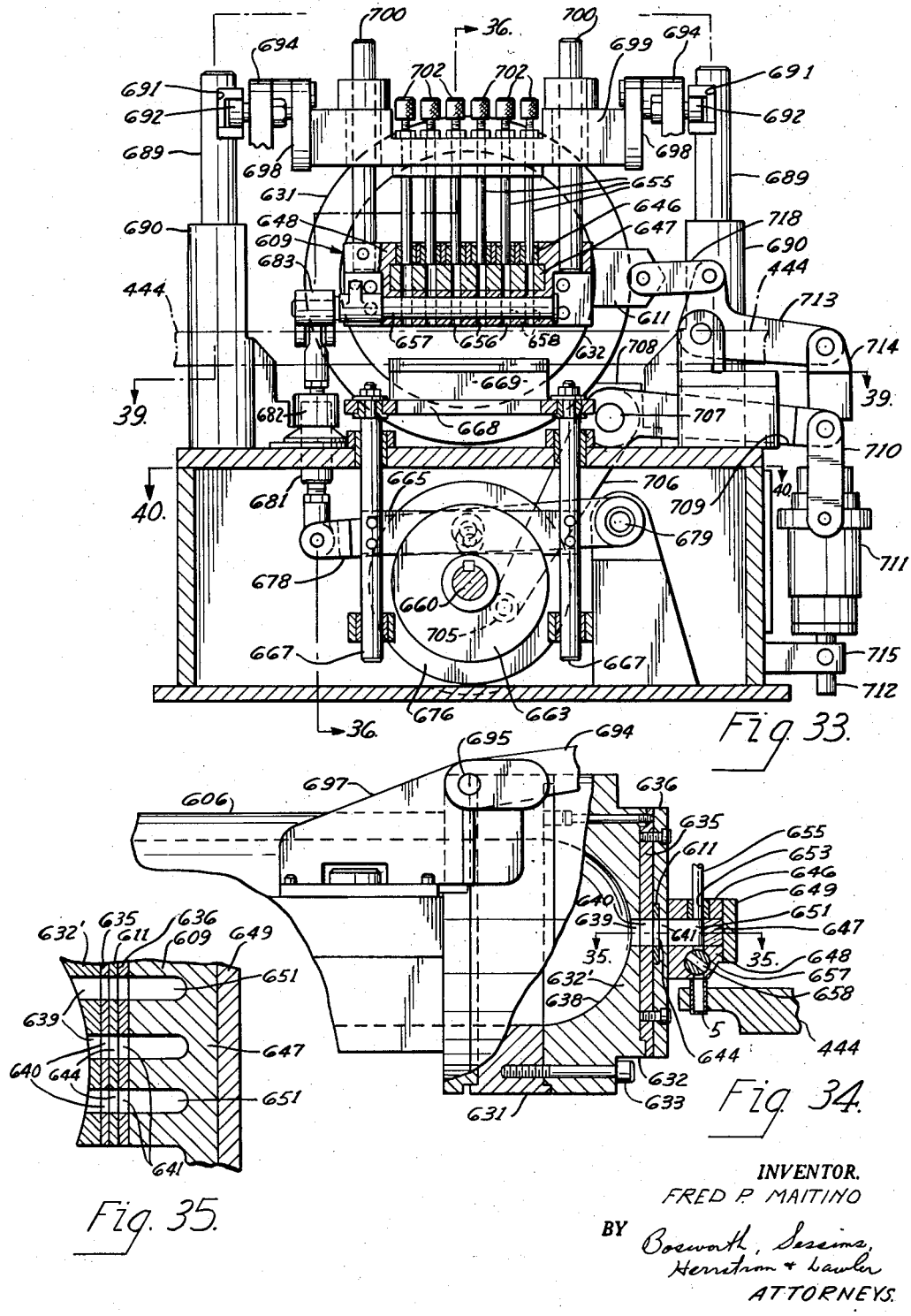

Figure 33 is an enlarged partly sectional front view of the cell loader mechanism taken on line 33—33 of Figure 31.

Figure 34 is an enlarged partially sectional elevation of the connection between the mix feed cylinder and the charging head and showing the one of the extrusion passages through which mix is fed into the charging head.

Figure 35 is a greatly enlarged transverse section taken on line 35—35 of Figure 34.

Figure 36:
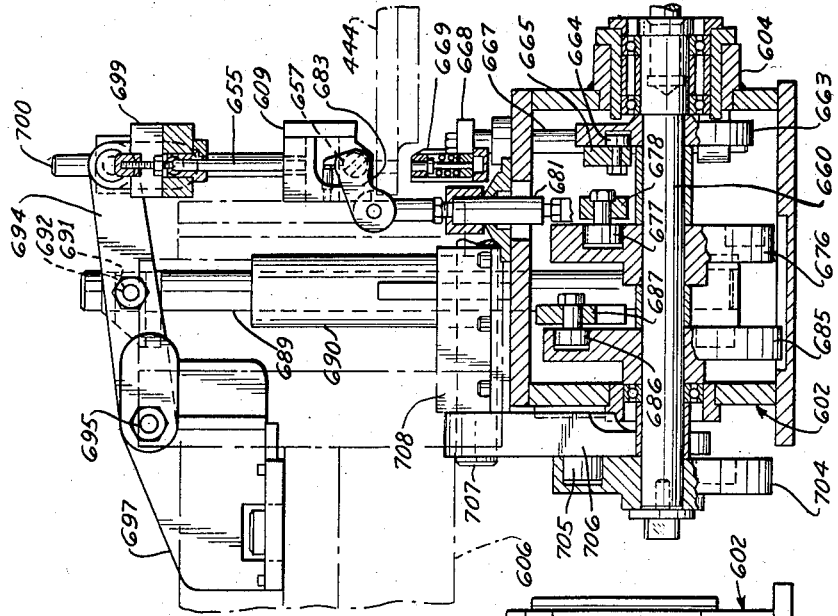

Figure 36 is a section taken on line 36—36 of Figure 33.

Figure 37:
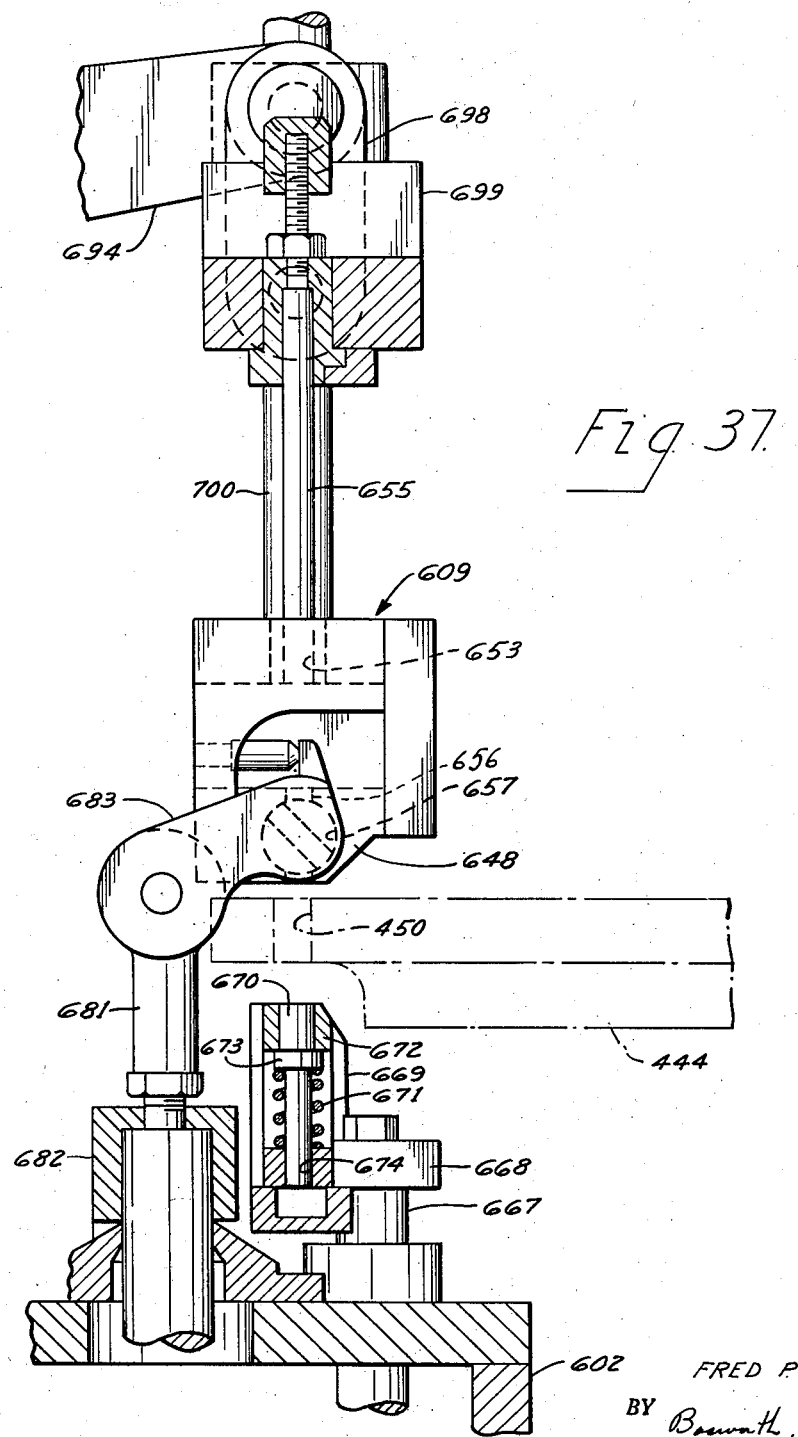

Figure 37 is a greatly enlarged portion of Figure 36 showing details of the bobbin feed plungers, the charging head and the cell lift mechanism.

Figure 38:
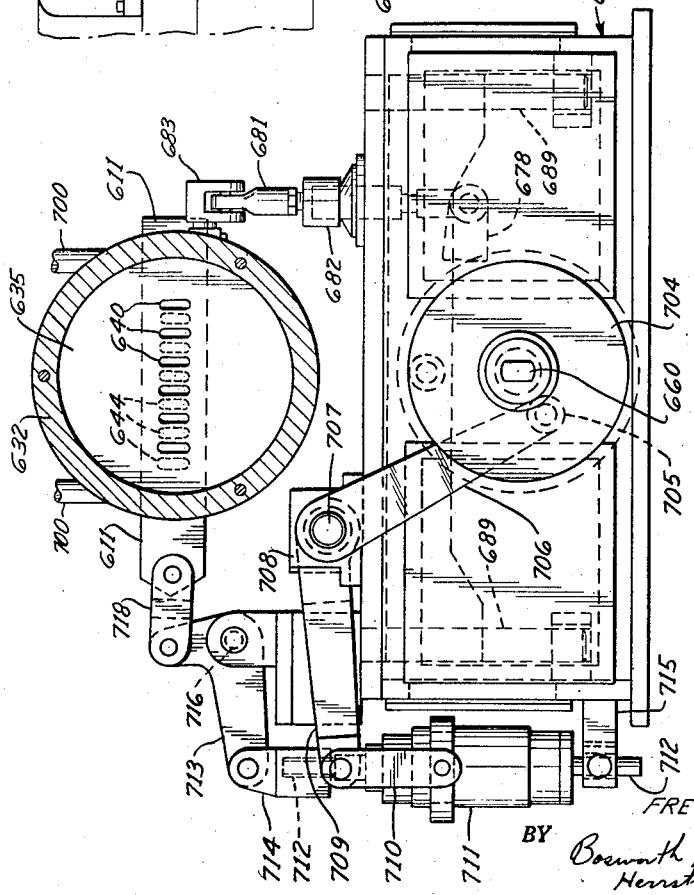

Figure 38 is an enlarged transverse section taken on line 38—38 of Figure 31.

Figure 39:
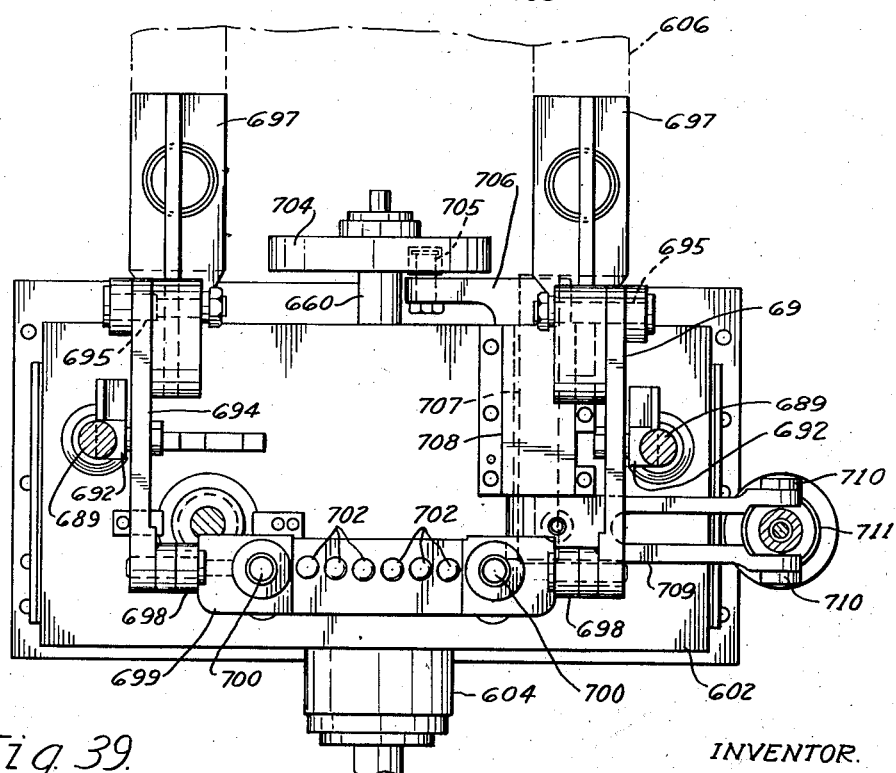

Figure 39 is a transverse section taken on line 39—39 of Figure 33.

Figure 40:
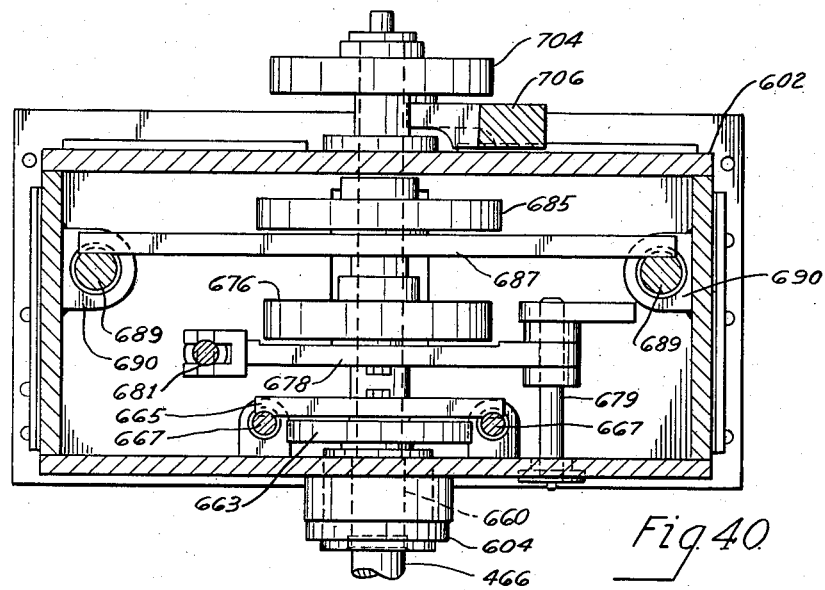

Figure 40 is a transverse section taken on line 40—40 of Figure 33 and showing the arrangement of cams in the cam housing.

D. Mix washer punch and insert mechanism (Station 5)

Figure 41:
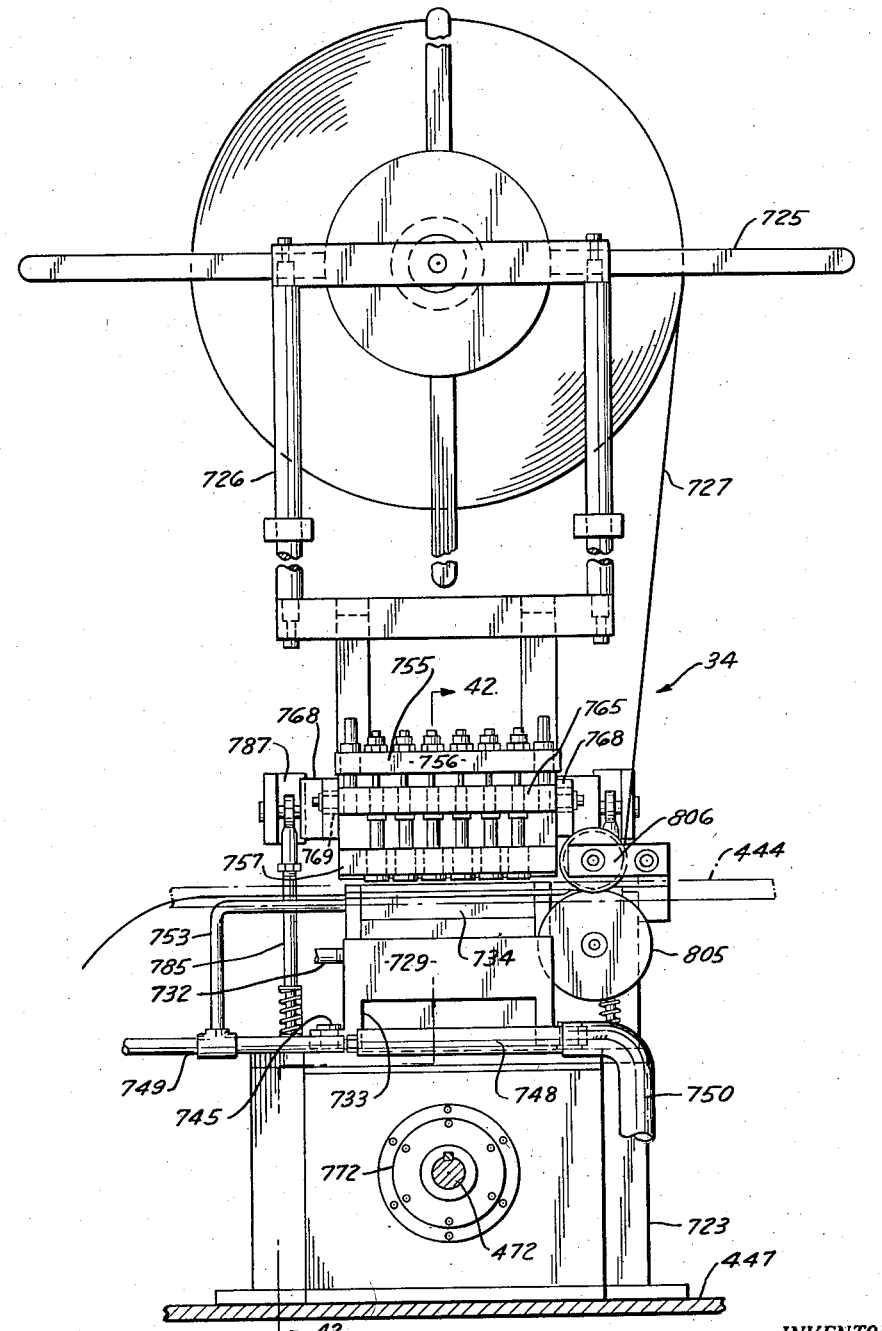

Figure 41 is a front elevation of the mix washer punch and insert mechanism as viewed radially outwardly from the center of the cell loader table.

Figure 42:
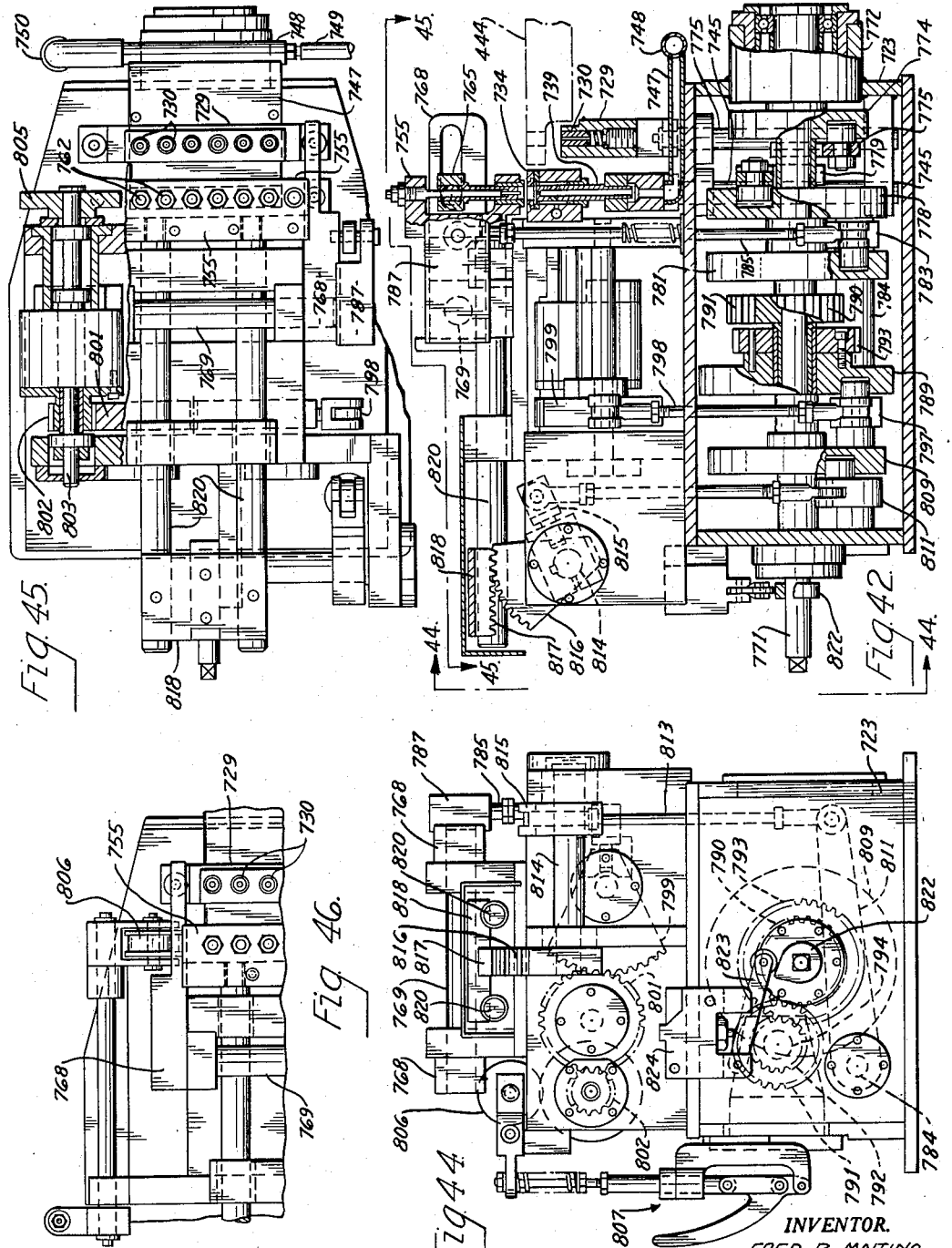

Figure 42 is a section taken on line 42—42 of Figure 41 with some of the parts with the lower housing broken away to show the details of construction.

Figure 43:
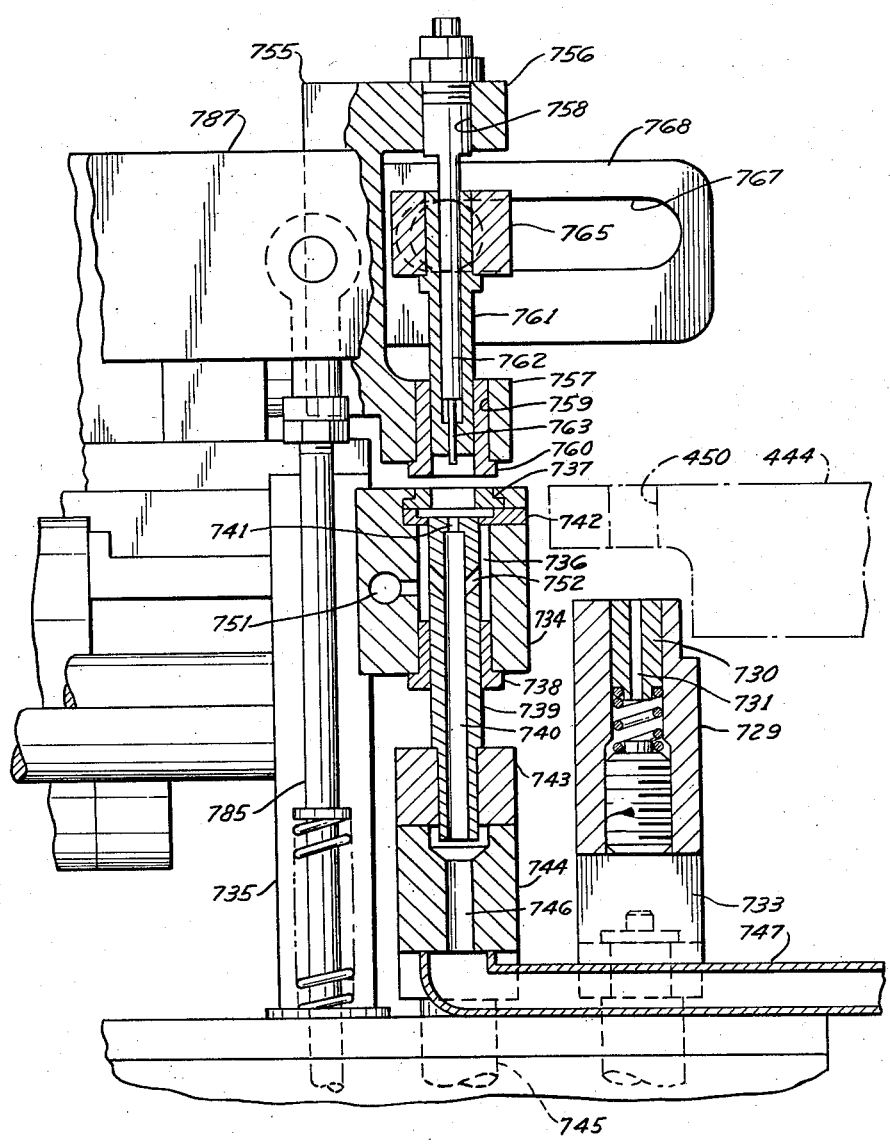

Figure 43 is a greatly enlarged portion of Figure 42 showing details of the washer punching and inserting mechanism and the cell lift plate.

Figure 44 is an end view of the machine taken along line 44—44 of Figure 42.

Figure 45 is a top plan view, partially broken away, of the machine as viewed on line 45—45 of Figure 42.

Figure 46 is a fragmentary plan view of the machine showing the feed roll mechanism for advancing tape through the machine.

Figure 47 is a plan view, partially broken away, of the conveyor which transfers cells from the cell loading table to the cell combine table.

Figure 48 is a section taken on line 48—48 of Figure 47.

IV. CELL COMBINE TABLE

A. Cell inserter

Figure 49 is a longitudinal section of the mechanism which receives cell cans from the conveyor and inserts the cans on the cell combine table.

Figure 50 is a front view of the cell inserter mechanism as viewed on line 50—50 of Figure 49.

B. Carbon insert mechanism

Figure 51 is a front view of the carbon inserter mechanism as viewed from the center of the cell combine table along the line 51—51 of Figure 52.

Figure 52 is a vertical section taken on line 52—52 of Figure 51.

Figure 53 is a greatly enlarged sectional view of the revoluble magazine comprising a part of the carbon inserting machine.

Figure 54 is a vertical section showing the details of the carbon supply hopper box and means for feeding carbons from it, the section being taken on line 54—54 of Figure 52.

Figure 54A is a greatly enlarged fragmentary section of the carbon aligning block at the bottom of the hopper box.

Figure 55 is a vertical section taken on line 55—55 of Figure 52.

Figure 56 is a horizontal section taken on line 56—56 of Figure 52.

C. Liner folding mechanism

Figure 57 is a plan view of the liner folding mechanism.

Figure 58 is an elevation partially in section of the liner folding mechanism taken on line 58—58 of Figure 57.

Figure 59 is a front view of the mechanism taken on line 59—59 of Figure 58.

Figure 60 is a greatly enlarged central section of the collet mechanism and liner folder head in the starting positions.

Figure 61 is a section of the collet mechanism showing the collet in the raised position for engaging and spinning the cell cam.

Figures 62 and 63 are schematic sectional views of the cell can and folder die showing the liner folding operation.

D. Seal insert and can spin mechanism (stations 9 and 10)

Figure 64 is a central vertical section of the seal insert and can spin mechanism.

Figure 65 is a transverse section of the seal feed track taken on line 65—65 of Figure 64.

Figure 66 is an enlarged elevation partially in section of the seal which seals the top of the cell can.

Figure 67 is an enlarged section of the seal pickup and insert head, the can crimping die roll, and the can steady rolls.

Figure 68 is a greatly magnified schematic view of the die roll showing the contour of the roll and the manner in which the top of the can is crimped to lock the seal in the can.

Figure 69 is an enlarged fragmentary section of the top of the sealed cell can.

Figure 70:
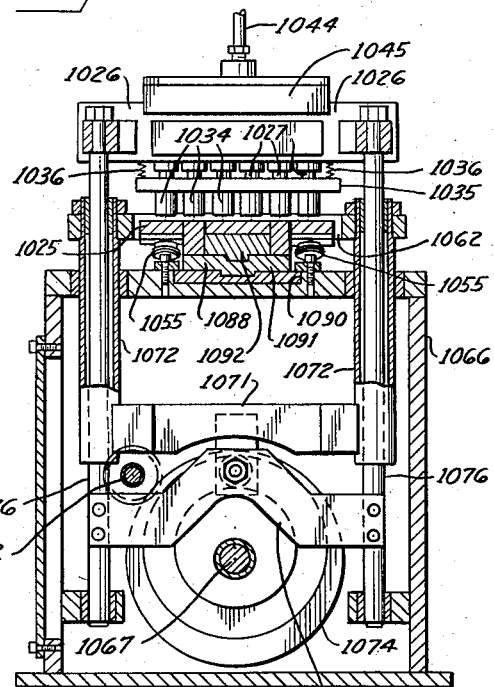

Figure 70 is a vertical section taken on line 70—70 of Figure 64.

Figure 71:
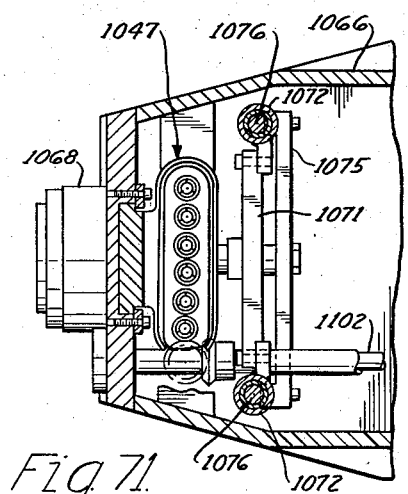

Figure 71 is a horizontal section taken on line 71—71 of Figure 64.

Figure 72:
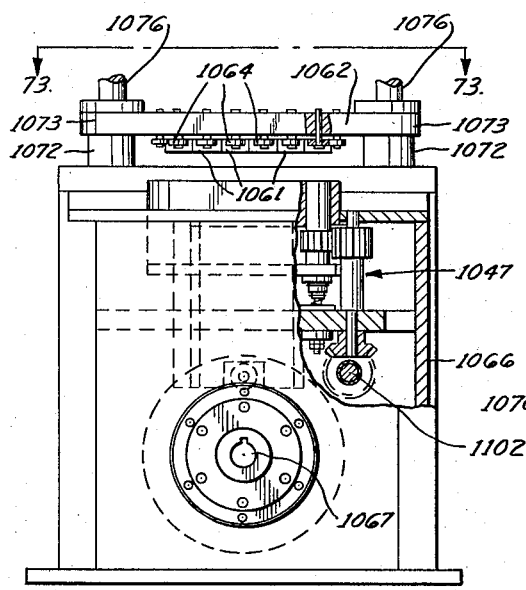

Figure 72 is a front view, partially broken away, of the lower portion of the machine taken on line 72—72 of Figure 64.

Figure 73:
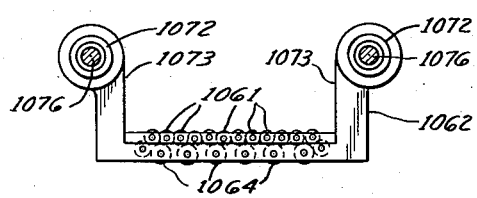

Figure 73 is a top view of the steady roll bar as viewed on the line 73—73 of Figure 72, the other parts of the machine having been omitted from this figure.

Figure 74 is a vertical section taken on line 74—74 of Figure 64.

E. Electrode cap placing mechanism (station 11)

Figure 75 is a central vertical section through the cap placing mechanism showing the hopper, the cap placing mechanism, and the cams for operation thereof.

Figure 76:
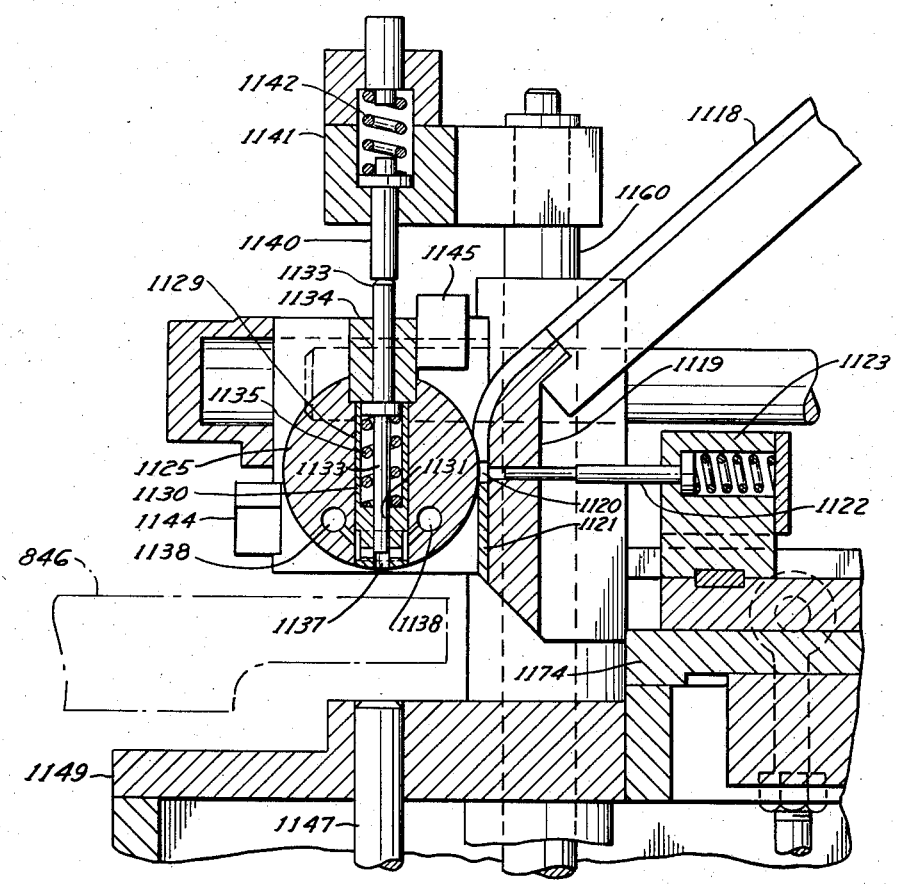

Figure 76 is an enlargment of part of Figure 75 showing the cap feeding inverting and ejecting mechanism.

Figure 77 is a front view partially in section of the cap placing mechanism as viewed on line 77—77 of Figure 75.

Figure 78 is an enlarged sectional view of the cap after it has been placed on top of the carbon electrode.

F. Negative terminal solder mechanism (station 12)

Figure 79 is a central vertical section of the negative terminal solder mechanism taken on line 79—79 of Figure 80.

Figure 80 is a front elevation of the mechanism viewed on line 80—80 of Figure 79.

Figure 81 is a rear elevation, partly in section, of the mechanism taken on the line 81—81 of Figure 79.

Figure 82 is a plan view partially in section taken on line 82—82 of Figure 79.

Figure 83 is an enlarged sectional view of a portion of Figure 79 showing the wire guide unit and the shear housing.

Figure 84 is a vertical section showing the connection of the shear blade actuating link to the shear housing lift rod, taken on line 84—84 of Figure 79.

Figure 85 is a fragmentary bottom view of the shear blade as viewed on line 85—85 of Figure 80.

Figure 86 is an enlarged vertical section showing the clamp screw actuating lever and the electric contact rotor, and taken on line 86—86 of Figure 82.

Figure 87 is a horizontal section of the wire gripping jaws taken on line 87—87 of Figure 79.

Figures 88 and 89 are schematic front views of part of the shear housing and gripping jaws illustrating the sequence of operations in shearing and forming the negative terminal wire.

Figure 90 is a schematic elevation of the gripping jaws and the electric soldering contact in the soldering position.

G. Cell wrapping and unloading mechanism (station 13)

Figure 92:
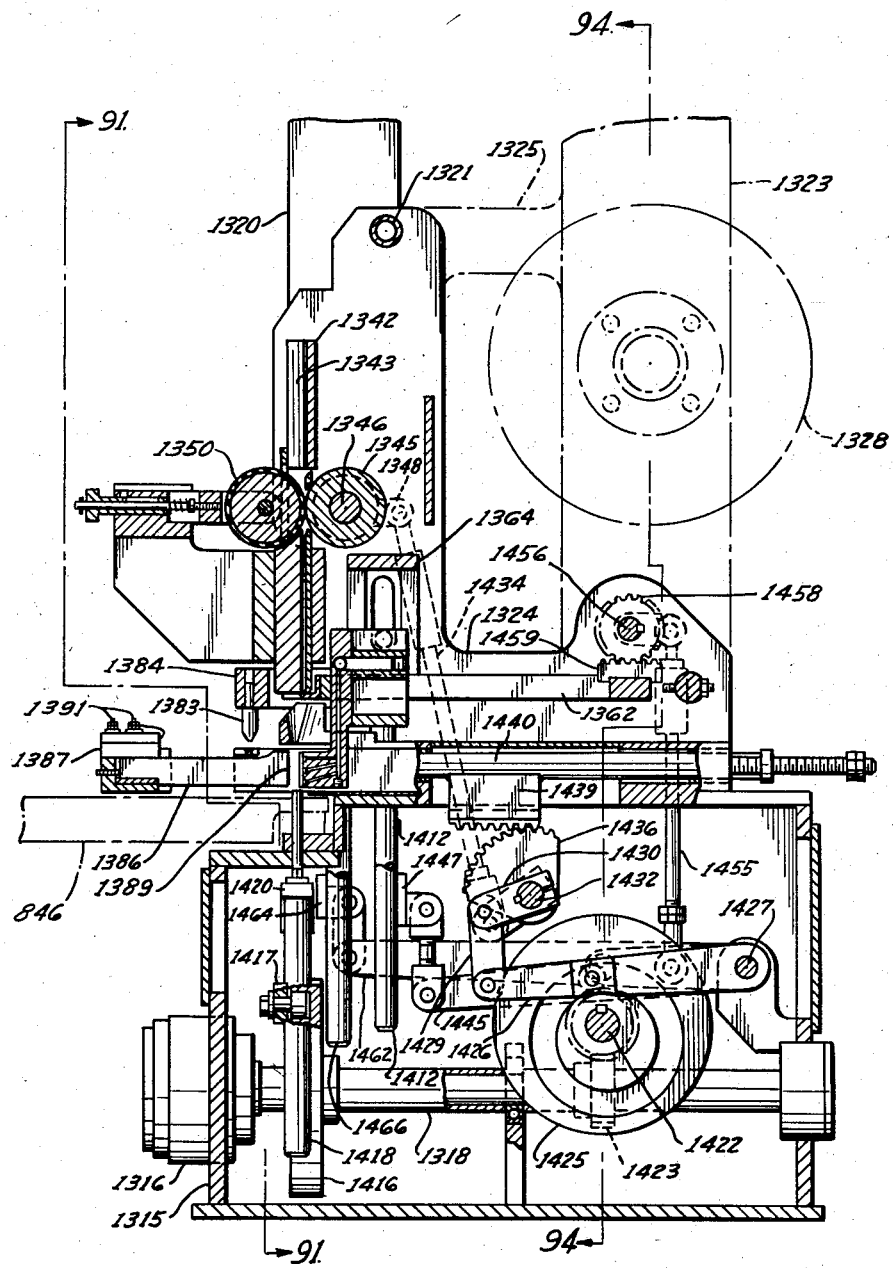

Figure 91 is a front view, partially in section, of the cell wrapping and unloading mechanism as viewed from the center of the revoluble combine plate, the view being taken on line 91—91 of Figure 92.

Figure 92 is a vertical section of the mechanism taken on line 92—92 of Figure 91.

Figure 93:
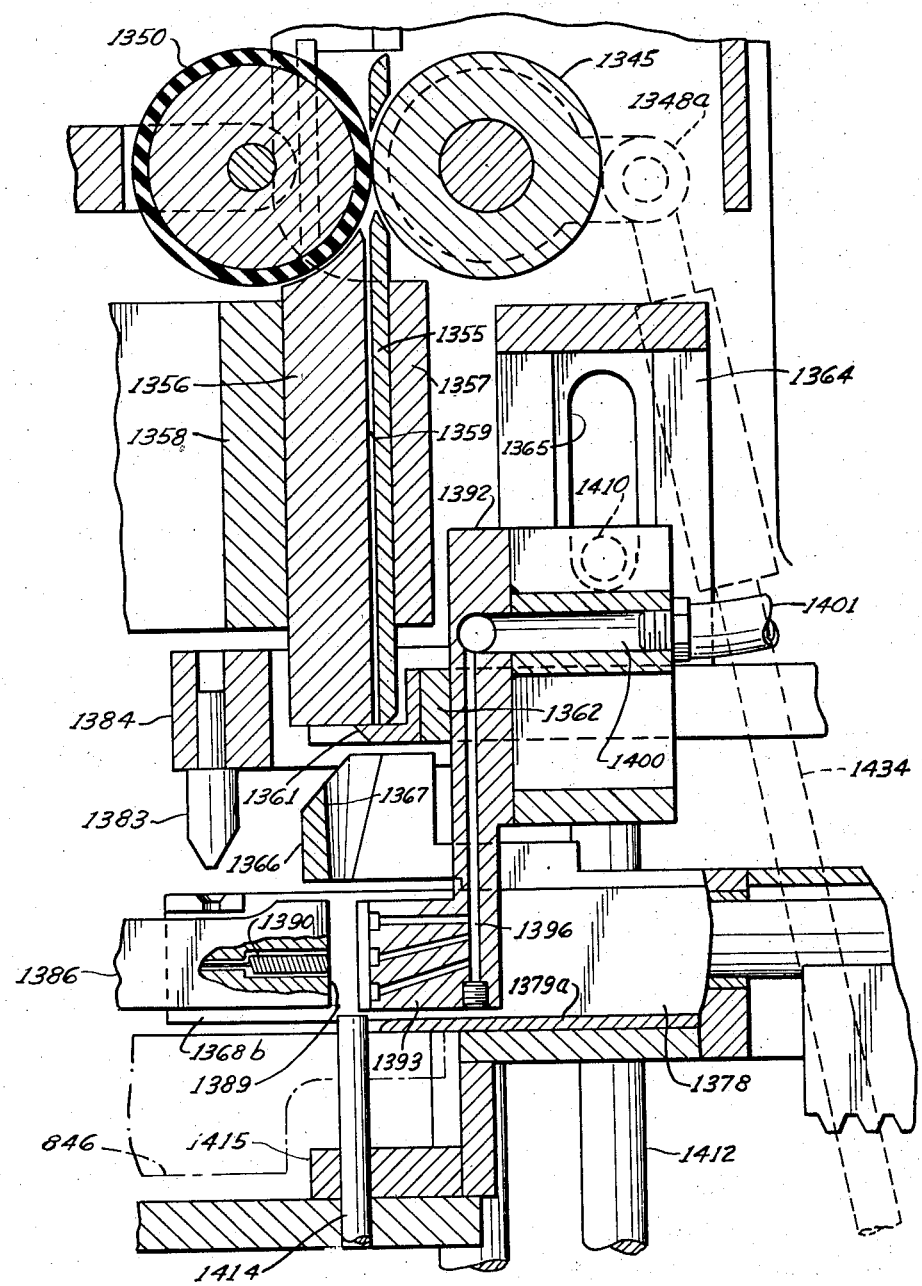

Figure 93 is a greatly enlarged portion of Figure 92 showing details of the parts which form and seal the wrappers around the cell cans.

Figure 94 is a transverse rear fragmentary section of the mechanism taken on line 94—94 of Figure 92.

Figure 95 is a section taken on line 95—95 of Figure 94.

Figure 96:
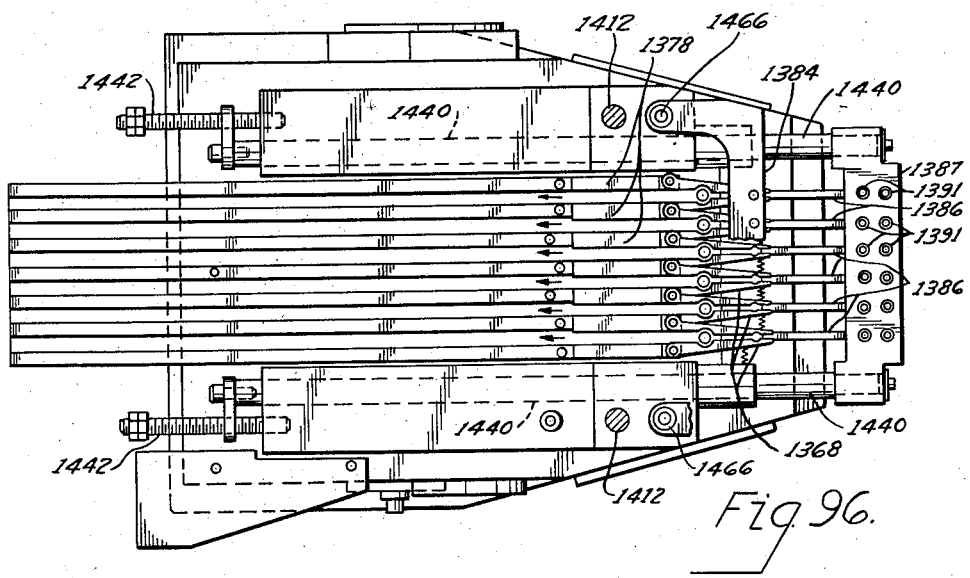
Figure 97:
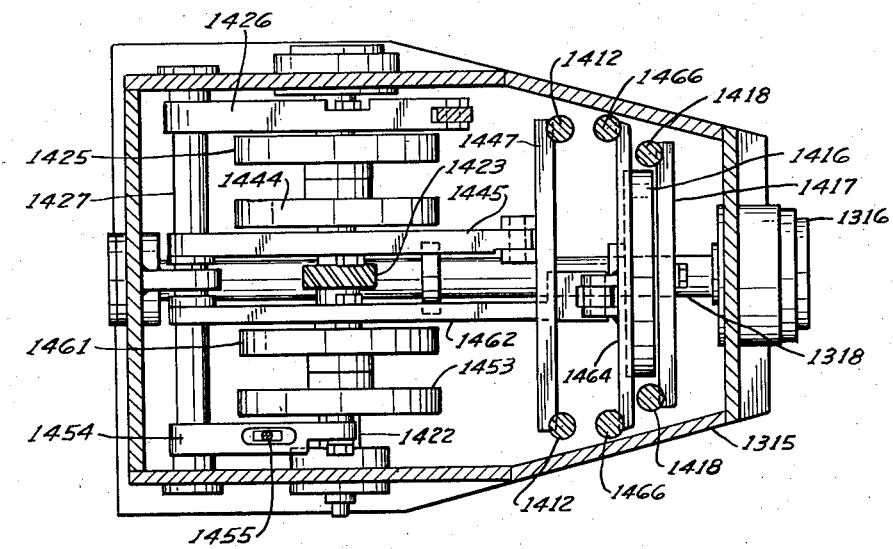

Figures 96 and 97 are horizontal sections of the mechanism taken respectively on lines 96—96 and 97—97 of Figure 95.

Figure 98 is an enlarged plan view of one pair of the wrapper clamp jaws which presses the tubular wrapper around the cell can.

Figure 99 is a vertical section through the clamp jaws taken on line 99—99 of Figure 98.

Figure 100 is a transverse section taken on line 100—100 of Figure 99.

Figure 101 is a schematic drawing showing the progressive shaping of a paper strip into a cell can wrapper in accordance with the invention.

Figure 102 is an operation time chart in block form showing the time relationship of operation of the cell wrapping components of the machine.

I. GENERAL ARRANGEMENT

The present invention is embodied in apparatus for the manufacture of unit electric dry cells for use in batteries or otherwise and contemplates continuous, automatic and rapid production of such cells. Each cell moves successively to a plurality of operating stations which are arranged in series along the path of movement of the cell through the apparatus, and is finally discharged from the apparatus as a completed unit, ready for use. One example of a particular type of dry cell which is produced in accordance with the invention is a 1½ volt cell, commercially known as an "N" cell, generally cylindrical in shape and having a length of about 1⅛" and an outside diameter of approximately 7/16". The cell making apparatus embodying the present invention and illustrated in the drawings and described below is adapted to produce "N" cells of this type although it is understood that other types of cells may be produced without departing from the scope of the invention.

Figure 2:
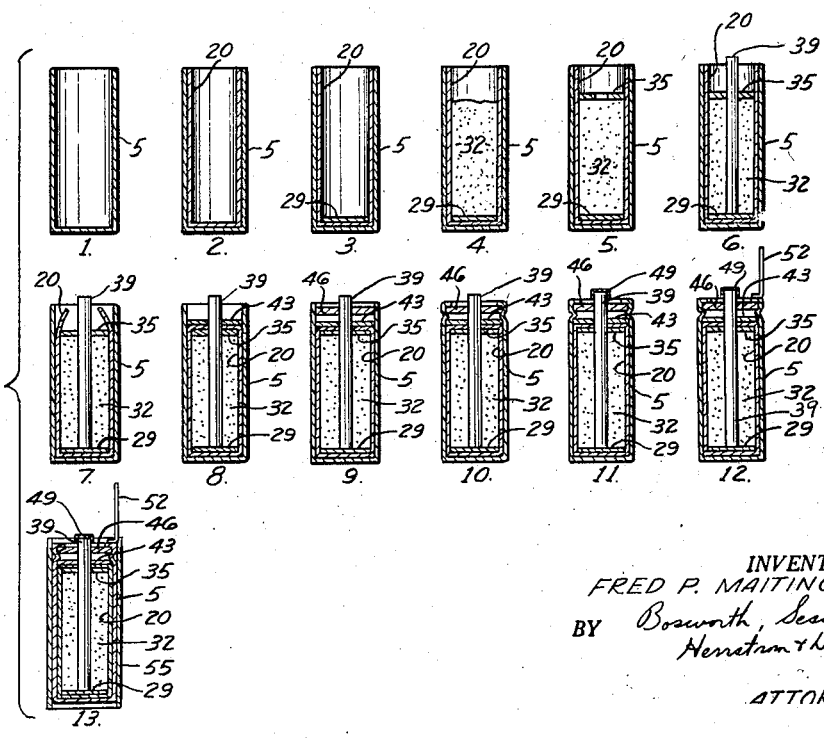
Figure 2 is a series of sectional views of a cell at the various stages of formation in the machine, beginning with the empty cell can and ending with the completed cell, each view being numbered to correspond with the station of the machine at which the particular operation is performed.

The "N" cell comprises an outer shell or can 5, hereinafter called a cell can, made of zinc or zinc or zinc alloy, which moves through the apparatus successively from station to station, pausing at each station for a predetermined interval to permit the performance of the particular operation at the station. The several sections shown in Figure 2 illustrate the sequence of operations performed by the apparatus on each cell in its travel from the first through the thirteenth station, and each section in Figure 2 is identified by a number corresponding to the number of the operating station of the apparatus.

Figure 1:
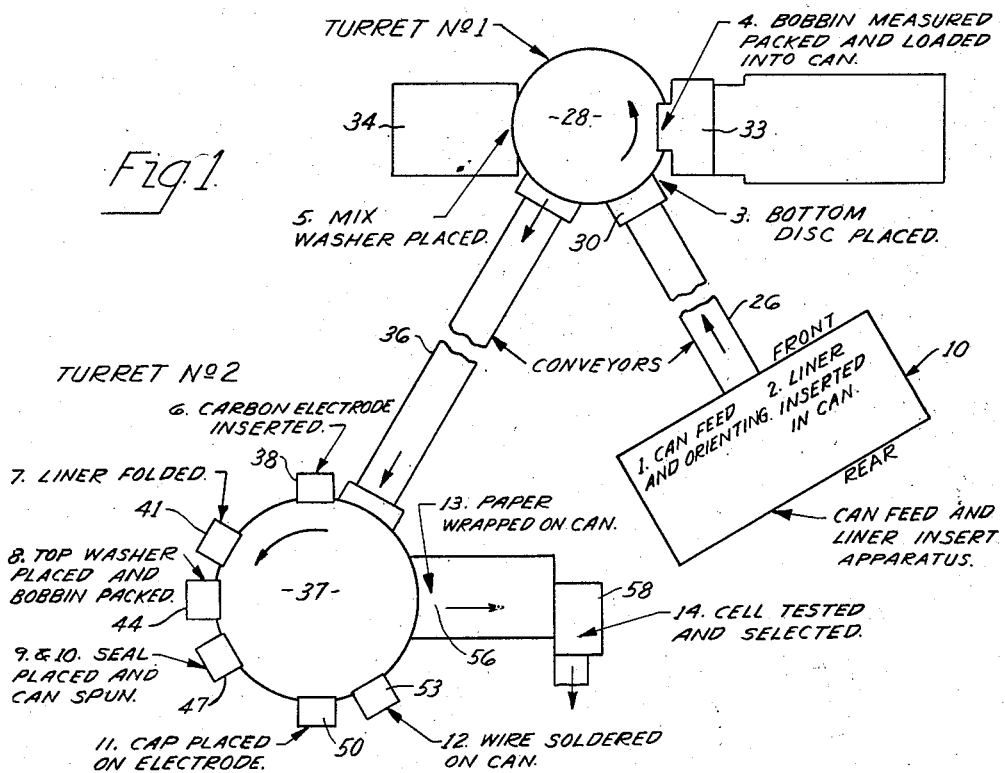
Figure 1 is a schematic diagram of the complete machine showing the several stations and the direction of movement of the cell cans through the machine.

The diagram of the complete apparatus shown in Figure 1 illustrates the general arrangement of the various stations and the cell can conveyors and indexing devices which transfer the can 5 from station to station in the direction of the arrows. Each station in Figure 1 is designated by a title and a number which refers to the order of the operation performed by the station in the sequence of operations and which corresponds to the number of the cell section in Figure 2.

In the preferred embodiment of the invention, a plurality of rows of cell cans are moved together through the apparatus so that several cans are operated upon simultaneously at each station, the apparatus described herein and illustrated in the drawings being capable of handling six cans at a time. It will be understood, however, that the apparatus could be modified to handle a greater or lesser number of cans at one time without departing from the precepts of the invention.

The first and second stations are embodied in the can feed and liner forming apparatus indicated generally at 10 in Figures 3 and 4, and comprising a can feeding and advancing machine 12 and a liner forming machine 13 which are located side by side, connected and driven by the same driving mechanism to insure positive synchronization. The can feeding machine 12 is supplied continuously by a hopper 15 with preformed cylindrical zinc cans 5 which are open at one end and closed at the other as shown in Figure 2 (1). The cans are aligned end to end and pass through an orienting device 16 (see Figures 5 and 5A) which positions the cans so that their open ends face in the same direction. The oriented cans are fed by a positive feed device 17 (see Figure 6) to six vertical magazines 18 which guide the cans in six columns for advancement respectively by six pusher mechanisms of the can feeding machine 12 shown in Figures 7, 8 and 9, toward the liner forming machine 13 to receive paper liners 20 shown in Figure 2 (2).

The liner forming machine (see Figures 10A, 10B and 11-17, inclusive) preforms six liners 20 at a time by cutting predetermined lengths of paper P supplied from rolls R (see Figure 3) and wrapping and folding same on six spindles 22 (see Figures 19-21, inclusive) which are disposed opposite and in axial alignment with can pusher mechanisms, respectively, of can feed machine 12. After the liner has been formed on each spindle, a can is pushed over the liner and spindle, the liner is released from the spindle, and the can with the liner inserted therein is ejected from the spindle into a chute 24 which carries the lined can to a conveyor 26 (see Figures 16 and 21E).

Conveyor 26 is power driven and moves six rows of lined cans, with their open ends up, from the can feed and liner forming apparatus 10 to cell loading apparatus comprising a revoluble circular turret or indexing table 28 (see Figures 1 and 22-24, inclusive) around the periphery of which the machines comprising cell assembly stations 3, 4 and 5 are located. The cans are inserted open ends up and in banks of six into holes located on chords adjacent to the circumferential edge of the table and the table is indexed to rotate intermittently about a vertical axis by an indexing mechanism (see Figure 23) for moving successively each bank of six cans into vertical alignment with the apparatus at the stations spaced around the periphery of the table.

A can inserting and bottom disc punch and transfer mechanism comprises station No. 3 (Figures 25-30, inclusive). This mechanism lifts a bank of six cans 5 from conveyor 26 and inserts them into the locating holes in the indexing table 28 while simultaneously six discs 29 (see Figure 2 (3)) are punched from a paper ribbon and are transferred to the bottom of the lined can. The cans then move to station No. 4 where they are precisely filled with bobbins 32 of manganese dioxide mixture by a bobbin measuring, packing and loading mechanism 33 (see Figures 31- 40, inclusive). Station No. 5 comprises a mix washer punch and insert machine 34 (see Figures 41-46, inclusive) which forms and inserts a perforate washer 35 within each can on top of the mix-bobbin 32 (see Figure 2 (5)). The bank of six cell cans is then ejected from table 28 and is carried by a six row conveyor 36 (see Figures 47 and 48) similar to the conveyor 26, to cell combine apparatus having an indexing turret or table 37 similar to table 28 and with peripheral cell locating holes. Stations Nos. 6 to 13, inclusive, are spaced around the periphery of table 37 which is indexed to rotate intermittently to transfer the cell cans successively from station to station in the same manner as table 28. The cans are inserted into the cell receiving holes in table 37 (see Figures 49 and 50), the table indexes, and the cans move into alignment with a carbon electrode insert mechanism 38 (see Figures 51-56, inclusive), comprising station No. 6. This mechanism inserts a carbon electrode 39 through mix washer 35 into the mix 32 in each can and pushes the electrode against the disc and the liner on the bottom of the can as shown in Figure 2 (6). The upper end of the electrode extends slightly above the top of the can.

At station No. 7, the top portion of liner 20 is folded inwardly by liner folding mechanism 41 (see Figures 2 (7) and 57-63, inclusive) and thereafter, at station No. 8, a perforate top washer 43 is inserted over the carbon electrode and is pressed tightly against the folded end of the liner (see Figure 2 (8)) by a top washer punching and inserting machine generally indicated at 44 shown in Figure 1. This machine, which is substantially the same in structure and operation as mix washer machine 34 (station No. 5), also tightly packs the mix-bobbin 32 within the cell can and against the carbon electrode 39.

Station Nos. 9 and 10 are located at the same place on the circumference of table 37 and seal the cans with a mechanical plastic seal 46 (see Figure 2(9)) which is placed within the top of the can by the seal sorting, inserting and spinning machine 47 (see Figures 64-74, inclusive) and the upper end of the can is spun in and over (see Figure 2(10)) to securely hold the seal 46 in position. At station No. 11, a metallic cap 49 (see Figure 2(11)) is pressed over the exposed end of the carbon electrode 39 by a cap placing machine 50 shown in Figures 75-78, inclusive. In event several cells are to be electrically connected together to form a battery, a negative terminal wire 52 (see Figure 2(12)) is soldered on the upper end of each can by a soldering machine 53 (see Figures 79-90, inclusive) which comprises station No. 12. If the cells produced are not to be so interconnected, station No. 12 is not operated.

An external wrapper 55 (see Figure 2(13)) is fed, cut, formed and lowered into position around the cell can at station No. 13 by the wrapping, hot sealing and ejecting mechanism 56 illustrated in detail in Figures 91-102, inclusive. The wrapper 55 insulates and protects the side of the cell can and may be printed or otherwise marked to form a label if the cell is to be sold or used as a unitary product. During the wrapping operation, the cells are lifted out of the locating holes in the indexing table and are inserted into the pre-formed wrapper, the overlapping wrapper joint is hot sealed and the cells are ejected through the rear of the mechanism 56 and away from indexing table 37. This completes the assembly of the dry cell.

The completed cells move from table 37 to a cell testing and selecting apparatus constituting station No. 14 and generally indicated at 58 in Figure 1. This apparatus is not a part of the present invention and therefore is not otherwise described herein. The apparatus 58 tests the voltage of each cell and automatically rejects sub-standard cells while permitting acceptable cells to pass.

It is noted that the several stations at which the foregoing operations are performed are arranged preferably in three groups, each group being connected to the following group by an elongated conveyor. Thus, stations 1 and 2 comprise one group, stations 3–5, inclusive, the second group, and stations 6–13, inclusive, the third group. Each of the three groups of stations are operated by independent drive means so that operation of any one of the three groups of stations may be interrupted without stopping operation of the other groups. This flexibility of operation of the entire apparatus is facilitated by the cell can storage capacity of the elongated straight line conveyors 26 and 36 which, during normal operation of the apparatus, are about half filled with partially completed cell cans; that is, the rows of cell cans on the conveyors normally are approximately half the length of the conveyor. For example, if group I, comprising stations 1 and 2, is shut down temporarily, conveyor 26 continues to supply the second group of stations with cell cans stored on the conveyor until the supply is exhausted. If the shut-down of the group I stations is of short duration, as for example, to permit removal of a defective or jammed cell can from the line, the supply of cell cans on the conveyor is adequate to permit continued operation of the groups II and III stations until the stations of group I are again placed in operation. The speed of operation of group I stations may then be increased temporarily until the supply of cans on the conveyor is replenished. In this manner, discharge of completed cells at the end of the line is continuous in spite of limited shut down of one group of stations, and loss of production under such conditions is eliminated.

The same principle of utilizing cell can storage capacity of conveyor 36 is employed to insure continuous operation of either group II or group III stations when the other group is temporarily shut down. In event operation of group III stations is stopped, group II stations continue to add cell cans to conveyor 36 for a time limited only by the storage capacity of the conveyor. When group III stations are again started, their operation may be speeded up temporarily to deplete the excess of cans on the conveyor caused by the temporary shut down.

II. CAN FEED AND LINER APPARATUS (STATIONS 1 AND 2)

The can feeder and liner apparatus 10 comprises a can feeding and advancing machine 12 and a liner forming and inserting machine 13 (see Figures 3 and 4) which are located side by side and which operate in synchronism with each other. The can feed machine 12 continuously moves empty cell cans 5 to positions in alignment with the six spindles 22 on the liner forming machine 13 and operates to advance the cans 5, six at a time, over the spindles on which the cell liners 13 have been formed.

For the sake of clearness and consistency of terms used in the following description, the side of the apparatus 10 from which the conveyor 26 extends will be described as the "front" side (see Figure 1) and the opposite side will be termed the "rear" side. Figure 3, therefore, is a view of the front side of the apparatus, and the can feeding machine 12 is located in front of the liner forming machine 13, to the right as viewed in Figure 4. The directions in which certain components of these machines move likewise will be designated as "forward" and "rearward," as the case may be, the forward direction being to the right and the rearward direction to the left as viewed in Figure 4.

The liner forming machine 13 comprises six substantially identical stations which receive liner paper P fed from supply rolls R supported on the machine. The paper is fed continuously by paper feed mechanism (see Figures 10A, 11 and 12) to the spindle 22 of each station, is cut to proper liner length, and is wound and folded around the spindle and over the end of the spindle. The can feed machine 12 then advances the bank of six cans over the liner wrapped spindles, the liners are transferred from the spindles to the cans, and the lined cans are ejected from the spindles and drop through chutes 24 to a conveyor 26 which carries them to the next operating station.

The can feeding machine 12 and the liner forming machine 13 are mounted on a common base frame 61 (see Figures 3 and 4) comprising a base plate 62, end uprights 63 extending vertically from the base plate, and a top plate 64 on which the can feed machine 12 and liner forming machine 13 are supported. A main drive motor 65 and a speed reducer 66 are mounted on a shelf plate 67 within the base frame and furnish power through a sprocket and chain drive 69 for driving the operating mechanism of the can feed machine 12 and liner forming machine 13.

A. Can feeding and advancing mechanism

Cylindrical zinc cell cans 5, preformed with one end open and the other end closed, are supplied to the can feeding mechanism 12 from a hopper 15 (see Figures 4 and 5) located above and to one side of the apparatus. A centrifugal feeder 71 below hopper 15 receives a fresh supply of cell cans as demanded by the machine from the hopper and, by the rotation of plate 73 at the bottom of the feeder, moves the cans one at a time into a tangential feed channel 72 formed in a plate 74 extending downwardly from the feeder. The feed channel serves to guide the cans downwardly from the feeder in end to end axially aligned relationship. Automatic replenishment of cans in feeder 71 is initiated by a can level control switch 75 which energizes vibrator 76 on the supply hopper 15 whenever the level of cans in the feeder falls below a certain minimum and turns the vibrator off when the feeder has been filled.

The cell cans 5 must be positioned or oriented by the can feeding machine 12 with the open ends of all cans facing in the same direction in order that cans can be advanced over the preformed liners on the liner forming machine 13. This orienting of the cell cans is accomplished by an orienting mechanism 77 (see Figures 5 and 5A), located in series with feed channel 72 below centrifugal feeder 71. This mechanism comprises a stationary disc 78 and a ring 79 on the circumference of the disc 78 and arranged to be rotated continuously by a motor, not shown, about the axis of the disc in a clockwise direction as viewed in Figure 5 and within a generally circular recess 80 in plate 74. Projecting from the ring are a plurality of circumferentially spaced hooks 81, the spacing between adjacent hooks being slightly larger than the length of a cell can. Radial vacuum apertures 82 are formed in ring 79 midway between adjacent hooks and, during a portion of the revolution of the ring around the disc 78, become aligned successively with and overlie a peripheral groove 83 of predetermined length on the periphery of the disc. Vacuum hose 85 connected to a source of vacuum communicates with disc groove 83 through radial disc passage 86 and applies a vacuum to each aperture 82 in ring 79 that overlies disc groove 83.

The circular recess 80 in which ring 79 rotates is enlarged along the right side of the ring, as viewed in Figure 5, and defines an orienting chamber 88. Feed channel intersects the upper end of chamber 88, generally on a tangent, to ring 79 and each of the cans falling from feed channel 72 engages one of the upwardly extending hooks 81 on the continuously rotating ring 79. The upper end of groove 83 in disc 78 is located adjacent to the point of intersection of feed channel 72 with orienting chamber 88 so that the instant a can engages a hook 81, the vacuum aperture 82 above that hook overlies the upper end of disc groove 83 and causes the can to be drawn against the periphery of the ring by the vacuum communicated to the aperture. The lower end of disc groove 83 is located slightly below the axis if rotation of the ring, and vacuum to each aperture 82 is cut off when the aperture passes that end of the groove. The can is released at that moment and falls by gravity from the ring into a discharge channel 90. A blast of air from a nozzle 91 located adjacent to the ring at the can drop-off point is directed against the can to insure a quick and positive disengagement of the can from the ring.

The operation of the orienting mechanism will be understood by reference to Figure 5A. The cans continuously pass through feed channel 72 in random end to end relation. As a can emerges from channel 72 with its closed end facing down as indicated at $d^1$ in Figure 5A the closed end of the can engages and rests on the top of the hook 81 immediately underlying channel 72 and thereafter is drawn by the vacuum in the adjacent ring aperture 82 against the periphery of ring 79. The can indicated at $d^2$ is carried by the rotating ring below the axis of rotation, and, when the vacuum to aperture 82 is cut off by the movement of the aperture beyond the lower end of disc groove 83, this can slides off the hook, closed end facing down and drops into discharge channel 90.

A can $e^1$ positioned in feed channel 72 with its open end facing down engages over a ring hook so that the hook end extends into the open end of the can as indicated at $e^2$. When the vacuum to ring aperture 82 adjacent to the can is cut off, the can pivots outwardly and about the hook, as indicated at $e^3$ in Figures 5A, and with the aid of the air blast flips or rotates through 180° so that its closed end faces down and the can enters discharge end 90 in this position. Thus all the cans entering channel 90 are oriented with their open ends facing up.

Discharge channel 90 carries the oriented cell cans 5 to the positive feed device 17 comprising a continuously rotating feed wheel 94 having a resilient rim 95 preferably made of sponge rubber or the like, and moving conveyor belt 97. The cans move from channel 90 against wheel rim 95 parallel to the wheel axis, and the wheel, as it rotates clockwise as shown in Figure 6, rolls each can around a curved guide 98 to conveyor 97. The cans move on the conveyor to a feed track 99 and roll down the inclined portion 100 of the feed track to a plurality of vertical magazines 18, six being shown in this preferred embodiment of my invention. The magazines 18 properly align and position the cans for movement by can advancing mechanism, described below, over the liners 20 on the six spindles 22 of the liner forming machine 13. A vibrator 102 mounted on the feed track 100 prevents jamming and facilitates continuous movement of the cans on the track.

The mechanism of the can feed machine 12 which advances the bank of six cans at a time over the spindles of the liner forming machine 13 is located in an elongated box-like enclosure comprising rear and front plates 104, 105 (see Figures 3 and 4), end plates 106, 107, a top or cover plate 108, and a base plate 109. A drive shaft 110 (see Figures 7, 8 and 9) extends longitudinally through the enclosure and is journalled in bearings 112, 113 in end plates 106, 107, respectively, and is rotated by the driven sprocket 69a of the chain and sprocket drive system 69 (see Figure 4). In addition to driving the can-feeding and advancing mechanism, drive shaft 110 furnishes power to drive the liner forming machine 13 by means of a pair of power take-off shafts 115, 116 which extend rearwardly from and at opposite ends of shaft 110 through bearings 117, 118 in rear enclosure plate 104; bevel gears 120 on shaft 110 engaging bevel gears 121 on shafts 115, 116 for driving the liner forming machine 13 in synchronism with the can-advancing mechanism described below.

The mechanism which moves the cans rearwardly over the spindles 22 comprises box cams 125, 126 mounted near respective ends of and rotatable with shaft 110 (see Figure 8). Located at longitudinally spaced intervals between cams 125, 126 are six identical can-advancing stations 128, the first and sixth stations being shown in Figure 8, which operate simultaneously. It will be sufficient to describe but one of the stations and like reference characters will indicate like parts on the drawings.

Simultaneous operation of the six stations is caused by rocker shafts 130 and 131 which are supported between cams 125, 126 in bearings 133, 134 mounted on bearing plates 135, 136 which extend rearwardly from front plate 105. Rocker shaft 130 is reciprocably rotated by a crank arm 138 (see Figure 9) keyed thereto, the opposite end 139 of arm 138 being pivotally connected to a downwardly extending toggle link 140 which connects to the free end of cam lever 141. The opposite end of cam lever 141 is pivoted to a bracket 142 on rear enclosure plate 104 and carries a cam follower 144 which rides in a cam track, not shown, on the inner face of cam 126. As cam 126 rotates, follower 144 moves radially in and out on the cam face and causes cam lever 141 to move vertically, pivoting on bracket 142, and through link 140 to rock crank arm 138 and rocker shaft 130.

Rocker shaft 131 is similarly actuated by corresponding mechanism associated with cam 126, this mechanism comprising crank arm 146, toggle link 147, cam lever 148 pivotally mounted on bracket 149 of front plate 105, and follower 150 on crank lever 148 which rides in the cam track in the side face of cam 126.

Each can-advancing station 128 has a reciprocable sleeve 152 (see Figure 9) and a reciprocable rod 153 disposed concentrically within the sleeve. Sleeve 152 is supported for rearward and forward movements within a guide bushing 155 on rear enclosure plate 104, the projecting end 156 of the sleeve being open along the top to receive a cell can from magazine 18 above the sleeve. The inboard or forward end of sleeve 152 is connected by bracket 158 to a crank arm 159 which extends upwardly from rocker shaft 130. As cam 125 rotates, sleeve 152 advances rearwardly a predetermined distance from the solid line to the broken line positions shown in Figure 9 and thereafter retracts to the starting position to complete a cycle of operation. The can is held on the rear end 156 of sleeve by vacuum communicated by hose 162 to an aperture 161 in the lower rear part of the sleeve.

Can-advancing rod 153 is reciprocated by rocker shaft 131 connected to the rod by crank arm 164 (see Figure 9). The stroke of rod 153 is longer than the corresponding stroke of sleeve 152 by an amount corresponding to the length of a cell can. Rod 153 at the start and end of its cycle of movement is offset from can magazine 18 so a fresh can drops from the guide onto the projecting sleeve end 156. When rod 153 is fully extended rearwardly as indicated in broken lines in Figure 9, the end of the rod is flush with the end of the sleeve, the can having been pushed off the sleeve and over the liner wrapped spindle 22 of the liner forming machine. In other words, sleeve 152 and rod 153 normally reciprocate simultaneously, the latter making a longer stroke than the sleeve in order to feed a cell can over the spindle, the difference in the lengths of the sleeve and rod strokes resulting from the difference in lengths of crank arms 159 and 164 and the radial movements of cam followers 144 and 150 on cams 125 and 126.

In order to prevent damage to the can-advancing mechanism, in event a can becomes jammed between the spindle and reciprocating rod 153, crank arm 164 is connected to rod 153 through a safety latch generally indicated at 166 in Figures 9 and 9A. This latch comprises a bracket 167 fixed to rod 153, a pawl 168 pivoted to the top of the bracket for rocking about a horizontal pin 169 and a slide bracket 170 slidably mounted on rod 153 and to which the upper end of crank arm 164 is connected. Pawl 168 has a slightly beveled shoulder 172 which normally overlies and engages the beveled upper edge 173 of slide bracket 170 as shown in solid lines in Figures 9 and 9A, and is held in this position by compression spring 175 between fixed bracket 167 and the opposite end of the pawl. Note that the force transmitted by crank arm 164 to rod 153 during the feed stroke of the rod is carried through slide bracket 170, pawl 168 and fixed bracket 167. If rod 153 engages a jammed can, the resistance to movement of the rod causes slide bracket 170 to force pawl 168 upwardly to the broken line position shown in Figure 9A until the forward upper edge of the slide bracket clears the pawl shoulder. As crank arm 164 continues to pivot, slide bracket moves rearwardly on the rod which remains stationary as a result of uncoupling the slide bracket from the fixed bracket. On the return stroke of crank arm 164, the rear face 176 of slide bracket 170 engages the forward face 177 of fixed bracket 167 and carries the rod forwardly. Pawl 168 under the action of spring 175 then re-engages the forward end of slide bracket 170 as indicated in solid line in Figures 9 and 9A, and the mechanism is ready for another cycle of operation. The jammed can falls by gravity to the discharge chute 24 and a fresh can drops from the vertical magazine 18 into position on the projecting end portion 156 of sleeve 152.

Rod 153 extends forwardly of fixed bracket 167 and is slidably supported by a guide bushing 179 in cylindrical housing 180 which is mounted on and projects outwardly from front plate 105 of the machine enclosure. Housing 180 carries resilient bumper pad 182 at its forward end against which rod 153 abuts on the return stroke.

B. Liner forming mechanism

The liner forming mechanism 13 (see Figures 3, 4 and 10b is located adjacent to and behind the cam advancing mechanism 12 and comprises a base plate 185 mounted on the top plate 64 of base frame 61, rear and front plates 187, 188, end plates 189, 190 and a top plate 191. The paper feed housing generally indicated at 193 in Figures 3, 4, 10a, 11 and 12 is mounted on the front central portion of top plate 191 and comprises a front plate 194 flush with and projecting upwardly from front plate 188 of the lower part of the machine, a rear plate 195, end plates 196, 197 and a top plate 198. The housing 193 contains and supports the mechanism for feeding paper tapes P to the several spindles 22 of the machine.

The drive for operating the liner forming machine is furnished by power take off shafts 115, 116 (see Figure 17) which extend rearwardly from the can feeding machine and are journalled in bearings 200 and 201 on rear and front plates 187, 188, respectively, of the liner forming machine. Shafts 115, 116 drive the paper feeding mechanism 193, spindles 22, paper cutting shears, flapper arms for holding liner paper against the spindles, spindle vacuum system, and the rods for ejecting the lined cans from the spindles—all of which is described below.

The paper feeding mechanism in the paper feed housing 193 is driven by a chain 203 (see Figures 10B, 13 and 17) which extends upwardly from engagement with sprocket 204 on shaft 116 and engages sprocket 206 at the rear of paper feed housing 193 (see Figures 10A, 11 and 12). Idler sprocket 208 adjustably supported by bracket 209 on the paper feed housing takes up slack in the drive chain 203. Sprocket 206 is keyed to shaft 211 (see Figure 11) which extends into and is journalled in bearings on front and rear plates 194, 195 of the paper feed housing. Gear 213 mounted on shaft 211 drives a gear train in paper feed housing 193 which rotates a set of paper feed rolls 215, 216 and 217 which project forwardly of the housing at each of the six paper feed stations. The gears in this gear train are supported on shafts suitably journalled in bearings on the front and rear plates 194, 195 of the housing and consist of gears 219 and 220, the former engaging drive gear 213, the latter being keyed to shaft 221 which carries gear 222 for engaging gear 224 on shaft 225 which mounts paper drive roll 217 on the forward end. Gear 224 also meshes with a gear 227 above shaft 225 and mounted on shaft 228 to which paper drive roll 216 is fixed. Gear 227 engages gear 230 adjacent thereto for driving paper breaking roll 215. The drive rolls 215, 216 and 217 at each of the other five paper feed stations on the paper feed housing are driven by similarly arranged gears in the balance of the gear train, identified in the drawings by like reference characters, for supplying paper to spindles 22 for forming cell can liners 20.

Paper in the form of a continuous ribbon or tape is pulled from six supply rolls R (see Figure 3) over idler rolls 232 on paper feed housing 193 by the paper drive rolls 215, 216 and 217 and winds around the drive rolls as shown in Figure 10A, feeding continuously. Drive roll 215 preferably has the same diameter as spindle 22 and in addition to feeding the paper also bends the paper fibers and "pre-curls" the paper to facilitate wrapping it on spindle 22. Pressure roll 234 mounted in pivoted arm 235 is pressed against the paper on the periphery of drive roll 217 by spring 238 and the paper is fed down at a constant rate through a tension loop, indicated at 240, to a vertical guide 242 (see Figure 10B) which directs the paper to a ratchet actuated feed roll 244 below the guide. This feed roll rotates through a predetermined angle once during each cycle of operation and delivers the proper length of liner paper to spindle 22 for the liner forming operation. Tension loop 240 in the paper permits roll 244 to feed the paper intermittently without breaking it.

Guide 242 is mounted on the lower portion of the paper feed housing 193 (see Figures 10B and 16) by a bracket 246, the guide being slidably adjustable on the bracket toward and away from the housing by adjusting screw 247 for vertically aligning the paper with spindle 22. It should be noted that the liner paper when so aligned overhangs the end of the spindle sufficiently to permit folding of the overhanging portion around the spindle end for forming the bottom wall of the liner. Feed roll 244 projects partially through a slot 249 (see Figure 16) in the side of the guide for engaging the paper, and pressure roll 251 on pivot arm 252 is pressed by spring 254 against the opposite side of the paper to aid the feeding of the paper by the roll 244. Below vertical guide 242 the paper is cut to proper length to form a liner by a stationary shear blade 256 and a movable shear blade 257 which moves transversely on the paper to shear it. The lower end of the paper is held against the side of the spindle 22 by a flapper arm 259 and is releasably secured to the spindle by vacuum communicating with spindle vacuum apertures 261 which the paper overlies.

The portion of the liner which overhangs the spindle is folded by laterally spaced liner folding heads 263 and 264, (see Figures 10B and 16) supported on arms 265, 266, respectively, adjacent to and on opposite sides of the forward end of the spindle. The folding heads 263, 264 are moved into the over-hanging portion of the liner on the spindle and pre-fold it prior to movement of the cell can from the can-advancing machine 12 over the liner wrapped spindle 22. After the cell can moves over the liner wrapped spindle and receives the liner, can eject rod 268 carried within spindle 22 moves forwardly and axially of the spindle and pushes the lined can from the spindle into discharge chute 24 below the spindle. The mechanism for sequentially actuating these several components of the liner forming machine will now be described in conjunction with Figures 10B, 13, 14, 15, 16 and 17.

As best shown in Figure 17, power shaft 115 is keyed to three axially spaced box cams designated as folder cam 271, spindle wrap cam 272 and shear cam 273. Each of these cams is formed with cam tracks, not shown, in its side face, the cam followers on associated levers engaging the respective cam tracks to impart desired movement to the levers and to the operating parts connected to the levers as the cams rotate.

Folder cam 271 (see Figures 10B, 14 and 17) drives the follower 275 of folder cam lever 276 which is pivoted at its lower end on a transverse bar 278 (see Figure 14). The upper free end of lever 276 is pivotally connected to a longitudinally extending toggle link 279, the opposite end of which connects to a crank 281 on pinion shaft 283 which is supported on bearing in and extends through front wall 188 of the machine. The outer end of pinion shaft 283 is fixed to a pinion 284 which engages teeth of longitudinally extending folder rack bars 286, 287, respectively, above and below the pinion. These bars reciprocate in opposite directions in slide bearings 288 and 289 supported at opposite ends of the machine in response to rotation of the pinion 284. Liner folding arms 265, 266 for each spindle are mounted on the rack bars 286, 287, respectively, as shown in Figure 10B, and accordingly move laterally of spindle 22 as the rack bars reciprocate to fold the projecting portion of the liner paper around the spindle.

The spindle wrap cam 272 drives a follower 292 carried on a cam lever 294 which is pivoted at its lower end on the bar 278 (see Figure 14). The upper end of cam lever 294 is connected to toggle link 295, the opposite end of which is pivotally connected to a spindle wrap rack 297 which extends longitudinally of the machine under the six spindles 22. Rack 297 has upwardly facing teeth 298 and is mounted for longitudinal sliding movement on a block 300 (see Figures 15 and 16) supported between the rear and front walls 187, 188, respectively, of the machine on transverse frame plate 301.

The teeth 298 of spindle wrap rack 297 engage a pinion 303 (see Figure 16) which is keyed to a spindle sleeve 304 mounted in suitable bearings 306 and 307 on front and rear plates 188, 187, respectively, of the machine. The forward end of spindle sleeve 304 projects from front plate 188 of the machine and carries a clamp 310 which clamps the rear end of the spindle 22 to the spindle sleeve.

Rotation of spindle wrap cam 272 causes the rack 297 to move to the right as viewed in Figure 10B, to pause for a predetermined time interval, and to return, to the left as viewed, to its initial starting position. This causes spindle 22 first to rotate counterclockwise, as viewed in Figure 10B, during which time the liner is wrapped on the spindle, to pause until the cell can is advanced over the wrapped spindle, and thereafter to rotate clockwise, as viewed, while the can is on the spindle to unwind or iron the liner into the can.

The movable liner shear blade 257 (see Figures 10B, 16 and 18) preferably is made in the form of a bell crank which is pivoted to a bracket 312 on the front of the machine by vertical pin 313. One leg 257a (see Figure 18) of the shear blade extends outwardly from the bracket 312 with its cutting edge 315 facing the liner paper and is adapted to move, as the shear blade crank pivots about pin 313, across the adjacent edge of the stationary blade 256 to cut the paper. The other leg 257b of the movable blade is pivotally connected by pin 317 to an actuating rod 318 which reciprocates forwardly and rearwardly to cause the movable blade to oscillate as suggested in broken lines in Figure 18.

Movement of shear blade actuating rod 318 is initiated by shear cam 273 (see Figures 14 and 17) which causes follower 320 on shear cam lever 321 to pivot the lever in a vertical plane about bushing 323 on the rear plate 187 of the machine enclosure. The opposite end of the lever 321 is connected to a vertically extending toggle link 324 (see Figure 14) which engages crank arm 326 clamped on a longitudinally extending shaft 327. Shaft 327 is supported for oscillation about its axis in end bearing supports 329, 330 (see Figure 10B) and in intermediate support plates 331 on the upper part of the machine frame, and is keyed at each shearing station to a downwardly extending crank 332 (see Figure 16). The lower end of crank 332 carries rollers 333 which engage in recesses 334 in the sides of actuating rod 318. Shaft 327 is rocked in one direction, counterclockwise as viewed in Figure 16, by the action of shear cam 273 and clamp arm 326 and moves actuating rod 318 forwardly, to the right as viewed in Figure 16, causing shear blade 257 to pivot about pin 313 (see Figure 18) and cut the liner paper disposed between it and the stationary blade 256. Shaft 327 thereafter is rocked in the opposite direction, clockwise as viewed in Figure 16, to return the shear blade to the position shown in solid line in Figure 18 so that another length of paper can be fed between the blades for wrapping on the spindle 22.

Referring again to Figure 17, it will be noted that power take off shaft 116 extends through the opposite, right as viewed, end of liner forming machine 13 and is keyed to axially spaced cams designated as flapper cam 337, paper feed cam 338, can eject cam 339 and vacuum control cam 340. As shaft 116 rotates, these cams rotate together and actuate corresponding operating parts of the machine in a manner which will now be explained.

Flapper cam 337 drives a follower 342 (see Figures 10B, 13 and 17) on a cam lever 343 which is pivoted at its lower end on bushing 345 supported on the front plate 188 of the machine. Lever 343 is connected to toggle link 347 which in turn is connected to one end of a flapper rack 349 (see Figures 10B and 17) having upwardly extending rack teeth 350. Rack 349 is supported on block 300 (see Figures 15 and 16) within the machine for longitudinal sliding movement and at each spindle station engages a pinion 352, secured to a forwardly extending shaft 353 which is journalled in bearings in the front of the machine and connects to a crank arm 354 (see Figure 10B), on its forward projecting end. Crank arm 354 engages one leg of a bell crank 356, the other leg of which extends upwardly and supports the flapper arm 259. Spring 358 urges the flapper arm against the spindle as shown in Figure 10B. As the flapper rack 349 reciprocates longitudinally in response to rotation of the flapper cam 337, crank arm 354 pivots down causing bell crank 356 to pivot counterclockwise, as viewed in Figure 10B, to compress spring 358 and to move the flapper arm away from the spindle, thereby permitting the lead end of the liner paper to be fed between the flapper arm and the spindle. On the return stroke of flapper rack 349, crank arm 354 pivots up and permits bell crank 356 under the action of spring 358 to move the flapper arm against the paper on the side of the spindle.

The paper indexing feed cam 338 (see Figures 13 and 17) drives a follower 360 carried on cam lever 362 which is pivoted on transverse pivot bar 363 supported at opposite ends on the front and rear plates of the machine. The opposite end of cam lever 362 connects to vertically extending toggle link 365 connected by rod 366 (see Figure 13) to one leg of a bell crank 368. The crank 368 is mounted for pivoting or rotating about the axis of a longitudinally extending paper indexing feed shaft 370 to which a ratchet 371 is fixed adjacent the crank. The peripheral teeth 372 on ratchet 371 are engaged by a spring loaded pawl 373 carried on the other arm of crank 368. For each revolution of cam 338, crank 368 is reciprocably pivoted and pawl 373 is operative to move ratchet 371 and shaft 370 through a portion of a revolution and in one direction only, counterclockwise as viewed in Figure 13. A spring loaded brake 375 operates on shaft 370 to prevent overtravel of the shaft.

Shaft 370 extends longitudinally of the machine and is supported in bearing support plates 377 (see Figure 15) throughout the length of the machine. Keyed to the shaft 370 adjacent each spindle station is a bevel gear 378 which engages bevel gear 379 carried on paper feed roll shaft 381 which extends forwardly of and at right angles to shaft 370 and mounts paper feed roll 244 at its forward projecting end.

Thus the liner paper which is pressed against the periphery of feed roll 244 by pressure roll 251 is advanced downwardly a predetermined distance by the partial revolution of the feed roll 244, and the leading edge of the paper moves down from shear blades 256, 257 to a point adjacent the side of spindle 22. This feeding operation occurs once during each liner forming cycle.

Can eject cam 339 (see Figures 13 and 17) operates cam-follower 383, cam lever 384, vertically extending toggle link 385 and forwardly extending crank arm 386 to rock longitudinally extending can eject shaft 388 to which crank arm 386 is connected. Shaft 388 is supported at longitudinally spaced points by support plates 390 (see Figure 16) on block 300 and, at each spindle station, is keyed to a vertically extending crank arm 391 which is pivoted at its upper end to a transversely reciprocable bar 393. The rear end of bar 393, that is, the left end as viewed in Figure 16, is connected by vertical link 395 to the rear end of can eject rod 268, the forward extension 268a of which extends through spindle sleeve 304 and through spindle 22, terminating at the front face of spindle 22.

As the can eject shaft 388 is partially rotated in one direction, clockwise as viewed in Figure 16, can eject rod 268 moves forwardly, to the right as viewed in Figure 16, beyond the end of spindle 22 to slide the lined can from the spindle into the downwardly extending discharge chute 24.

The operation of can eject shaft 388 also is used to advance lined cell cans from under discharge chute 24 toward the conveyor 26 in order to make room for the next lined can falling by gravity below the chute 24. The mechanism which advances the lined cans in this manner is best shown in Figure 16 and consists of a vertical shaft 397 journalled for rotation in a bearing housing 398 mounted on the rear plate 187 of the machine, the upper end of shaft 397 being connected by crank 400 to the rear end of bar 393. The lower end of vertical shaft 397 is connected by crank 402 to the rear end of an elongated forwardly extending sleeve 404 slidably supported on the front and rear plates of the machine for reciprocation forwardly and rearwardly. A rod 405 coextensive and disposed within sleeve 404 has a head 406 projecting from the front end of the sleeve in alignment with the rear end of can guide track 408 over which liner filled cans are advanced to the moving belt of conveyor 26 at the front end of the track. A spring 410 disposed within the front end of sleeve 404 and abutting against internal sleeve flange 411 and rod 406 yieldably transmits a force to rod 405 from sleeve 404 when the latter moves forward on the feed stroke, so that the rod head slides within the track 408 and moves the cell can forward and from under the chute 24. Spring 410 is sufficiently stiff to cause rod head 406 when moving forward with sleeve 404 to push the row of cans ahead of it along guide track 408 toward the conveyor but yields and compresses if the rod head encounters resistance in excess of that required to move the cans.

Control of vacuum communicating with vacuum apertures 261 in spindle 22 is accomplished by vacuum cam 340 mounted on the rear portion of power shaft 116 (see Figures 13 and 17) and externally of the rear plate 187 of the liner forming machine. This cam drives follower 424 mounted on cam lever 425 which pivots about pivot bushing 426 and actuates vacuum control bar 428 which is supported for longitudinal sliding movement in slide bearings 430 on rear plate 187 of the machine. Bar 428 is operably connected behind each spindle station to a rotary valve 432 which has a vacuum port 433 and a port 434 leading to atmosphere. These ports communicate alternately with apertures 261 in the spindle through the interior of the spindle sleeve 304; valve 432 in one position, corresponding to one limit of movement of control bar 428, connecting spindle apertures 261 to a vacuum line 436 leading to a vacuum manifold 437 mounted on the rear of the machine, and valve 432, when moved to its other position by bar 428, cutting off the vacuum and connecting atmosphere port 434 with the spindle apertures. The vacuum system is connected to the spindle apertures during the part of the operation cycle in which the liner is wrapped on the spindle and the cell can is pressed over it in order to hold the liner tightly on the spindle, and the spindle apertures are connected to atmosphere during the other part of the cycle to release and transfer the liner from the spindle to the cell can.

C. *Summary of operation of can feed and liner apparatus*

The moving parts of the can feeding and advancing machine 12 and of the liner forming machine 13 are synchronized to operate in sequence during each cycle of operation. This synchronism results from the design of the several box cams whose cam tracks are formed to move the associated cam followers and cam levers in the proper direction and in the proper time sequence to accomplish the desired operations. Both the can feeding and advancing machine 12 and the liner forming machine 13 are driven by a common motor 65 (see Figure 3) and power shafts 115, 116 for the liner machine are driven at a 1:1 speed ratio by the can machine power shaft 110 so that all cams on these shafts are rotated simultaneously and at the same speed, and therefore the duration of the operation cycle for each machine is the same.

The operation of the can feed and liner apparatus is illustrated schematically in Figures 19, 20 and 21. At each of the six stations on the liner forming machine 13, the ribbon of liner paper P is fed from a paper supply roll at a constant speed over idler roll 232 (see Figure 19A) by the continuously rotating paper feed rolls 215, 216 and 217, into a vertical paper guide 242 which directs the paper between pressure roll 251 and ratchet feed roll 244 below the guide. Tension loop 240 in the paper between feed roll 217 and the top of guide 242 provides sufficient slack in the paper to permit intermittent feeding by ratchet feed roll 244.

At the beginning of each cycle of operation, the lower leading edge of the paper P is located at the plane of shear blades 256 and 257; movable shear blade 257 is laterally spaced from stationary blade 256; flapper arm 259 is spaced from the periphery of spindle 22, the flapper arm being held in this position against the pressure of spring 358 by the force of crank arm 354 against bell crank 356 to which the flapper arm is connected; and the angular position of spindle 22 is such that vacuum apertures 261 therein are along the side facing flapper arm 259. Ratchet feed roll 244 is actuated to move through a portion of a revolution and feeds paper P downwardly between the separated shear blades until the free end of the paper lies against the periphery of the spindle and overlies spindle vacuum apertures 261. Feed roll 244 stops when this length of paper has been advanced. At this moment vacuum is applied to spindle apertures 261 by the operation of rotary vacuum valve 432, (see Figure 16) and the lead end of the paper is drawn against the spindle. Flapper actuating shaft 353 rotates counterclockwise as viewed in Figure 19, causing crank arm 354 to release bell crank 356 and the spring loaded flapper arm 259, presses the paper against the spindle (see Figure 19B). Shear blade 257 then moves transversely of the paper across stationary blade 256 to cut the liner 20 to the correct length which is slightly greater than the circumference of spindle 22 to provide a slight overlap of the liner ends when the liner is wrapped on the spindle.

Spindle 22 rotates counterclockwise as viewed in Figure 19B through slightly more than 360° and wraps liner 20 around its periphery with the liner ends overlapped. Spindle rotation stops and folder heads 265 and 266 (see Figure 20) move across the front end of the spindle and folds the overhanging part of the liner around the front of the spindle. When the liner is fully wrapped and folded around the spindle, folder heads 265 and 266, flapper arm 259, and shear blade 257 return to their respective initial starting positions, and the liner wrapped spindle is ready to receive a cell can from the can advancing machine 12 (see Figure 21A).

Cell can 5 lies horizontally on the projecting end 156 of reciprocable sleeve 152 (see Figure 9) of the can advancing machine, with the open end of the can in axial alignment with and facing the spindle. Sleeve 152 together with can advancing rod 153 move rearwardly together carrying the can to the front face of the liner wrapped spindle (see Figure 21B); and sleeve 152 stops, and rod 153 continues to move toward the spindle and pushes the can from sleeve over the spindle (see Figure 21C). Thereafter sleeve 152 and rod 153 withdraw from the spindle to their starting positions and the next unlined can drops from vertical guide onto the projecting end 156 of the sleeve after the end of rod 153 clears the bottom of the guide.

Vacuum to the spindle apertures 261 is cut off by movement of rotary vacum valve 432 (see Figure 16) and the spindle apertures are connected to atmosphere. This releases the vacum grip of the spindle on the liner. At the same time the spindle is rotated in a clockwise direction as viewed in Figure 19 to its starting position, the reverse rotation of the spindle tending to throw the liner by centrifugal force away from the spindle and against the interior of the cell can. The lined can is then ejected from the spindle by cell eject rod 268 (see Figure 21D) and the lined can drops into discharge chute 24 (see Figure 21E) where it passes to cell guide track 408 (see Figure 16). At the same time cell eject rod moves forward to eject the can from the spindle, can feeding rod 405 (see Figure 16) moves forward and pushes the next previously lined can along guide track 408 toward conveyor 26, and retracts, along with cell eject rod 268, in time to clear the bottom of chute 24 before the newly lined can emerges from the bottom of the chute.

The paper lined cell cans 5 are transferred from the can feed and liner forming apparatus (see Figure 1) by conveyor 26 to cell loading apparatus at which the cells are exactly filled with a mix comprising manganese dioxide. Conveyor 26 has six laterally spaced channels or guideways 440 (see Figure 3) within which each row of cans is moved by belts 441 (see Figure 4) under each channel to the cell loading apparatus.

III. CELL LOADING APPARATUS

A. Cell loading table

As best shown in the schematic drawing of Figure 1, the lined cells are carried by conveyor 26 to cell loading table 28 where the cells receive, in succession, a bottom disc, a charge of cell mix called a bobbin, and the mix washer at stations circumferentially spaced around the periphery of table 28. Preferably the mechanism which punches and inserts bottom disc 29 into each cell is located directly above the junction of conveyor 26 and table 28 and the steps of loading the cell cans on the table and of inserting the bottom disc into the cans are combined and are performed at the same time.

Cell loading table 28 and the drive mechanism for the table and for the three stations around the table edge are illustrated in Figures 22, 23 and 24, the details of the apparatus of stations 3, 4 and 5 having been omitted from these drawings in order to simplify them; the bottom disc punch and insert mechanism 30, the bobbin pack and load mechanism 33 and the mix washer punch and insert mechanism 34 being represented in Figure 22 by broken line blocks. The table apparatus comprises a circular plate or table top 444 supported on bearings for rotation about a vertical post 446 (see Figure 23) which extends upwardly from and is secured to a mounting plate 447 of an upstanding base frame 448 (see also Figure 24). The revoluble top plate 444 has a plurality of sets, preferably sixteen sets as shown, of vertical cell receiving holes 450, with six holes constituting one set, the holes being formed adjacent the periphery of the plate. The centers of the six holes in each set lie on a straight line tangent to a circle having its center at the axis of rotation of the plate and are symmetrically arranged about one of sixteen equiangularly spaced radii of the plate. Thus, the sets of cell holes in the plate are equally spaced from each other at 22½° intervals around the table. Plate 444 is rotated intermittently through an angle of 22½° by an indexing mechanism described below, and carries each bank of six cell cans successively to the three cell loading stations around the plate, pausing after each indexing action for a predetermined time interval to permit the operations to be performed on the cell cans. Cans are fed to and removed from plate 444 each time the plate pauses. The upper open end portions of cell cans 5 fit snugly in holes 450 when loaded on plate 444, and the bottoms of the cans are supported during rotation of the plate on circularly curved sections 451 of slide track spaced under the edge of the plate between the operating stations as shown in Figures 22 and 24.

Power to drive plate 444 of table 28 as well as the operating mechanisms at cell loading stations 3, 4 and 5 is furnished by a motor 454 supported on a transverse beam 455 under mounting plate 447 of base frame 448. The motor is connected by a belt drive 456 to a speed reducer 457 having a vertical output shaft 458 coupled by a flexible coupling 459 to a drive spur gear 460 which engages the periphery of a sun gear 462; the gears being enclosed in a gear box 463. The output shaft 458 of the reducer also drives a miter gear 464 (see Figure 23) above gear 460, and miter gear 464 mates with a corresponding gear 465 on power takeoff shaft 466 and rotates shaft 466 about a horizontal axis. Sun gear 462 drives planet gears 468, 469 and 470 (see Figure 22), which rotate similar outwardly extending power takeoff shafts 471, 472 and 473, respectively, through sets of miter gears 464' and 465' corresponding to miter gears 464 and 465 described above. Power takeoff shafts 473, 466 and 472, respectively, are connected to the drive mechanism of stations 3, 4 and 5 located adjacent the shafts on the edge of plate 444, and accordingly these stations operate in synchronism with each other and with the table indexing mechanism described below. In the present embodiment of the invention, there is an open station opposite shaft 471 which, in the apparatus shown in the drawings, is idle.

Plate 444 of cell loading table 28 is rotated about its vertical axis by a gear train comprising spur gear 475 (see Figures 22 and 24) which meshes with drive gear 460 on the reducer output shaft, a vertical shaft 476 connected to gear 475, helical gear 477 at the upper end of shaft 476, and helical gear 478 (see also Figure 23) mounted on indexing drum 480 and engageable with gear 477 for rotating the drum about a horizontal axis. Drum 480 which is journalled for rotation adjacent the underside of top plate 444 is rotated continuously by the gear train just described.

In order to impart intermittent rotary motion to plate 444, drum 480 is formed with peripheral cam tracks, indicated in broken line at 481 in Figure 23, which define a groove 482 in which certain of a plurality of downwardly extending rollers 483, mounted on the underside of plate 444, are successively engaged; these rollers being equally spaced around a circle concentric with the axis of rotation of plate 444. Cam groove 482 on the indexing drum is arranged to engage two adjacent rollers 483 at one time during the dwell period when the rotatable plate is at rest, the plate being locked during the dwell by parallel faces on the cam which fit closely between the pair of engaged rollers and which extend in planes at right angles to the axis of rotation of the plate. The curved portion of the operation cam groove advances the rollers and thus rotates the table through a predetermined angular displacement for indexing the table with no lost motion between the cam tracks 481 and rollers 483 for any position of the rotatable plate 444. The indexing mechanism just described does not, per se, form a part of the invention, and no claim is made herein to it.

It will be noted (see Figure 22) that the rows of cell cans, moving on conveyor 26 from left to right, as viewed, in the direction of the arrow, join the edge of plate 444 and receive the bottom disc at the left side of the plate in Figure 22. Plate 444 then indexes through an angle of 12½° in a counterclockwise direction and at the fourth index stop from conveyor 26, that is, at the lower portion of plate 444 as viewed, each cell receives a charge of battery mix called a bobbin. Four index stops from the bobbin pack and load station, to the right as viewed in Figure 22, is an open station which is used for testing the cells at this stage of assembly but which, for purposes of description of this invention, is omitted. At the upper part of the table, as viewed in Figure 22, the cell cans receive the mix washer. The exit conveyor 36 is located two index stops to the left of the last station, and the loaded cans are ejected from the table at this point and are transferred to the cell combine 37. The set of plate holes 450 vacated by the unloading of the cell cans are ready to receive a fresh lot of lined cans from conveyor 26 when plate 444 indexes.

B. Bottom disc punching and inserting mechanism (station 3)

The bottom disc machine 30 (see Figures 25–30, inclusive) is supported on mounting plate 447 of the cell loading table and comprises a cam housing 486 and disc punch and insert mechanism which extends upwardly from the cam housing above the marginal edge of rotatable plate 444. The bottom discs 29 are punched from a tape 488 fed from a supply roll 489 supported above the machine on a frame 490 (see Figure 25). The tape 488 is intermittently fed by feed roll 492 through a stationary die block 494 (see Figure 26) positioned above cell holes 450 in plate 444 so that the tape 488 is in vertical alignment with the cells in the cell holes 450 (see Figure 27). A vertically reciprocable punch head 495 which carries the paper punches is reciprocated once during each cycle of operation to punch and insert the discs, six at a time, one into each cell can.

The six belts 441 of conveyor 26 are driven by a chain 496, a driven sprocket 497 and drive shaft 498 connected thereto (see Figures 25, 26, 27 and 30) to advance the cell cans from left to right as viewed in Figure 26, through the machine and against a can position plate 500. The position plate is formed with six vertically extending V-shaped recesses 501 (see Figure 27) for aligning each cell can vertically on bottom plate 503 to which the cell cans are moved from the conveyor belts 441. A horizontal top plate 505 is spaced above bottom plate 503 by a distance slightly greater than the height of the cell cans 5, and bottom and top plates 503 and 505 are formed with vertically aligned openings 507 and 508, respectively, for each of the six cell cans. The openings 507 and 508 are vertically aligned with cell holes 450 in rotatable plate 444 of the cell loading table, and the cells are moved into position in plate holes 450 by cell lift rods 510 which move up through openings 507 in bottom plate 503 and into openings 508 in top plate 505 and position the upper portions of the cell cans in plate holes 450 in readiness for receiving the bottom discs.

In order to hold and fully seat each cell can against recess 501 in position plate 500, the plate has a vacuum aperture 512 adjacent each recess and an elongated vacuum channel 513 communicating with the several apertures and connected externally of the plate 500 by a conduit 514 (see Figures 25 and 30) to a source of vacuum.

During the disc punching and inserting operation, the cans are supported on the ends of lift rods 510 so that the bottoms of the cans lie substantially in the plane of the upper surfaces of top plate 505 and of the adjacent section 451 of track (see Figure 22) which extends from top plate 505 to the bobbin pack and load machine 33. After the discs have been inserted in the cans, plate 444 indexes, moving six cans from top plate 505 to the adjacent section 451 of track on which the cans slide toward the next station.

Power for operating the bottom disc machine 30 is obtained from power takeoff shaft 473 (see Figures 22 and 26) which is keyed to the female end 515 of a cam shaft 516 on which control cams to be described are mounted. Power to run conveyor 26 is derived from shaft 516 which drives helical gears 517 and 518, and sprocket 519 which engages chain 496 connected by sprocket 497 to conveyor belts 441.

Cell lift rods 510 are reciprocated vertically once during each revolution of drive shaft 516 by a lift rod cam 522 (see Figure 26) which is engaged by a cam follower 523 mounted on a transverse lift plate 524. Connected to opposite ends of plate 524 are vertical bars 526 (see Figures 25 and 26) the upper ends of which connect to a transverse lift rod mounting plate 527 to which cell lift rods 510 are secured. As cam 522 rotates, follower 523 causes lift plate 524 and bars 526 to move and to raise the six cell cans 5, positioned on lift rods 510, through the opening 508 in top plate 505 and into the cell holes 450 of table plate 444.

Punch head 495 is reciprocated vertically to punch and insert discs in the cell cans 5 by another cam 530 on drive shaft 516. This cam is engaged by a follower 531 (see Figures 25 and 26) carried on a transverse plate 533 to the ends of which vertically extending laterally spaced bars 535 are connected. These bars are supported for vertical movement in bearings in stationary die block 494 and are connected at their upper ends by pivoted links 536 to longitudinally extending levers 538 at points intermediate the ends of the levers. One end of each lever 538, the left end as viewed in Figure 26, is pivotally mounted on a fixed upright member 539 secured to the top of the cam housing 486 as shown in Figure 28. The opposite ends of levers 538 are pivotally connected by links 541 to clevises 542 secured to the top of punch head 495 (see also Figure 27).

As shown in Figure 27, punch head 495 comprises an elongated transverse block 544 having a longitudinal recess 545 in its upper face which is closed by a top plate 546 to which the clevises 542 are welded and which is secured to the punch head block 544 by screws 547. A series of six holes 549 in the lower part of block 544 receive the upper ends of six hollow punch rods 550, the bores 551 of the rods communicating with recess 545 in block 544. The punch head block 544 moves vertically along laterally spaced guide rods 553 (see also Figure 29) which project up from stationary die block 494.

Die block 494 has six laterally spaced openings 556 in vertical alignment with punch rods 550, respectively, each opening 556 being fitted with a guide bushing 557 within which the lower end portion of punch rod 550 slides. The lower face of die block 494 is undercut as shown in Figure 27 and is fitted with a tape guide plate 559 having a continuous tape guide channel 560 through which the paper tape 488 is fed intermittently. Secured to the underside of the guide plate 559 is a die plate 561 having six laterally spaced openings 563 axially aligned with the respective punch rods. A hardened cutting die 564 having an inside diameter equal to the outside diameter of each punch rod 550 is press fitted into each opening 563 and provides the circular cutting edge for cutting the discs from the tape above the dies.

The recess 545 in punch head block 544 communicates with an air pressure line 566 and a vacuum line 567 (see Figure 25) which are actuated alternately by valving mechanism described below to connect the bores 551 of punch rods 550 alternately to a source of vacuum and air pressure. The purpose of this pneumatic connection to punch rods 550 is twofold: to hold the cut discs on the ends of the punch rods while the discs are inserted into the cell can; and positively to discharge the discs from the rods and to keep the discs in the bottoms of the cans as the rods are withdrawn.

In operation, the rotation of punch and insert cam 530 (see Figure 26) causes plate 533 and bars 535 to move down and levers 538 connected to the ends of bars 535 to pivot down; punch head 495 sliding down on guide rods 553 and causing punch rods 550 to press the paper tape against the cutting dies 564 to form six discs simultaneously. When the punch rods begin downward movement, the central bore of each punch rod is connected through vacuum line 567 to a source of vacuum, and the discs are held on the lower ends of the punch rods during the balance of their downward movement; the punch rod moving into the cell cans 5 and depositing the discs on the bottoms of the cans. Air under pressure from line 566 supplants the vacuum in the punch rod bores as the rods are withdrawn from the cells, and the discs remain in the bottoms of the cell cans. Tape 488 thereafter is indexed by a mechanism described below to present an uncut portion below the punch rods for the next disc punching cycle.

The space X (see Figure 23A) between adjacent cell holes 450 in each set of holes in plate 444 preferably is greater than the diameter of each cell hole 450. This arrangement of cell holes 450 facilitates the use of a novel tape feeding system which minimizes the amount of waste paper resulting from the disc punching operation. According to the invention, the tape, after one cycle of operation, is indexed or fed through a distance greater than the diameter of cell holes 450 but less than the space X between adjacent holes; the previously punched holes in the tape being located between the cell holes 450 as shown in broken line in Figure 23A. The next set of discs is punched from the tape, and thereafter the tape is indexed through a greater distance Y (see Figure 22) corresponding to the maximum space between the end cells of each bank of six cells, to present a fresh uncut length of tape. The tape is fed through the succession of alternate long and short strokes by a feeding mechanism which is now described.

The tape feeding mechanism is operated by cam 568 (see Figures 26 and 28) on drive shaft 516, cam follower 569 engaging the cam, cam lever 570 on which the follower is mounted and which is pivoted on clevis 571 on the side of the cam housing, and vertical connecting rod 573 pivoted at its lower end to lever 570 and at its upper end to bell crank 574. A shaft 576, on which the bell crank 574 is journalled, is mounted in suitable bearings supported on the proximate upright member 539 as shown in Figures 26 and 27, and has a spur gear 578 press fitted thereon adjacent the bell crank. Secured to the side of gear 578 adjacent the bell crank is a circular ratchet wheel 579 having closely spaced teeth or ridges 581, 582 (see Figure 28A) formed in pairs and circumferentially spaced from similar pairs of closely spaced teeth over the periphery of the wheel. A pawl 584 carried on one leg of the bell crank 574 is pressed downwardly against the periphery of the ratchet wheel by a spring, and when the bell crank is rocked about the axis of shaft 576, the pawl engages the teeth on ratchet wheel 579 and rotates the wheel along with spur gear 578 through a predetermined angle.

Spur gear 578 engages a smaller pinion 586 which is keyed to a tape roll drive shaft 587 connected to feed roll 492 (see Figures 25 and 29). Roll 492 rotates in the plane of and in engagement with the tape 488 as the latter emerges from the stationary die block; the tape being urged against roll 492 by a pressure roll 590 operatively connects to a toggle-type lock and release mechanism 592. It will be noted that roll 492, on tape feeding movement, rotates clockwise as viewed in Figure 25 when spur gear 578 is rotated by pawl 584 and ratchet wheel 579, the angular displacement of the feed roll being more than that of the spur gear by reason of the multiplication through spur gear 578 and pinion 586.

As main drive shaft 516 rotates paper feed cam 568, pawl 584 reciprocably rocks about the axis of shaft 576 through a predetermined angle $k$ (see Figure 28A). The pairs of teeth 581 and 582 are cut on the periphery of the ratchet wheel in circumferentially spaced relation such that the spacing between corresponding teeth 581, 581' of adjacent pairs is slightly greater than the angle $k$ while the spacing between proximate teeth 581' and 582 of adjacent pairs of teeth is less than the angle $k$. Accordingly, when pawl 584 rocks through the angle $k$ on the feed stroke and engages, for example, tooth 581, the ratchet wheel and spur gear 578 are rotated clockwise, as viewed, by the pawl through the angle $k$. On the return movement, pawl again moves through an angle $k$ in the opposite or counterclockwise direction, but since teeth 581 and 581' are peripherally spaced by an angle greater than the angle $k$, the pawl comes to rest without engaging in tooth 581' as indicated in broken lines in Figure 28A. Thereafter on the next cycle, the pawl advances over the smooth periphery of the ratchet wheel through a greater portion of the angle $k$ without turning the wheel and finally engages in tooth 582 and moves the ratchet wheel through the smaller angle $m$. On the return motion, the pawl, again moving through the angle $k$, ultimately engages in tooth 581' preparatory to advancing the ratchet wheel again through the angle $k$.

The ratios of the linear dimensions of the various levers and links and the diameter of the ratchet wheel are selected such that a displacement of the ratchet wheel through the angle $k$ causes feed roll 492 to advance the tape through a distance Y (see Figure 22) corresponding to the maximum spacing between the edges of the first and sixth holes 450 in each set in plate 444, and displacement of the ratchet through the angle $m$ results in advance of the tape through one half the distance X between adjacent cell holes 450.

Control of air pressure and vacuum to the air and vacuum lines 566 and 567 respectively (see Figure 25) is afforded by an air pressure cam 594 (see Figures 25 and 26) and a vacuum cam 595, both mounted on the end of main shaft 516 and respectively actuating follower arms 596 and 597 which operate suitable valves 598 and 599, respectively, adjacent the cams; a source of air pressure and of vacuum being connected through these valves to air and vacuum lines 566 and 567 on the movable punch head 495.

Summarizing the operation of the bottom disc punch and insert machine, cell cans 5, six at a time, are delivered by conveyor 26 to bottom plate 503 (Figure 27) and are seated in the recesses 501 of position plate 500 and in alignment with an on top of cell lift rods 510. The cells are lifted by the rods 510 into holes 450 in the overhanging marginal portion of table plate 444, and the lift rods remain in the upper position while the disc is punched and inserted into the cans. The vertically reciprocable punch head 495 then moves down toward stationary die block 494 causing punch rods 450, in vertical alignment with the cell cans, to punch discs from the tape 488. At this moment vacuum in line 567 (see Figure 25) is turned on by the vacuum cam 595 (see Figure 26) and the resulting suction in the bores of punch rods 550 holds the cut discs on the lower ends of the rods as the latter are moved into the cell cans. When the punch rods are fully inserted in the cell cans, vacuum is turned off and air under pressure is carried to the punch rods through line 566, and as the rods withdraw from the cell cans, the air pressure presses the discs against the bottom of the can; the punch rods returning to their initial upper position. As soon as the punch rods reach their upper position, paper feed roll 589 indexes and pulls a fresh length of paper into alignment with the punch rods for the next disc punching operation.

Table plate 444 then indexes and carries the six cell cans into which discs have been inserted toward the bobbin pack and load machine at station 4. When these cans clear the cell lift rods on which they were supported, the rods drop to the position shown in the drawings ready to receive another bank of cells from the conveyor.

C. Bobbin pack and load mechanism (station 4)

The bobbin pack and load mechanism 33 (see Figures 31–40, inclusive) overhangs the marginal edge of the rotatable plate 444 of the cell loading table with the center line of the machine 33 preferably located four index stops or 90° from the bottom disc punch and insert machine 30 (see Figure 1). The bobbin pack and load mechanism 33 comprises a cam housing or casing 602 (see Figure 31) enclosing certain cams which control loading of the proper amount of depolarizing cell mix composition successively into each set of six cell cans 5 carried by plate 444. Cam housing 602 is supported on an extension of mounting plate 447 of the cell loading table, and the cams are rotated through bearing 604 by shaft 466 projecting from the table frame.

The cell mix 605 from which the separate bobbins 32 are formed preferably comprises a premixed quantity of pastelike material comprising manganese dioxide, water and liquid electrolyte, and is fed from a feed cylinder 606 (see Figures 31 and 34) by a feed piston 607 into a charging head 609 on the end of the cylinder. The charging head 609 is directly above the cell cans 5 to be filled and has bobbin forming cavities from which six bobbins at a time are fed down and into the cell cans by vertically reciprocable feed plungers 655. A gate 611 and a valve 657 are provided at the mix entry and discharge sides, respectively, of charging head 609 to control the proper loading and ejection of the mix into and from the charging head.

Feed piston 607 has a cylindrical surface 607a which fits closely within cylinder 606 and a semi-spherical forward surface 607b which transmits piston thrust uniformly to the mix confined in the cylinder. Piston 607 is moved within cylinder 606 by a hydraulic motor 614 having a piston rod 615 connected to feed piston 607. The rate of feed of piston 607 within cylinder 606 is controlled by valves, not shown, in the high pressure lines 617 and 618 leading to and from motor 614. In practice, the rate of feed is small, piston 607 travelling on the feed stroke, from left to right as viewed in Figure 31, at the rate as low as 1/8" per minute.

The capacity of cylinder 606 is large compared with the quantity of mix required to fill six cell cans, and accordingly a considerable number of cans are filled before the cylinder requires refilling. When the supply of mix in cylinder 606 has been exhausted, piston 607 is rapidly withdrawn from the cylinder to the left as viewed, the cylinder is refilled, and the piston rapidly returned into the mix cylinder 606. The whole extruding apparatus is mounted on a slidable rail 621, guided by ways 622 on top of stationary base 623 so that this assembly can be advanced in line with the holes 450 on rotatable plate 444. For cleaning purposes, the apparatus can be retracted from this position and the front extruding head 609 easily removed and serviced. Feed screw 625 connected to hand wheel 626 is axially fixed to and rotatable in a boss 628 on slide base 623, and has its threaded portion engaging a stationary nut 629 fastened to base 623. As the hand wheel 626 is rotated, screw 625 moves axially through nut 629 and shifts slide base 621 together with motor 614, the feed piston 607 and cylinder 606 relative to stationary base 623.

The end of cylinder 606 toward which piston 607 advances on the feed stroke causes the mix to be extruded into the charging head 609, and comprises a cylinder extension 631 (see Figure 34), an extrusion block 632 secured by bolts 633 to the cylinder extension 631, a back plate 635 and a front plate 636, both plates being fastened to the front face of block 632. Because of abrasive action of the mix composition, extension 631, block 632, the spherical feed piston head 607 and a liner, not shown, in cylinder 606 are formed from an extremely hard wear-resistant and corrosion-resistant material.

The interior surface 638 of extrusion block 632 is semi-spherically shaped as shown, and block wall 632' has six laterally spaced horizontally aligned vertically elongated openings 639, the lateral spacing between adjacent openings being slightly greater than the width of each opening. Back plate 635 and front plate 636 each have similar openings 640 and 641, respectively, which are longitudinally aligned with block openings 639; the sets of openings 639, 640 and 641 forming six separate extrusion passages through which the mix passes into the charging head 609. The charging head 609 is filled once during each cycle of operation with mix from the feed cylinder 606, during which time the extrusion passages between the feed cylinder and charging head are open; and the passages are closed when the mix is forced from the charging head into the cell cans.

In order to control feeding of the mix from the feed cylinder to the charging head, a laterally slidable gate 611 (see Figures 34, 35 and 38) having six laterally spaced openings 644 identical in size, spacing and arrangement with openings 639, 640 and 641 in extrusion block 632, back plate 635 and front plate 636, respectively, is disposed between and is slidable laterally relative to the front and back plates. When gate 611 is in the open position as shown in Figures 34 and 35, the gate openings are aligned with the fixed openings in the block 632, the back plate 635 and the front plate 636, and the extrusion passages formed by the openings are open; and when the gate is closed as shown in Figure 38, gate openings 644 are offset from these passages and prevent the flow of mix therethrough. The gate is shifted between the open and closed positions by control mechanism described below.

Charging head 609 comprises a top plate 646 (see Figure 34) and an intermediate plate 647 disposed in a channel shaped bracket 648 (see Figure 33) the front end of which is closed by end plate 649 fastened to the bracket, the bracket 648 together with plates 646, 647 and 649 being secured as a unit to front plate 636 on the extrusion block. The inner edge of intermediate plate 647 fits tightly against front plate 636 and is formed with six inwardly opening vertically extending recesses 651 longitudinally aligned with the respective extrusion passages. These recesses 651 comprise separate charging chambers or cavities into which mix is forced when gate 611 is open and from which the exact amount of mix in the shape of cylinders or bobbins is ejected into the cell cans.

Top plate 646 has six laterally spaced holes 653 vertically aligned with the respective charging cavities 651 in block 609 and into each of which a vertically reciprocable plunger 655 (see Figures 33 and 34) is disposed. The lower part of bracket 648 has six discharge openings 656 and contains a rotary valve 657 formed with six diametric holes 658 whose axes are aligned in the planes of top plate holes 653 and bracket discharge openings 656. Valve 657 controls the discharge of mix from the charging cavities 651; the valve being rotatable from the closed position shown in Figure 34 to an open position with each of the holes 658 therein in axial alignment with cavities 651, top plate holes 653 and discharge openings 656.

Gate 611 and rotary valve 647 are opened and closed alternately during the cell loading operation; that is, gate 611 is open when valve 657 is closed and, conversely, the gate is closed when the valve is open. The mix is confined in the feed cylinder 606 under pressure by the constantly advancing feed piston 607 and is extruded from block 632 into and fills the charging cavities 651 of head 609 at the moment gate 611 is opened; plungers 655 closing the top plate openings 653. Thereafter gate 611 closes the extrusion passages and, with valve 657 still closed, feed plungers 655 move downwardly in top plate holes 653 a small distance, for example $1/16''$, precompressing the mix confined in the charging cavities. Valve 657 is then opened, and feed plungers 655 simultaneously move downwardly through cavities 651 and holes 658 in the valve to force the several charges or bobbins into the cell cans 5 positioned directly below bracket 648 and in alignment with the discharge openings 656 therein. The plungers return to their upper starting position, valve 657 closes and head 609 is ready to receive another charge from feed cylinder 606.

The several cams which control the operation of the bobbin pack and load machine are mounted on drive shaft 660 (see Figures 36 and 40) which is keyed to power takeoff shaft 466 in the cell loading table. Mounted on shaft 660 within housing 602 and adjacent to the right end wall is cell lift cam 663 which engages follower 664 connected to transverse bar 665. This bar is connected at its ends to vertical lift rods 667 supported in slide bearings for vertically reciprocable movement. The upper ends of lift rods 667 project above the top of cam housing 602 and are connected to a transverse cell lift plate 668 (see Figure 37) having a vertical flange 669 which underlies the cell can holes 450 in the rotatable table plate 444. Mounted within lift plate flange 669 are six laterally spaced plungers 670, each of which is urged upwardly relative to the flange by a compression spring 671 mounted concentrically of the plunger within the flange. The upper parts of the plungers 670 extend through bushings 672 in flange 669, collars 673 on the plungers abutting the undersides of bushings 672 to limit upward movement of the plungers so that the end surfaces of the plungers normally lie flush with the tops of the bushings as shown in Figure 37. The lower end of each plunger 670 is slidably disposed in a guide hole 674 in lift plate 668 so that the plunger can move down relative to the lift plate against the force of spring 671. The six cell cans 5, when positioned by table plate 444 in front of the bobbin pack and load machine, rest respectively on the upper surfaces of plungers 670.

Drive shaft 660 rotates cell lift cam 663 which in turn raises and lowers lift rods 667 and lift plate 668 once during each revolution of the cam. Cam 663 is synchronized to raise lift plate 668 prior to the opening of rotary valve 657, and as the lift plate is raised, the cell cans are pushed upwardly within cell holes 450 of rotatable table plate 444 until the upper open ends of the cans seat tightly against the lower surface of bracket 648 of the charging block, directly under and vertically aligned with the axes of discharge openings 656 in the bracket. As lift plate 668 continues to rise, plungers 670, in engagement with the bottoms of the cell cans, remain stationary and lift plate flange 669 moves up relative to the plungers, compressing spring 672; the bushings 672 moving up and over the bottoms of the cell cans. The cans are thus resiliently seated within the cell lift plate, and the spring loaded plungers 670 tightly press and seal the open ends of the cell cans against charging block 609 while the bobbins are inserted in the cans. After the cell cans have been filled, cam 663 returns lift plate 668 to the lower position, table plate 444 indexes, and the cell cans are transferred to the next station.

Bobbin discharge valve 657 is actuated by valve cam 676 (see Figures 33, 36 and 40) which drives follower 677 on lever 678 to move the lever up and down about a fixed pivot 679. The opposite end of the lever is connected to vertical link 681 which extends through a protective cap 682 and engages crank 683 secured to one end of rotary valve 657. Valve cam 676 is synchronized with the other control cams to open and close valve 657 once during each revolution of the drive shaft in proper time relationship with respect to the operation of the other components of the machine.

Vertical movement of bobbin eject plungers 655 is caused by plunger cam 685 whose cam track causes follower 686 and transverse bar 687 to which the follower is connected to move up and down as the cam rotates. The opposite ends of bar 687 connect to laterally spaced vertically extending operating rods 689 which are supported for vertical movement in guide bushings 690. The upper ends of rods 689 are formed respectively with horizontal inwardly opening slots or recesses 691 (see Figures 33 and 36) which engage rollers 692 extending outwardly from the central parts of longitudinally extending levers 694.

The ends of levers 694 remote from feed plungers 655 are pivotally connected as indicated at 695 (see Figures 36 and 39) to upstanding brackets 697 secured to mix feed cylinder 606. The opposite ends of levers 694 are pivotally connected by downwardly extending links 698 to opposite ends of a plunger block 699 which mounts the six feed plungers 655 (see Figure 37 also). Vertical guide bars 700 extend up from opposite ends of charging head 609 and through plunger block 699 and guide the latter in vertical reciprocable movements.

Each of the six feed plungers 655 is adjustably connected to block 699 by an adjustment nut 702 by which the depending length of the plunger below adjusting block 699 is varied; the lower ends of the plungers normally extending into the respective holes 653 in the top of the charging head 609 (see Figures 33 and 34) to close the upper ends of the charging cavities when the plunger block is at its upper limit of movement.

Slide gate 611 between the extrusion block 632 and charging head 609 is operated by cam 704 (see Figures 36, 38 and 40) mounted on the end of drive shaft 660 outside the cam housing 602. Cam 704 drives a follower 705 on one end of crank 706 which is connected at its opposite end to a horizontal rock shaft 707 journalled in a bushing 708 on top of cam housing 602. Rock shaft 707 extends toward the rotatable table plate 444 and connects to a side extending bifurcated crank arm 709 which is pivotally connected by links 710 to a vertically extending hydraulic cylinder 711. The cylinder 711 contains a piston, not shown, having a piston rod 712 which extends upwardly from the top of the cylinder for connection to bell crank 713 through a pivot link 714; the lower extension of piston rod 712 being slidable in a guide 715 secured to housing 602. The bell crank is supported for rocking movement about a fixed fulcrum 716 and has its upper leg connected by link 718 to the adjacent projecting end of slide gate 611.

In normal operation, rotation of gate cam 704 causes rock shaft 707 to rock about its axis, and this motion is translated into vertical movement of cylinder 711 by crank arm 709; the movement of cylinder 711 causing bell crank 714 to rock about fixed fulcrum 716 and thereby causing the gate 611 to shift transversely with respect to extrusion block 632 on mix feed cylinder 606. The gate is reciprocated once during each revolution of the cam through a distance slightly greater than the width of each extrusion opening 644 therein to alternately align and offset the several gate openings 644 with the openings 639 and 640 in the extrusion block 632 and back plate 635, respectively, for opening and closing the extrusion passages between the feed cylinder and the charging head 609.

The purpose of providing the hydraulic cylinder 711 in series with the gate operating linkage is to insure that gate 611 is closed whenever the cell loading table is stopped, for example, in the event of a shutdown; the cell mix material in feed cylinder 606 being maintained under pressure by piston 607 and tending to extrude through the front of the cylinder in event the gate were not closed. Piston rod 712 of safety cylinder 711 is fully extended upwardly as shown in the drawings, from the cylinder during normal operation of the machine, and the cylinder and rod are hydraulically locked in this position and so function as a unitary connecting element in the gate actuating linkage. When the cell loading table is stopped, which in turn stops the bobbin pack and load machine as well as the other stations around the table, cylinder 711 is energized through a hydraulic control valve in the pressure lines to the cylinder to withdraw piston rod 712 downwardly relative to the cylinder a predetermined amount and against a stop. This movement of piston rod 712 rocks the bell crank 713 counterclockwise as viewed in Figure 38 moving gate 611 to a position in which gate openings 644 are always offset from the openings 639 of the extrusion block regardless of the position of the gate at the moment the machine is stopped. When the mechanism is again started for normal operation of the machine, cylinder 711 is energized and piston rod 712 moves outwardly to its extended limit, and the opening and closing of gate 611 is then controlled by cam 704 and the associated linkage described above.

In operation, feed piston 607 continually advances forwardly in feed cylinder 606 and presses the cell mix material in the cylinder into extrusion block 632 against the closed gate 611. With the rotary valve 657 in the bottom of the charging head 609 in closed position, gate 611 is moved to the open position by gate cam 704 and the associated linkage, permitting the mix to extrude into the six charging cavities 651 of charging head 609 until the cavities are filled. Thereafter gate 611 closes. Vertical feed plungers 655 then move downwardly a short distance into the charging block to precompress the mix in the charging cavities 651.

The bank of six cell cans, having been moved by table plate 444 between charging head 609 and lift plate flange 669, is pushed upwardly against the underside of the charging head by the upward movement of cell lift plate 668 in response to the rotation of cell lift cam 663; the portions of the cell cans below table plate 444 being firmly seated within the bushings 672 (see Figure 37) in the cell lift plate flange 669.

Rotary valve 657 opens by the action of valve cam 676, and simultaneously feed plungers 655 move downwardly through charging head 609 forcing preformed bobbins of cell mix from the charging cavities, through the openings 658 in the valve and into the cell cans 5 directly thereunder. Plungers 655 then move up to their starting positions, rotary valve 657 closes and cell lift plate 668 is lowered to return the cell cans to their travelling position in the holes 450 of table plate 444. The plate then indexes carrying the filled cans toward the mix washer punch and insert machine 34 (see Figures 1 and 22).

D. *Mix washer punch and insert mechanism (station 5)*

After the cell cans have been loaded with bobbins, they are carried by table 444 into alignment with the mix washer punch and insert mechanism 34 (see Figures 41–46, inclusive). This mechanism, like the bottom disc punch mechanism 30, cuts washers, six at a time, from a tape which is fed through the machine and inserts these washers into the cell cans 5 on top of the mix. The mix washer 35 (see Figure 2 (5)), is a perforate disc of paper having a central aperture through which the carbon cylinder 39 comprising the cell anode is inserted at the succeeding station on the cell combine table 37. Accordingly, the operation of forming the mix washer involves cutting or punching a circular disc from the tape and also punching a hole in the center of the washer.

The mix washer mechanism 34 comprises a cam housing 723 (see Figure 41) supported on table mounting plate 447 and containing control cams which operate the machine. A reel 725 mounted above the punching mechanism on a frame 726 carries a supply roll of paper tape 727 which is fed down to and across the washer punch dies. Located above the cam housing 723 and under the marginal edge of table plate 444 (see Figures 42 and 43) is a vertically movable cell lift plate 729 which extends under the six cell holes 450 in the rotatable table plate 450 and which carries six spring loaded upright cylinders 730 in vertical alignment respectively with table plate holes 450. When lift plate 729 is in its lower position as shown in the drawings, the top edge 729a of the plate is in the horizontal plane of the track sections 451 (see Figures 22 and 24) and the cell cans come to rest in front of the mix washer machine 34 on top of cylinders 730 in plate 729. Each cylinder 730 has a vertical vacuum channel 731 therein which connects to a source of vacuum through a line 732 (see Figure 41) connected to plate 729. It will be noted that the central lower portion of plate 729 is vertically recessed as indicated at 733 to permit scrap conduits 747, described below, to extend therethrough for connection to the washer punching mechanism.

Spaced outwardly from the periphery of table 444, to the left as viewed in Figures 42 and 43, is a stationary die and punch support block 734 through the upper part of which the tape 727 passes and within which the mix washers are blanked. Block 734 is secured to a frame 735 on the top of cam housing 723 and has six laterally spaced vertical bores 736, each of which is fitted with a die ring 737, a bottom bushing 738 and a tubular paper punch 739 slidable vertically in the die block. Punch 739 has a central bore 740 which extends the length of the punch and which is reduced at its upper end 741 to provide means for cutting the center hole in the washer as described below. When the punches 739 are in their lower position as shown in Figure 43, the upper edges of the punches directly underlie tape 727 in the block; and the punches, when moved upwardly into die rings 737 pass through the tape and cut an imperforate circular washer therefrom. A transverse tape guide plate 742 is fitted in a slot in the block below die rings 737 and is recessed to receive and guide tape 727 through the die block.

The lower ends of punches 739 are fixed in a punch holder block 743 secured to a vertically reciprocable support 744 which is connected at opposite ends to lift bars 745. The lower end of the bore 740 of each punch 739 communicates with a channel 746 in support 744 and with scrap conduit 747, the latter extending through the recess 733 in cell lift plate 729 for connection to a transverse scrap manifold pipe 748. The opposite ends of pipe 748 (see Figures 41 and 45) are swivelly connected to an air blast line 749 and to a scrap exhaust line 750; and air blown through manifold pipe 748 creates a suction in the bore of each punch 739 and draws the washer center hole slug from the top of the punch, through scrap conduit 747 and finally into exhaust line 750. The swivel connections of manifold pipe 748 permit this pipe to swivel about its axis to accommodate vertical movements of plunger support 744 and the scrap conduits 747 connected to the support. Air blast line 749 is connected to a source of air pressure through a control valve which turns on and shuts off the air blast at the proper time as described hereinafter.

In order to augment removal of the washer center slugs from the punch, die block 734 has an air blast passage 751 which communicates with the upper portion of punch bore 740 through downwardly inclined apertures 752 in the punch wall; this pneumatic arrangement creating a strong suction effect directly below the upper reduced end 741 of the punch bore. Block passage 751 is connected by tube 753 to air blast line 749 (see Figure 41).

Supported above die block 734 is a longitudinally reciprocable C-shaped yoke 755 having an upper forwardly projecting arm 756 and a similar lower arm 757. Each arm is formed with six laterally spaced vertical aligned openings 758 and 759; these openings being respectively vertically aligned with die rings 737 in stationary die block 734. Each opening 759 in lower yoke arm 757 carries a bushing 760 within which the lower end of a vertically slidable hollow washer stripper and inserter sleeve 761 is disposed. A center hole punch 762 secured at its upper end to the upper yoke arm 756 is disposed within sleeve 761 and has its reduced lower end 763 spaced upwardly from the lower end of bushing 760, and projecting below the lower face of sleeve 761 when the sleeve is in its upper or retracted position within bushing 760. The end 763 of center hole punch 762 is adapted to fit into the reduced upper end 741 of the bore of lower washer punch 739 when the latter is raised to cut the center hole from the washer located between them.

The upper end of stripper and inserter sleeve 761 is secured to a transverse slide plate 765, the opposite ends of which are slidably supported in elongated slots 767 in a pair of forwardly extending levers 768 which are connected at their rear ends to a transverse rock pin 769 journalled in bearings on frame 735. Levers 768, when pivoted vertically about the axis of rock pin 769, move slide plate 762 up and down and cause sleeves 761 to slide vertically within bushing 760 to form the center holes in the washers, to strip the washers from the punches 762, and to insert the washers into the cell cans. Means described below are provided for advancing and retracting the yoke 755 and slide plate 762 toward and from the table plate 444 in order to move the perforate washers over the cell cans 5 prior to insertion of the washers into the cans.

The following steps occur in forming the washers and inserting them into the cell cans. Punches 739 are raised into die rings 737 and cut imperforate washers from tape 727. Simultaneously the six sleeves 761 move down into die rings 737 to engage the tops of the washers. Sleeves 761 and lower punches 739 then move up together carrying washers sandwiched between them into yoke bushings 760. The washers move up beyond the lower end of upper punches 762 which enter the reduced end of the lower punch bores 740 and, in doing so, cut the center holes out of the washers. The center hole slug from each washer drops into the bore 740 of the lower punch 739, and the air blast through passage 751 in die block 734 carries the slug down through the punch and ultimately into a collector at the end of scrap exhaust line 750. The lower punches 739 return to their starting positions, the freshly cut washers remaining within yoke bushings 760 and on the ends of center hole punches 762.

Yoke 755 then advances to the washer insert position over the cell cans on table plate 444, slide plate 765 simultaneously riding forward in the lever slots 767. Cell lift plate 729 moves up raising the cell cans tightly against bushings 760 in the lower yoke arm 757. Washer insert levers 768 then pivot down, causing sleeves 761 to strip the washers from the ends of the center hole punches 762 and to insert the washers into the tops of the cell cans. Cell lift plate 729 returns to the lower position, and vacuum to lift plate cylinders 730 is turned on to pull the cell cans down with the lift plate. Simultaneously, levers 768 pivot upwardly, and thereafter yoke 755 is retracted to the starting position shown in the drawings. Table plate 444 indexes, washer tape 727 is advanced in the die block, and the machine is ready to begin another cycle.

The cams which control the operation of the mix washer punch and insert machine 34 are mounted on a drive shaft 771 keyed through bearing 772 to power take-off shaft 472 (see Figure 22) of the loading table drive mechanism; the shaft 771 extending outwardly from the cell loading table and through the cam housing 723 in which the cams are enclosed (see Figure 42). Cell lift plate 729 is reciprocated vertically by cell lift cam 774 which moves transverse lift bar 775 connected at its opposite ends to vertical lift rods 776. These rods extend through top of the cam housing and connect to the ends of plate 729 to move it vertically for raising and lowering cell cans before and after the washers are inserted into them.

Actuation of the lower washer punch 739 is caused by punch cam 778 which vertically reciprocates transverse punch bar 779 connected at opposite ends to vertically extending punch lift rods 745 which extend through the top of the cam housing and connect to punch support 744 (see Figure 43). Rotation of punch cam 778 therefore causes up and down movement of lower punch 739 once during each cycle of operation.

Vertical pivoting of the forwardly extending levers 768, to which movement of the six washer stripper and inserter sleeves 761 is responsive, is caused by insert cam 781. The insert cam follower is mounted on follower lever 783 pivoted on longitudinal pivot bar 784 for vertical movement as the cam rotates. The free end of lever 783 connects to vertically extending rod 785 which is pivotally connected at its upper end to a crank 787 secured to the side of one of the levers 768. Since both levers 768 are secured to rock pin 769, the levers pivot vertically in unison with rocking of the pin when rod 785 moves up and down in response to rotation of insert cam 781. The track in the face of cam 781 is formed to reciprocate sleeves 761 twice during each cycle of operation, the first time during cutting of the washers and the second time after yoke 755 has been advanced to the forward ends of the levers and over the table plate 444, to insert the washers into the cell cans. The mechanism for advancing and retracting yoke 755 is described below.

The tape 727 from which the washers are punched is fed through die block 734 in alternately short and long feed strokes on successive cycles of operation. The purpose of such feeding of the tape is to conserve tape by punching washers from the space between the previously punched washer holes in the tape, as explained heretofore in connection with the bottom disc punch and insert machine 32. In order to feed the paper tape through alternately short and long strokes, paper feed cam 789 is driven by cam shaft 771 through reduction gears 790, 791, 792 and 793; gear 790 being keyed to drive shaft 771, cam 789 being secured to gear 793 and being rotatable therewith relative to cam shaft 771, and gears 791 and 792 being mounted on gear shaft 794 to one side of cam shaft 771, to the left as viewed in Figure 44. This gearing effects a 2:1 speed reduction between drive shaft 771 and cam 789. Feed cam 789 drives a follower on lever 797, which in turn pivots about pivot bar 784, moving vertical rod 798 up and down. The cam track in the face of feed cam 789 is cut so as to reciprocate rod 798 twice during each complete revolution of the cam, once through a short stroke and once through a long stroke. However, feed cam 789 rotates through half a revolution for each revolution of cam shaft 771 because of the reduction gearing just described. Therefore vertical rod 798 reciprocates through a short stroke on one revolution of cam shaft 771 and through a long stroke on the next revolution of the shaft.

The upper end of rod 798 is connected to segment gear 799 mounted for angular movement in a vertical plane and engaging idler gear 801 which in turn drives pinion 802 attached to a free wheeling clutch which drives feed roll shaft 803 (see Figure 45). The forward end of shaft 803 is connected to paper feed roll 805 which rotates in the plane of and engages the underside of tape 727 as the latter passes into die block 734 and feeds the tape therethrough in alternating long and short feed strokes. A spring mounted pressure roll 806 connected to toggle release mechanism 807 presses the tape downwardly against feed roll 805 to insure positive anti-slip feeding of the tape.

Longitudinal reciprocation of yoke 755 is caused by slide cam 809 which drives a follower connected to follower lever 811 pivotally mounted on pivot bar 784. Lever 811 is connected at its free end to vertical rod 813 which extends upwardly for connection to transverse rock shaft 814 through link 815. Segment gear 816 keyed to rock shaft 814 extends upwardly for engagement with a rack 817 on transverse plate 818. This plate is secured to a pair of forwardly extending slide bars 820 supported for longitudinal sliding movement on support frame 735 and connected at their forward ends to yoke 755.

When slide cam 810 rotates, slide bars 820 reciprocate longitudinally once during each cycle of operation and move yoke 755 together with slide plate 765 and stripper and inserter sleeves 761 to and from the table plate 444, permitting the yoke to pause over the cell cans in the table plate to allow the mix washers 35 to be inserted into the cell cans.

Control of the air blast in pneumatic line 749 (see Figure 41) is afforded by air cam 822 (see Figures 42 and 43) which drives follower lever 823 connected to pneumatic valves in valve housing 824. These valves are in series with a source of air pressure and pneumatic line 749 and cause the air blast to pass through die block 734 and manifold pipe 748 at the proper time to withdraw washer center hole slugs as soon as they are punched out by the dies. Vacuum communicated to cylinders 730 in cell lift plate 729 through vacuum line 732 may be supplied continuously from a suitable source and need not be turned on and off during the washer punching and inserting operation.

The operation of the entire machine will be understood from the above description and is summarized as follows: Table plate 444 carries the cell cans containing the mix into alignment with cell lift plate 729 and stops. Lower paper punches 739 move upwardly cutting six imperforate washers from tape 727 and together with downwardly positioned sleeves 761 move upwardly into lower yoke bushing 760 where the top punches 762 cut the center holes in the washers. The air blast is turned on and the center hole slugs are removed from within the lower punches 739. Lower punches then drop to their initial starting position below the tape pass line.

Yoke 755, within the lower arm of which the punched washers are disposed, is moved forwardly by slide bars 820 until the washers are vertically aligned with the cell cans in table plate 444. Cell lift plate 729 is then raised pressing the six cell cans upwardly against the lower portion of the yoke. Insert levers are then pivoted downwardly through action of the vertical rod 785, causing stripper and insert sleeves 761 to move downwardly through the yoke and to insert the washers into the cell cans on top of the mix. Levers 768 move up to withdraw the sleeves, cell lift plate 729 moves down to its starting position, the yoke is retracted into vertical alignment with the die block 734 and paper feed roll 805 indexes to move an uncut portion of tape under the punching dies for the next cycle of operation. Table plate 444 then indexes carrying another bank of cell cans to the top mix washer machine which is then ready for another cycle of operation.

The cell cans move from the mix washer machine 34 into alignment with conveyor 36 (see Figures 45 and 46) which transfers the cell cans from cell loading table 28 to cell combine table 37 for the remaining battery assembly operations.

Conveyor 36 comprises an unloading platform 826 adjacent rotatable table 444 and a belt or chain type conveyor 827 having six laterally spaced longitudinally extending endless chains 828 which carry the cell cans in six rows from unloading platform 826 to a position underneath the cell combine table 37. The main drive sprocket 830 for the six chains 828 is driven by a power takeoff means at the cell combine, and in other general respects the conveyor 36 is substantially the same as conveyor 26 described heretofore.

In order to unload six cell cans at a time from rotatable plate 444 of the cell loading table 28, conveyor unloading platform 826 mounts a block 832 which projects under the marginal edge of plate 444 and which is connected to the piston rod 833 of a reciprocatory hydraulic motor 834 secured under the platform. The top surface of block 832 is continuous and supports the bottoms of the cell cans as the latter are moved into alignment with the conveyor, the top surface of block 832 being vertically aligned with the cell holes 450 in the table plate 444. The face of the block adjacent the conveyor is formed with a plurality of depending flanges 835 which are aligned with cell guide channels 837 between the longitudinally extending guide strips 838 on the top of platform 826. These flanges are adapted to enter the ends of platform channels 827 when block 832 is pulled toward the conveyor and serve to push the bank of cell cans along the platform toward the conveyor chains. A cushioning cylinder 839 with a piston rod 840 connected to rod 833 smoothes the reciprocating movement of the block 832.

The block retracting motor 834 is operated by hydraulic pressure lines 841 which carry high pressure fluid to and from the motor, through control valves, not shown, operated in synchronism with rotation of cell loading table 28. Before the cell cans are moved into alignment with the conveyor, block 832 is in the broken line position shown in Figure 48. Plate 444 indexes and the cell cans ride over the top of the block and stop. The block is then shifted by motor 834 in a direction outwardly from the conveyor to the solid line position shown in Figure 46, permitting the cell cans to drop into channels 837 at the end of platform 826. Block 832 is then returned to its starting position, and flanges 835 thereon push the cell cans along the platform 826 toward the conveyor. The six rows of cans thus are pushed step by step from table 444 along the top of platform 826 to the conveyor chains 828 which carry them to the cell combine table 37 where the cell cans are inserted in holes adjacent the marginal edge of the table for transfer to the stations peripherally spaced around the table edge.

In practice, the cell loading table 28 and its associated cell assembly stations preferably are operated at the same speed as cell combine table 37 and its associated assembly stations so that the rates of feed of cell cans to and from conveyor 36 are the same. The number of cell cans on conveyor 36 preferably is substantially less than the capacity of the conveyor, for example, one-half the conveyor capacity, during normal operation of the apparatus. If either the cell loading table 28 or the cell combine table 37 is shut down temporarily, for example to recharge any of the associated cell assembly stations, the other table may continue to operate; conveyor 36 functioning as a cell can storage mechanism either to deliver cans to combine table 37 if cell loader table 28 is shut down or to receive cans from table 28 if the combine stable is not operating. Conveyor 26 likewise functions both to transfer and to store lined cell cans to permit temporary shut-down of either the can feed and liner insert apparatus or cell loader table 28.

IV. CELL COMBINE

The general arrangement and principle of operation of cell combine table 37 (see Figure 1) including plate 846, rotatable about a vertical axis and a plate driven and indexing mechanism, are substantially the same as that described above in conjunction with cell loading table 28. However, six operating stations are located around the edge of the cell combine table which preferably rotates in steps through an angle of 15° to advance the cell cans successively to these stations. The table drive mechanism includes power takeoff shafts which drive the operating mechanism of the several stations as well as the cell inserter and unloading machines at the cell entry and exit points of the table. Thus the combine table and the operating stations on its periphery run in synchronism with each other. Since the structures of the combine table, the drive and the indexing mechanism are substantially the same as those of the cell loading table 28, described above, further description of these parts is unnecessary.

A. *Cell inserter*

The cell inserter machine 847 (see Figures 49 and 50) has a cell receiving plate 848 on which six cell cans at a time are deposited by chains 828 of the conveyor 36. The cans come to rest on the tops of six laterally spaced cell lift plungers 849 which extend into corresponding openings in plate 848 and which reciprocate vertically and carry the cans up through openings 850 in an upper track plate 851 and into the retaining holes 852 of cell combine plate 846 which track plate 851 underlies.

Plungers 849 are reciprocated by cell lift cam 855 mounted on a drive shaft 856 within cam housing 857. Plate 851 is in the horizontal plane of track sections, similar to the sections 451 of cell loading table 28 (see Figure 24) which underlie the cell holes 852 of combine table plate 846 and over which the cell can slide when the table plate indexes. Cam drive shaft 856 is connected to a power takeoff shaft, not shown, on the cell combine drive mechanism. Drive sprocket 330 of chain conveyor 36 is rotated by helical gears 850 and drive chain 860 which are driven by shaft 856.

B. *Carbon insert mechanism*

The mechanism which feeds the carbon rods, hereinafter called carbons, and inserts them into the cell cans to become the positive electrodes or anodes of the cells, is illustrated in Figures 51–56, inclusive, and comprises a cam housing 864 in which control cams for operating the mechanism are enclosed, a magazine 865 in which a supply of carbons 866 is disposed and which is supported on the cam housing adjacent the edge of cell combine plate 846 by an upright plate 867. The carbons feed downwardly from the hopper box into horizontal and axial alignment with longitudinally reciprocable laterally spaced feed bars 869, (see Figures 52 and 56) which push six carbons at a time into a magazine 871, (see Figures 52, 53 and 56) pivotally mounted on the opposite side of mounting plate 867 and over the cell cans in the marginal part of combine plate 846. The magazine is arranged to pivot about a horizontal transverse axis between a horizontal position, indicated in broken lines in Figure 53, for receiving the carbons as they are fed from under the hopper, and a vertical position, indicated in solid line in Figure 53, for positioning the carbons in vertical alignment with the cell cans. A vertically reciprocable ejector block 872 simultaneously actuates six separate ejecting rods 873 in the magazine, when the latter is in the vertical position, and causes the carbons to be inserted fully into the cell cans.

The cell cans when positioned in front of the carbon insert machine rest on spring loaded cylinders 875 in cell lift plate 876 (see Figure 51). This plate seats the tops of the cell cans against the bottom of the magazine 871 immediately prior to insertion of the carbons into the cell cans.

The magazine 871 has six laterally spaced bores 878 (see Figure 53) each bore being fitted at its lower end with a recessed bushing 879 having a central recess or opening 880. A plug 882, press fitted in the recess of bushing 879, projects from the magazine and has its outer face closely spaced from the top of the combine plate 846, when the magazine is in the vertical position, and closely spaced from plate 867 when the magazine is in the horizontal position. Each magazine plug 882 has a central recess or opening 883 axially aligned with bushing opening 880; the diameters of these openings being slightly larger than the diameter of the carbon which may then be readily inserted into the plug and bushing for loading the magazine. In order to hold the carbons within the plugs when the magazine is swung to the vertical position, a transverse vacuum channel 884, connected to an external vacuum source, communicates with the central openings in each bushing and plug through vacuum holes 885. The vacuum so applied to the carbons prevents them from falling by gravity from the magazine when the latter is rotated to its vertical position. The outer face of each plug 882 has a can seating shoulder 886 which locates the cell can concentrically of the carbon before the latter is inserted into the mix in the can.

The ejecting rod 873 is axially movable within each magazine bore 878 and has a lower reduced portion 873a slidably guided in the bushing opening 880, and an opposite enlarged portion or head 873b against which a compression spring 887 presses to urge rod 873 to a retracted position within the magazine. A cover plate 888 on top of the magazine limits retraction of the rods 873 and is slotted at 890 at the top of each of the rods to receive one of the six ejector blades 892 mounted on ejector block 872. When the carbons within the magazine are in position to be inserted into the cell cans, the magazine being in the upright position, blades 892 on the ejector block 872 pass down through top slots 890 and move ejector rods 873 down, simultaneously compressing springs 887 and sliding the carbons out of the magazine and into the cell cans. Spring 887 retracts the rods within the magazine bores when the ejector block 872 returns to its upper position.

Magazine 871 is journalled at its sides in bearing blocks 894 fastened to the upright plate 867, (see Figures 51 and 56). Rotation of the magazine about a horizontal axis is caused by a longitudinally reciprocable rack 896 which extends through plate 867 to one side, the left side as viewed in Figure 51, of the magazine and engages pinion 897 on an extension shaft 898 connected to the magazine. The rack, when moved toward combine table 846, rotates magazine 871 counterclockwise as viewed in Figures 51 and 53, through 90° until the carbon receiving plugs 882 are horizontally aligned with feed bars 869; a lower stop plate 900 being engaged by the magazine to prevent its rotation beyond the horizontal plane. When the rack returns, the magazine is rotated in the opposite direction until the carbons in its lower end are vertical and aligned with the vertical axes of the cell cans; an upper stop plate 901 preventing rotation of the magazine beyond the vertical plane. External vacuum line 903 (see Figure 51) communicates with the channel 884 in the magazine through one of the side bearing blocks 894. A cap 904 covers the forward end of the rack 896 and permits movement of the rack therewithin.

Hopper box 865 preferably comprises an upright enclosure with its narrowest inside dimension being slightly greater than the length of a carbon so that the carbons are horizontal as they move down in the hopper. At the bottom of the hopper is an aligning block 906 (see Figure 54) which is formed with six laterally spaced longitudinally extending vertical guide slots 907 for orienting the carbons into vertical stacks ahead of feed rods 869. Block 906 is supported for limited transverse movement relative to the hopper in order to agitate and to continuously feed carbons into the guide slots 907; a clearance 908 being provided between the sides of the block and adjacent parts of the hopper to accommodate such movement of the block. For this purpose, block 906 is mounted on a shuttle block 909 which is slidably supported for lateral movement on guide pin 910 connected at its ends to brackets 911 on top of the cam housing. The top surface of shuttle block 909 has six longitudinal V-shaped carbon receiving pockets 912 (see Figure 54A) respectively underlying the slots 907 in aligning block 906, and intermediate grooves 913 engaged by ribs 914 on the aligning block in order to lock these two blocks together. Shuttle block is actuated to reciprocate the aligning block 906 through a short distance and in effect to vibrate it to facilitate the feeding of carbons. The pockets 912 are horizontally aligned with the respective feed rods 869 which advance the carbons from the pockets into the magazine.

The cams for operating the carbon insert machine are mounted on drive shaft 918 (see Figures 51, 52, 54, 55) which extends through and is journalled in cam housing 864 and which is connected to power takeoff shaft 919 of the combine table drive mechanism, not shown. Cell lift plate 876 is operated by cell lift cam 921 which causes transverse follower bar 922 connected at opposite ends to vertical lift rods 923 to reciprocate up and down once during each revolution of the cam. The upper ends of rods 923 are connected to the cell lift plate which in turn moves up to seat the cell cans thereon against plugs 882 in the magazine and thereafter returns the cell cans to the lower position in combine plate 846.

Shuttle block 909 is reciprocated by shuttle cam 925 (see Figure 54) which rocks vertically extending follower lever 926 about a fixed pivot 927 intermediate the ends of the lever. A horizontal adjustable link coupling 928 connects the upper end of follower lever 927 to the shuttle block. When shuttle cam 925 rotates, lever 926 oscillates through a short stroke once during each revolution of the cam and imparts a short transverse reciprocatory motion through the shuttle block to the slotted block 906 in the bottom of the hopper box 865 and thus agitates the carbons in the hopper.

The vertically reciprocable ejector block 872 is actuated by ejector cam 930 which drives transverse follower bar and the vertical rods 932 connected thereto in up and down motion. The upper ends of rods 932 are connected to the sides of ejector block 872 which moves ejector blades 892 up and down once during each revolution of the cam to eject carbons 866 from the magazine into the cell cans.

Longitudinal movement of the six feed bars 869 is caused by feed cam 934 (see Figures 52 and 55) mounted on transverse shaft 935 which is rotated by main drive shaft 918 through 1:1 ratio helical gears 936. Cam 934 causes vertically extending follower lever 937 to pivot about pivot shaft 938 so that the lever oscillates in a longitudinal direction toward and away from the cell combine table. The upper end of lever 937 is clevised and is connected by top link 939 to feed rod housing 940 supported on slide plate 941 for longitudinal movement in ways 942 on the top of the cam housing. The six feed bars 869 extend forwardly of the housing 941 and are backed by springs within the housing. When feed cam 934 rotates, the feed bars are advanced through shuttle block pockets 912 and through bushings 943 in upright hopper supporting plate 867, sliding six carbons ahead of the feed rods into the horizontally positioned magazine. The slide plate then returns to its starting position so that the ends of the feed rods are adjacent to and behind shuttle block pockets 912, permitting six more carbons to drop down from the guide slots 907 in front of the feed rods preparatory to the next carbon inserting operation.

The magazine pivoting rack 896 is reciprocated by magazine cam 945 mounted on transverse shaft 935 (see Figure 55) and oscillates vertically extending follower lever 946 in a longitudinal direction about a pivot 947 located intermediate the ends of the lever. The upper end of lever 946 is connected by adjustable linkage 948 to the rack bar 896 and reciprocates the bar once during each revolution of magazine cam 945 to rotate the magazine between a vertical ejecting position and a horizontal loading position.

The operation of the carbon insert machine is understandable from the above description and is summarized as follows: Combine plate indexes to move six cell cans to the cell lift plate 876 in front of the carbon insert machine. Magazine 871 is rotated to the horizontal position (see Figure 53) by the forward movement of rack 896, and feed bars 869 push six carbons from the V-shaped shuttle block pockets 912 under hopper box 866, through bushings 943 in the plate 867 and into the central openings of the plugs 882 and bushings 879 in the horizontally positioned magazine. Feed bars 869 are then retracted to their starting position, shuttle block 906 is reciprocated, and fresh carbons drop into the V-shaped pockets 912 on the shuttle block. The vacuum in magazine vacuum channel 885 holds the carbons within the magazine plugs.

Rack 896 returns to its starting position and rotates the magazine through 90° to a vertical position and the carbons are positioned vertically and in alignment with the cell cans in combine table 846. Cell lift plate 876 is raised and the tops of the cell cans are resiliently tightly seated on the adjacent faces of the magazine plugs. Ejector block 872 moves down causing ejector blades 892 to push ejector rods 873 in the magazine down through the plugs to move the carbons into the cell cans, through the mix washers and the mix in the cans, until the lower ends of the carbons engage the bottom cell can disc 29 (see Figure 2). Ejector block 872 returns to its starting position and springs 887 move the magazine ejecting rods to their upper limit. Cell lift plate is lowered and returns the cell cans to their normal transfer position in the cell combine plate 847. The combine table then indexes and the carbon insert machine is ready to repeat the operation.

C. Liner folding mechanism (station 7)

In order to prevent the battery mix 32 in each cell can from seeping up between the top mix washer 35 and the cell can liner 13, the top portion of each liner above the top mix washer is folded down and over the washer, and the perforate top washer 43 is pressed tightly on top of the folded liner portion within the cell can to hold the folded part down. The paper liner thus takes the form of a sack which is closed at the top and bottom and within which the battery mix is effectively sealed and tightly packed around the carbon.

Prior to insertion of the top washers 43, the liner tops are partially folded down by the liner folding mechanism, illustrated in Figures 57–63, inclusive. This mechanism comprises a cam housing 952 to which a cam drive shaft 953 extends for operating control cams of the machine; drive shaft 953 being connected to a power takeoff shaft, not shown, in the drive mechanism of the cell combine table 37. The front part of the cam housing underlies the rotatable combine plate 846 and has a stationary transverse plate 955 in which the lower ends of six vertical rods 956 are journalled. The upper ends of the rods 956 extend into six collets 957 which are disposed within and are actuated by a vertically reciprocable slide bracket 958 which causes the collets to clamp and release the bottom parts of the cell cans. Means are provided for rotating the collets 957 in order to spin the cell cans about their vertical axes when the collets are closed. A vertically reciprocable liner folding head 960 carrying six depending annular liner folding dies 961 is spaced above combine plate 846 with the folding dies in vertical alignment with the cell cans. The head 960 is moved down causing the folding dies 961 to enter the tops of the clamped and spinning cell cans and to fold the upper parts of the cell can paper liners inwardly.

Each collet comprises an elongated sleeve 957 (see Figures 60 and 61) having an upper or clamping end which is axially split to provide radially contractible segments, and which is slidable vertically over rod 956. The collet sleeve has a shoulder 963 engageable with a corresponding shoulder 964 on the rod to limit upward movement of the collet. A spindle sleeve 966 concentric of and generally coextensive with the collet sleeve is vertically slidable within a bore 967 in the upper part of slide bracket 958 and is arranged to move axially of and relative to collet 957 to contract and release the collet segments. The lower part of the slide bracket 958 is formed with an enlarged transverse gear chamber 969 into which the six bores 967 open and within which a collet driving gear train is disposed. This gear train comprises successively engaging spur gears 971, each mounted on a spindle sleeve 966, and a driving pinion 972 (see Figures 59, 60 and 61) at one end which drives the adjacent spindle gear for rotating all the spindle sleeves. The bottom of the gear chamber is closed by cover 974 through which the lower parts of the collet and spindle sleeves extend, and bearings 975 lock each spindle sleeve axially on the bracket. In other words, the spindle sleeves 966 are rotatable within slide bracket 958 and move vertically with the bracket.

Collets 957 are movable vertically between a retracted position, shown in Figure 60, and an extended position shown in Figure 61. That is, the top edges of the collets, when retracted, are level with the tops of rods 956 which lie in the plane, indicated at 977, of the bottoms of the cell cans; when the collets are extended, they telescope over the lower parts of the cell cans positioned on the rods 956 by combine plate 846. Then, in order to close the collets for clamping the cell cans, spindle sleeves 966 slide up relative to the collets and engage the flared ends of the collet segments. The collets thus grip the cell cans as well as the rods 956, and these parts spin in unison with spindle sleeves 966.

Each collet sleeve 957 is urged upwardly on rod 956 by a spring 978 disposed concentrically of the lower part of the rod between transverse plate 955 and the bottom of the collet sleeve. A snap ring 979 extending radially from the lower end of the collet sleeve is engageable by the bottom of the spindle sleeve 966 when the latter is moved down by slide bracket 958 so that the spindle and collet sleeves move down together when this ring is engaged, compressing spring 978 (see Figures 60 and 61). It will be noted that spindle sleeve 966 is shorter than collet sleeve 957 and that the lower end of the spindle sleeve is spaced above ring 979 in the collet sleeve when the sleeves are at their upper limits of movement (see Figure 61). Thus the spindle sleeve moves relative to the collet sleeve for a short distance during the beginning of the down movement of slide bracket and at the end of the up movement of the bracket, and this relative movement between the sleeves causes opening and closing of the collet on the cell can.

The vertically reciprocable liner folder head 960 overlies the cell cans in the combine plate 846 and has side extensions 960a and 960b (see Figures 57 and 58) which connect to the upper ends of vertically movable rods 981. The head 960 is formed with six vertical bores 982 within each of which a bushing 983 is axially movable; the bushing normally being resiliently seated against a shoulder 984 within the bore by spring 985, so that the lower part 983a of the bushing projects below the folder head and over the folder die 961. The lower face of each bushing is recessed to provide a can locating seat 986 which is concentric with the bore of the bushing and which positions the upper ends of the cans coaxially of the bore of the bushing. It will be noted that the diameter of bushing bore and the internal diameter of the can are the same.

The folder dies 961 are connected by shanks 988 to a transverse adjustment block 989 on top of the folder head, and the dies 961 are vertically adjusted by nuts 990 so that the lower ends of the dies are spaced up from the lower faces of the bushings and slightly above can locating seats 986. Each folder die 961 has a plurality of pointed tips 991 with curved inner surfaces 992, and these tips enter the top of the spinning can as the folder head 960 moves down, engage between the top of the liner and the shell of the can and ultimately bend the upper liner end inwardly from the side of the can as shown in Figures 62 and 63. The dies do not rotate and so the relative rotary motion between the dies and the cell cans cause the liners to be spun inwardly to effect uniform prefolding. It is noted that the bushing 983 initially engages the top of the cell can and locates it coaxially of the folder die 961 as the head 960 moves down. Thereafter the bushing stops, and spring 978 compresses as die 961 continues down into the can to fold the liner. The bushings return to their starting positions shown in Figure 60 when the head 960 moves to its upper limit.

The raising and lowering of the collet mechanism is caused by lift cam 994 rotated by drive shaft 953 within the cam housing. A follower 995 carried on the lower end of slide bracket 958 engages the cam track and imparts vertical motion to the bracket which is guided in slide bearings, not shown, on the front of the cam housing 952. As mentioned above, the can gripping collets 957 are closed when slide bracket moves up, and open to release the cell when the slide bracket moves down.

Vertical movement of folder head 960 is caused by folder cam 997 on drive shaft 953 and a transverse follower bar 998 which is connected at its ends to the vertical rods 981. These rods move up and down once during each revolution of cam 997 to move the folder dies into the cell cans for pre-folding the liners.

The six spindle sleeves 966 which open, close and spin collets 957 are rotated continuously about their vertical axes by spin motor 1000 (see Figures 57 and 58) mounted on the rear of the cam housing. The motor is connected by a belt drive 1001 through coupling 1002 to miter gears 1003 which rotate shaft 1004 journalled in bearings on the cam housing and extending from the rear to the front of the housing. The forward end, to the left as viewed in Figure 57, of shaft 1004 is operatively connected to a vertical shaft 1006 (see Figure 59) through another set of miter gears 1007. The upper end of vertical shaft 1006 is keyed to drive pinion 972 which drives the adjacent spindle spur gears 971 for rotating the six spindles in the train. It will be noted that the axial length of pinion 972 is greater than that of spindle spur gear 971 in order to permit vertical movement of the spindle spur gear relative to the pinion without disengaging the drive for this gear train.

Summarizing the operation of the liner folding machine, the rotatable combine plate 846 indexes to align six cell cans in front of the liner folding machine, the bottom of each can resting on the top of a corresponding collet rod 956 (see Figure 60). Lift cam 994 then causes slide bracket 958 to move up, the open collets 957 telescoping over the bottoms of the cell cans and spindle sleeves thereafter moving up to close or clamp the collets on the cans. Since the spindle sleeves rotate continuously the cell cans begin spinning as soon as they are clamped in the collets.

Folder head 960 moves down in response to the actuation of folder cam 997 causing the bushings 983 in the folder head resiliently to engage and coaxially locate the upper ends of the cell cans. Further downward movement of the folder head causes folder dies 961 to enter the cell cans and pre-fold the upper ends of the liners. Folder head 960 returns to its upper position, slide bracket 958 moves down to the position shown in Figure 60, and the cell cans are released from the collets. Combine plate indexes and carries the next set of cell cans to the liner folding machine for another folding operation.

From the liner folding mechanism, the cells are carried by the combine plate to the top washer punch and insert mechanism (station 8), which is substantially identical in structure and mode of operation to the mix washer punch and insert machine 34 described hereinbefore in conjunction with the cell loader table 28, and therefore will not be described here. Perforate top washer 43 (see Figure 2) is slightly larger in outside diameter than mix washer 35 since the former is inserted in the cell cans in close fitting relationship with the inside surfaces of the cans. Accordingly the washer punching mechanism of the top washer machine 44 is slightly larger than that of the mix washer machine to accomplish this.

An important function of the top washer machine 44 is that of finally packing the battery mix 32 tightly around the immersed length of the carbon electrode 39 in the cell can and against the side of the paper liner 13 in order to insure the proper operation of the battery. Referring to Figure 43, the corresponding stripper sleeve 761 of the top washer machine 44 is arranged to insert the top washer over the carbon and on top of the pre-folded liner and simultaneously to exert a downward compressive force on the contents of the cell can. This action of the sleeve 761 results in placement of top washer 43 tightly within the can and around the carbon electrode, folding of the top part of the can liner into a horizontal position (see Figure 2) and tightly compressing the battery mix within the liner and against the carbon to provide full uniform physical contact of these battery components.

D. *Seal insert and can spin mechanism (stations 9 and 10)*

The seal insert and can spin mechanism (see Figures 64–74, inclusive) feeds a plastic seal 1011 (see Figure 66) into vertical alignment with the cell cans in combine table 846 and inserts these seals six at a time into the tops of the cans and around the carbon electrodes therein. The cell cans are clamped and continuously rotated about their vertical axes in a rotating collet mechanism 1047, and after insertion of the seals, the upper side of each cell can is crimped or spun around the associated seal by circular die rolls 1055 to clamp and hold the seal tightly in the top of the cell can and to space the seal above top washer 43 (see Figure 2 (9 and 10)).

Referring now to Figure 64, a supply of perforate plastic seals 1011 is stored in a hopper 1012 having a rotatable bottom plate 1013 which centrifugally distributes the seals through six aligning openings 1014 in the side of the hopper and into a downwardly inclined seal feed track 1015. It will be noted that the seals 1011 have an annular flange 1016 (see Figure 66) concentric with the central seal hole 1017 and projecting from one side thereof, and track 1015 is formed with six parallel guideways 1018 (see Figure 65) that are narrower on the top than on the bottom. The seals pass from the hopper to the track only when the seals are oriented with seal flange 1016 on the top side of each seal as viewed in Figure 66. An escapement mechanism 1019 having an actuating lever 1020 operated by vertically reciprocable rod 1021 connected to the drive mechanism of the machine permits six seals at a time, one in each of the track guideways 1018, to feed down the track once during each cycle of operation. In order to insure positive movement of the seals along the guideways 1018 below the escapement mechanism 1019, an air blast manifold 1022 (see Figure 64) having six jets 1023 directed downwardly along the track, is provided.

The lower ends of guideways 1018 curve back under the track as shown in Figure 67 and invert the seals as the latter move to the discharge end of the guideways, and the seals drop from the track with seal flanges 1016 facing down. The inverted seals are deposited in six laterally spaced cavities 1024 in the front end of a longitudinally reciprocable carrier plate 1025. The carrier plate, shown in its forwardly extended position in Figures 64 and 67, is retracted to position the cavities directly under track 1015 for receiving each set of seals that drop from the track guideways 1018.

Carrier plate 1025 is shifted from its retracted position to the forward position and transfers the seals in cavities 1024 to a pickup position under pickup head 1026 and in vertical alignment respectively with six vertical vacuum tubes 1027 mounted on pickup head 1026 and with cell cans 5 in the combine plate below the carrier plate. Pickup head 1026 is supported for vertically reciprocable movement and is actuated to move tubes 1027 down through a short stroke against seals 1011 in carrier plate cavities 1024 and the seals are drawn by force of vacuum against the ends of the tubes and are carried up by the tubes when head 1026 returns to its upper position. After this pickup operation, carrier plate 1025 is retracted to the rear position to again receive another set of seals 1011 from feed track 1015. During the period carrier plate 1025 is retracted, pickup head 1026 and tubes 1027 again move down through a longer stroke and insert the seals to a predetermined depth into the tops of the cans. The pickup head and tubes then return to the upper position and are ready to begin another seal pickup and inserting cycle. It will be noted that the pickup head 1026 reciprocates through both a short stroke and a long stroke during each cycle of operation; one to remove seals from carrier plate 1025, and the other to insert the seals into the cell cans.

Pickup head 1026 comprises a transverse block having six laterally spaced vertical bores 1029 (see Figure 67) within each of which the upper end of a pickup tube 1027 is rotatably supported in an axially fixed position. The lower interior portion of each tube 1027 is fitted with a perforate plug 1032 against which the seal is held during the pickup and inserting operation. A seal locater sleeve 1034 fits around and extends below the lower face of each tube 1027 and is supported for limited axial movement relative to the tube by a transverse bar 1035 located between pickup head 1026 and the lower ends of tubes 1027. Bar 1035 is connected at its opposite ends by springs 1036 to pickup head 1026 (see Figure 70) and moves up and down with the pickup head. However, when the lower ends of sleeves 1034 engage either the carrier plate 1025 on the seal pickup stroke or the cell cans on the inserting stroke, sleeves 1034 stop, springs 1036 compress and tubes 1027 move axially relative to the sleeves.

An annular can seating recess 1039 is formed in the lower face of each sleeve 1034 and is adapted to fit over the upper edge of each cell can when the seal is being inserted into the can, and locates the can concentrically of the tube and seal thereon. Tube 1027 moving down through a stroke of predetermined length inserts the seal to the proper depth in the cell can. Springs 1036 cushion the seating of the cell cans in sleeves 1034 and allow for slight variations in the length of the cans. Since the can seating recess 1039 on sleeve 1034 is concentric with vacuum tube 1027, the seal is automatically axially aligned with the interior of the cell can and with the carbon electrode when the pickup head moves down on the inserting stroke, the cell electrode entering a central aperture in the plug during final downward movement of the tube. The outer portion of sleeve 1034, to the left as viewed in Figure 67, is cut away to provide clearance with the steady roll support bar 1062, described below, on the seal insert stroke.

Each tube 1027 is held in pickup head 1026 by a lock nut 1041 and is freely rotatable relative to the pickup head in bearings 1042. At the time the seal is inserted into the cell cans, the latter is being rotated about a vertical axis by collet mechanism 1047, and each tube 1027 begins to rotate with the cell can as the seal enters the can. The vacuum to hold the seal on the end of the tube communicates through conduit 1044 from a source of vacuum to a vacuum manifold 1045 on top of the pickup head and through each tube 1027 to the lower end of the tube.

The part of the seal insert machine which underlies the marginal portion of combine plate 444 comprises a collet mechanism generally indicated at 1047 which clamps and spins or rotates the individual cell cans about their vertical axes during the seal inserting and can crimping operations. This mechanism is actuated by vertically movable bracket 1048 and is the same in structure and mode of operation as the collet mechanism of the liner folding machine 41 and described heretofore. When combine table 844 indexes, unsealed cell cans are moved into vertical alignment with collet mechanism 1047 and the latter is actuated to move the collets over the lower portions of the cans to grip and simultaneously spin the cans about their respective vertical axes. The seals 1011 are inserted and the cans are crimped while the cell cans are thus rotated.

Preferably vacuum is applied intermittently to pickup tubes 1027. When the seals are inserted in the tops of the cell cans and over the upper parts of the carbon electrodes, the vacuum to the tubes is interrupted by suitable valve means, not shown, and the seals remain within the tops of the cans when the tubes return to the upper position.

After each seal has been inserted to the desired depth within the top of the respective cell can, the portion of the cell can above the seal is bent or spun over the marginal edge of the seal to form a top flange 1050 on the can (see Figures 68 and 69) and simultaneously the side of the cell can directly underneath the seal is grooved inwardly as indicated at 1051. The seal 1011 thus is squeezed and locked tightly within the upper end of the can between flange 1050 and groove 1051 and a desired spacing 1053 between the seal and top washer 43 is maintained.

The mechanism for flanging and grooving the cell cans in this manner comprises six die rolls 1055, one for each cell can, revolubly mounted on a vertically inclined axis on the underside of carrier plate 1025 adjacent the forward end thereof, to the left as viewed in Figures 64 and 67. Each die roll is formed with an annular ridge 1056 (see Figure 68), the under and outer surfaces of which are at right angles to each other to form a flange bending edge 1057 on the ridge. An annular rounded projection 1059 is formed on the lower edge of the die roll and is spaced below the edge 1057 of ridge 1056 by a distance corresponding to the thickness of seal 1011. After the seal has been inserted into the cell can by the vertical movement of pickup head 1027, carrier plate 1025, having previously been retracted to the right as viewed in Figure 67, moves to the left as viewed carrying a new supply of seals into alignment with the pickup head. At the limit of this forward movement of the carrier plate, die rolls 1055 engage the upper sides of the cell cans and annular ridges 1056 and projections 1059 on the rolls simultaneously form top flanges 1050 and anular grooves 1051 in the cell cans as indicated in broken lines in Figure 68.

In order to support the tops of cell cans during this crimping operation, a plurality of laterally aligned steady rolls 1061 (see Figures 67, 70 and 73) are rotatably supported on a transverse bar 1062 adjacent the tops of the cell cans. Two steady rolls are provided for each cell can to steady this cell can while it is being crimped. Larger backup rolls 1064 engage the opposite sides of the pairs of steady rolls and reinforce them. The steady and backup rolls, like die rolls 1055, are free to rotate with the cell cans during the crimping operation. In order to provide clearance between the steady rolls 1061 and the cell cans when combine table 846 is indexed, steady roll bar 1062 is supported for limited vertical movement between an inoperative position above the tops of the cell cans and an operative position engaging the sides of the cell cans directly opposite die rolls 1055; the combine plate indexing when bar 1062 is raised to the inoperative position above the cell cans.

The seal inserting and can crimping operations occur in sequence in the following manner: Assume, for sake of illustration, that the set of six cell locator holes in combine plate 846 which underlie pickup head 1026 initially are empty. Carrier plate 1025 with seals 1011 deposited in cavities 1024 is advanced into vertical alignment with vacuum tubes 1027 of the elevated pickup head 1026. Tubes 1027 then move down with pickup head 1026 to engage the top sides of the six seals, and vacuum in the tubes causes the seals to adhere to the lower faces of the tubes. Pickup head then moves up and the seals are elevated above the carrier plate which then is retracted from under the pickup head. At this time in the operation of the machine, steady roll bar 1062 is in its upper position and die rolls 1055 have moved with the carrier plate away from combine plate 846. The combine plate indexes and moves six unsealed cans under the pickup tubes 1027, respectively, and over the collet mechanism 1047. The cans are then gripped and rotated by the collet mechanism. Pickup head 1026 moves down and the upper edge of each cell can is engaged and centered by sleeve 1034, and as the pickup head continues to move down, sleeves 1034 seat tightly on the cans, compressing springs 1036 on locator bar 1035, and tubes 1027 move down relative to the sleeves. The seals 1011 on the ends of the tubes pass over the tops of carbon electrodes 866 and move into the cans to a predetermined depth. The pickup head and tubes return to the upper position leaving the seals tightly fitted in the cell cans. This completes the seal inserting step of the assembly operation.

The can crimping or spinning operation occurs next. With the cell cans rotating and in the same position in combine plate 846, steady roll bar 1062 moves down and steady rolls 1061 slide over and engage the upper portion of each can. Carrier plate 1025 again advances from the retracted position toward combine plate with a new set of seals which were deposited in cavities 1024 from feed track 1015. At the forward limit of movement of the carrier plate, die rolls 1055 engage the upper parts of the cans, begin rotating with the cans, and form top can flange 1050 and groove 1051. At the same time the can is being crimped, pickup head 1027 successively moves down, picks up seals 1011 from the carrier plate cavities 1024, and returns to the upper position. Carrier plate 1025 then retracts, steady roll bar 1062 moves up, collet mechanism 1047 releases the cell cans, combine plate 844 indexes, and the machine is ready for another cycle of operation.

Cams for operating the above described mechanism are enclosed in cam housing 1066 (see Figure 64) and are mounted for rotation on cam drive shaft 1067 connected through coupling 1068 to combine table drive mechanism and extending through and journalled in bearings on the cam housing. Collet actuating cam 1069 on the front end of drive shaft 1067 is operatively connected to bracket 1048 of collet mechanism 1047 for reciprocating the bracket to open and close the collets in the manner described heretofore in conection with the liner folding machine 41.

The transverse bar 1062 which mounts steady rolls 1061 and backup rolls 1064 is reciprocated vertically by cam 1070 through transverse follower bar 1071 (see Figure 70) connected to vertical tubular posts 1072 which extend through guides in the top of the cam housing for connection to the rearwardly extending side arms 1073 of the transverse bar 1062 (see Figure 73). As cam 1070 rotates, the transverse steady roll bar 1062 is caused to reciprocate vertically once during each cycle of operation and in synchronism with movement of seal carrier plate 1025 as well as the indexing mechanism of combine plate 844.

Vertical movements of pickup head 1026 are caused by rotation of pickup head cam 1074 which vertically reciprocates an inverted V-shaped transverse follower bar 1075 (see Figure 70). Opposite ends of bar 1075 are connected to vertical rods 1076 which extend through and above tubular posts 1072 and connect to opposite ends of the pickup head 1026. Movement of the pickup head therefore is independent of movement of steady roll support bar 1062. The follower track of cam 1074 is formed to cause successively a long and a short reciprocating movement of the pickup head during each revolution of the cam, the long stroke for inserting seals into the cell cans, and the short stroke for picking up seals from carrier plate 1025.

The escapement mechanism 1019 on the inclined seal feed track 1015 is operated by rod 1021 (see Figure 64) which is connected to and is vertically reciprocable with pickup head 1027. Rod 1021 overlies and engages escapement actuating lever 1020 which is responsive only to movement of rod 1021 on the seal inserting stroke of the pickup head, that is, the long stroke, to cause the escapement mechanism to release a set of six seals for movement down the track to the retracted carrier plate.

Longitudinal reciprocation of carrier plate 1025 is caused by helical gear 1077 on drive shaft 1067, which gear meshes with a helical gear 1078 on transverse shaft 1079 (see Figure 74) journalled for rotation in upright support plate 1080 and the side of the cam housing. Carrier plate cam 1082 is mounted on transverse shaft 1079 and operatively engages vertically extending follower bar 1083 and oscillates it in a longitudinal plane about a lower fixed pivot tube 1084. The upper end of bar 1083 is adjustably connected to link 1085 (see Figure 64) by a spring 1086, and this link is pivotally connected at its forward end to a clevis 1087 which is secured to the underside of a slide 1088 and which extends through a slot 1089 in the top of the cam housing. Slide 1088 rides in longitudinal ways 1090 (see Figure 70) on the top of cam housing 1066 and is secured to an intermediate plate 1091 which is connected at its rear end to a longitudinal adjustment plate 1092 by an adjustable bracket 1093 (see Figure 64). Seal carrier plate 1025 is secured to the forward end of plate 1092 and the limit of forward movement of the carrier plate is controlled by adjustment of bracket 1093 while the rear limit of carrier plate movement is determined by an adjustable stop screw 1094 on the top of cam housing 1066 to the rear of adjustment plate 1092 and engageable with it when carrier plate is retracted.

Carrier plate 1025 is reciprocated once during each cycle of operation by the mechanism just described. It will be noted that the carrier plate and associated parts perform two functions when reciprocated: transfer of seals 1011 from guide track 1015 to tubes 1027 of pickup head 1026, and movement of die rolls 1055 into engagement with the cell cans to form the upper ends of the cans around the seals.

A collet drive motor 1098 is supported on the rear upper portion of cam housing 1066 (see Figures 64 and 74) and is connected by a belt drive generally indicated at 1099 to a stub shaft 1100 journalled on the side of the cam housing and extending inwardly thereof to drive forwardly extending collet drive shaft 1102 through a pair of miter gears 1103. Shaft 1102 is operatively connected at its forward end to collet mechanism 1047 for continuously rotating the can clamping collets.

Bottom plate 1013 of seal hopper 1012 is rotated continuously by a vertical shaft 1105 which is operatively connected to the rear of cam drive shaft 1067 through miter gears 1106. Shaft 1105 extends through a tubular hopper supporting post 1107 and is connected at its upper end of the hopper bottom plate 1013.

E. *Electrode cap placing mechanism (station 11)*

After the tops of the cell cans have been sealed, the upper end of the carbon electrode 866 of each cell is fitted with a cup-shaped brass terminal cap 1114 (see Figure 78) by the cap placing mechanism 50 shown in Figures 75–77, inclusive. This machine comprises a cap supply hopper 1115 having a rotatable bottom plate 1116 which centrifugally feeds caps through openings in the side of the hopper to a six-channel feed track 1118 which inclines downwardly from the hopper. The channels or guideways in the track 1118 along which the caps move are formed so as to receive caps from the hopper only when the caps are oriented with their open ends facing down as they move along the track as indicated at 1114' in Figure 75.

The lower end of inclined track 1118 joins a vertical track extension block 1119 (see Figure 76) which orients the caps 1114 in six vertical rows with the open end of each cap facing rearwardly, to the right as viewed in Figure 76, and guides the six rows of caps to V-shaped notches 1120 on a cap position plate 1121 located in front of block 1119. The notches 1120 are longitudinally aligned with six laterally spaced horizontally extending push rods 1122 which are resiliently mounted in a reciprocable housing 1123 behind block 1119 and which slide within suitable openings in block 1119 to push six caps at a time forwardly from the notches 1120 in the position plate into a cap inverting magazine 1125 located in front of block 1119.

Magazine 1125 extends across the front of the machine (see Figure 77) and above combine plate 846 in which the cell cans 5 to be capped are held, and is supported at opposite ends for oscillatory movement about a horizontal axis in bearing blocks 1126 mounted on the upper frame 1127 of the machine. The magazine has six laterally spaced diametric bores 1129 (see Figure 76) longitudinally aligned respectively with the six cap holding notches 1120 in position plate 1121, and each magazine bore is fitted with a bushing 1130 having an axial lower bore 1131 within which one end of an axial eject plunger 1133 is disposed. Plunger 1133 extends through a guide block 1134 secured to the periphery of the magazine and normally is urged to a retracted position with the outer end of the plunger projecting beyond the guide block by spring 1135 within bushing 1130. When the several plungers 1133 are in this retracted position, the lower end of each plunger is spaced inwardly from the end of the bore 1131 of the bushing 1130 to provide a cap receiving recess or cavity 1137 adjacent the periphery of the magazine. When the magazine is rotated about its horizontal axis until the magazine bores 1129 are horizontal, that is, the magazine is displaced 90° counterclockwise from the position shown in Figure 76, the cavities 1137 are aligned with push rods 1122, respectively, and are in position to receive caps from position plate notches 1120 when the push rods are advanced. Vacuum channels 1138 in the magazine communicate with the magazine cavities 1137 when plungers 1133 are retracted and hold the caps in the cavities when the magazine is rotated 90° clockwise, as viewed, to the position shown in Figure 76 to swing the caps, open end down, into vertical alignment with the carbon electrodes of cell cans 5 in combine plate 846.

The portion of each plunger 1133 that projects outwardly from guide block 1134, when the plunger is in the vertical position shown in the drawing, is engageable by actuating plungers 1140 carried in a vertically reciprocable ejecting head 1141 and resiliently backed by compression spring 1142 in the head. When ejecting head 1141 moves down, actuating plungers 1140 engage the tops of eject plungers 1133 and cause the latter to push caps 1114 in cavities 1137 out of the magazine and on top of the carbon electrodes 866.

Accurate alignment of cavities 1137 with push rods 1122 when the magazine is rotated to the loading position and alignment of the cavities with the cell can electrodes when the magazine is rotated to the cap ejecting position is caused by horizontal and vertical stop blocks 1144 and 1145 (see Figures 76 and 77) mounted on one of the magazine bearing blocks 1126 for engaging respectively opposite sides of plunger guide block 1134 at the limits of rotation of the magazine.

Cell cans 5 when positioned by combine plate 846 to receive caps 1114, rest on the tops of cell lift rods 1147 which are movable vertically through the top of the cam housing to press the upper ends of the cell cans against the bottom of the magazine concentrically of the bores 1129 in the magazine. When the cell cans are thus pressed against the bottom of the magazine, the tops of the carbon electrodes are adjacent the mouths of cavities 1137 and the caps retained therein so that downward movement of eject plungers 1133 push the caps over the tops of and tightly on the electrodes.

Cams for operating the mechanism just described are disposed in a cam housing 1149 and are rotated by a drive shaft 1150 journalled in bearing housing 1151 to the combine table drive mechanism and extending through the lower part of and supported for rotation on the cam housing. Cell lift cam 1153 vertically reciprocates cell lift rods 1147 once during each cycle of revolution by means of follower bar 1154 driven by the cam and connected at opposite ends to vertical bars 1155. These bars extend up for connection to a transverse lift rod block 1156 (see Figure 77) in which the several cell lift rods are mounted. As cam 1153 rotates, block 1156 and lift rods 1147 move up and down once during each cycle of operation to press the cell cans against the bottom of magazine 1125.

Vertical movement of ejecting head 1141 is caused by eject cam 1158 which, when rotated by drive shaft 1150, vertically reciprocates transverse follower bar 1159 and vertical rods 1160 connected to opposite ends of the follower bar. Rods 1160 extend up to the top of the cam housing and connect to opposite ends of ejecting head 1141. When cam 1158 causes ejecting head 1141 to move down, actuating plungers 1140 press against eject plungers 1133 in the magazine which press the caps over the tops of the carbon electrodes 866 in the cell cans. As the cam continues to rotate, head 1141 returns to its upper position, and provides sufficient clearance between engaging surfaces of plungers 1133 and 1140 to permit the magazine subsequently to rotate without interference.

Rotation of the magazine 1125 about its horizontal axis between the cap receiving and cap ejecting positions is caused by magazine cam 1162 which vertically reciprocates follower bar 1163 and vertical tie bar 1164 connected thereto. The upper end of tie bar 1164 is operatively connected to segment gear 1166 which engages rack teeth 1167 on longitudinally reciprocable rack bar 1168. The front end of rack bar 1168 adjacent the magazine operatively engages the magazine through a rack and pinion, not shown, and causes limited oscillatory movement of the magazine about its horizontal axis as the rack bar is reciprocated longitudinally.

Longitudinal reciprocation of cap push rods 1122 is caused by push rod cam 1170 which vertically reciprocates rack 1171, the upper end of which engages pinion 1172. A slide 1174 on which push rod housing 1123 is mounted has teeth which are engaged by pinion 1172, and the housing 1123 is caused to reciprocate longitudinally as pinion 1172 is oscillated.

Hopper 1115 is supported by post 1176 on the rear of the cam housing, and drive shaft 1150 driving miter gears 1177 rotates hopper shaft 1178 for turning hopper bottom plate 1116.

The operation of the electrode cap placing machine is summarized as follows: Combine plate 846 indexes and positions uncapped cell cans over cell lift rods 1147. Magazine 1125 is rotated counterclockwise as viewed in Figure 76 by rack bar 1168 to position cavities 1137 adjacent feed track extension block 1119. Push rods 1122 are advanced forwardly by rotation of push rod pinion 1172, and the caps in notches 1120 of position plate 1121 are carried by the push rods into magazine cavities 1137 and are retained therein by vacuum. The push rods are retracted to the starting position and the magazine is rotated in a clockwise direction, as viewed, to position caps directly over the carbon electrodes in the cell cans. Cell lift rods 1147 then move up to press the cans against the bottom of the magazine and ejecting head 1141 moves down causing plungers 1133 in the magazine to press the caps on the carbon electrodes. Ejecting head 1141 returns to its upper position, cell lift rods are lowered and combine plate indexes to complete the cycle.

F. *Negative terminal soldering mechanism (station 12)*

After the caps 49 have been placed on top of the carbon electrodes 39, the cells are moved by rotatable combine plate 846 to the negative terminal soldering mechanism 53 (see Figures 79–90, inclusive) which feeds, shears, forms and solders the negative terminal wire 52 (see Figure 2) to the upper end of the cell can 5.

The soldering mechanism 53 comprises a cam housing 1182 which is supported on the cell combine table adjacent the periphery of combine plate 846 (see Figure 79). Housing 1182 encloses cams for operating the components of the mechanism and supports an upwardly extending frame comprising a pair of upright members 1183 mounted on the side edges of rear housing top plate 1184 and longitudinal beams 1185 secured to the tops of the upright members. The ends of the beams remote from combine table 846, the right end as viewed in Figure 79, support six separate terminal wire reels 1187 which are mounted on a common shaft 1188 journalled for rotation about a transverse axis to feed six strands 52' of negative terminal wire to the forward parts of the machine. The negative terminal wire, prior to being wound on reels 1187, preferably is tinned with a coating of solder which is sufficient to form a bond between the wire and cell can during the soldering operation described below.

The opposite ends of beams 1185 proximate to the combine table support a transversely extending flux bath trough 1191 which contains a suitable flux solution and carries a wire guide roller 1193 for immersing the wire strands that pass from the reels in the flux bath. The flux-coated wire strands 52' then pass around an idler roll 1195 journalled on brackets 1196 on the ends of beams 1185 and formed with six annular wire guide grooves 1197 which direct the wire strands down between spring pressed backup rolls 1198 to a stationary vertical wire guide unit 1199 which is supported on the lower ends of brackets 1196. Guide unit 1199 preferably comprises a pair of juxtaposed plates 1199a and 1199b (see Figure 83) each having six vertically extending opposed wire receiving grooves 1200 which are substantially vertically aligned with the six cell cans in the combine table 846 and through which grooves the strands of wire are guided to the shearing and clamping mechanism below.

Shear housing 1201 is directly below guide unit 1199 and has six laterally spaced vertical wire receiving bores or holes 1202 and is mounted for vertical reciprocating movement on a transverse housing support bar 1204 (see Figures 79 and 80) connected at opposite ends by brackets 1205 to vertically extending laterally spaced actuating rods 1206 and 1207. A transverse shear blade 1208 (see Figures 83 and 85) having forwardly extending laterally spaced wire receiving recesses 1209 generally vertically aligned respectively with wire holes 1202 and defined by side cutting edges 1210 is mounted under the shear housing with recessed edge of the blade spaced below the ends of wire holes 1202 in the housing. The body of shear blade 1208 is fastened to the bottom of a shear blade carrier block 1212 (see Figure 83) slidably supported in shear housing 1201 for limited transverse movement between a shear open position with shear blade recesses 1209 vertically aligned with the wires and a shear closed position with the recesses offset from the wires. The lower face of block 1212 extends slightly below the shear housing and thus the recessed or cutting edge of the shear blade is spaced below the lower ends of wire holes 1202 in the shear housing preferably by a distance equal to the diameter of the terminal wire so that the upper surface of the shear blade can bend the severed end of each wire at right angles during the shearing operation.

In order to reciprocate the shear blade transversely of the wires to sever and bend the same, one end of carrier block 1212, the left end as viewed in Figure 80, is formed with a tapped hole engaged by a shear blade actuating screw 1214. The shank of screw 1214 is journalled in a bearing block 1216 on transverse bar 1204 and is connected to a lever 1218 which causes the screw to rotate in opposite directions and thereby to reciprocate carrier block 1212 and shear blade 1208 relative to the shear housing transversely of the wires.

A generally U-shaped vertically movable yoke 1220 (see Figures 79, 80 and 82) is mounted on a pair of laterally spaced vertically reciprocable tubular yoke supporting posts 1221 which are supported in slide bearings on top plate 1184 of the cam housing and which are concentric with actuating rods 1206 and 1207. The yoke 1220 projects forwardly from these parts over the combine table and under shear housing 1201 (see Figure 79). Mounted within the forward part of yoke 1220 and intersecting the vertical plane of the wires is a wire clamp block 1223 (see Figures 86 and 87) having six wire clamps 1224, each clamp comprising laterally movable jaws 1224a and 1224b which extend out from block 1223 and between which a wire strand 52' is clamped. The projecting end parts of jaws 1224a and 1224b of each clamp are formed with opposed vertical wire engaging grooves 1226 (see Figures 88 and 89) which are vertically aligned with the wire holes 1202 in shear housing 1201. The lower edge of each jaw adjacent grooves 1226 extends down to form a V-shaped pressure point 1228 (see Figure 90) and the upper outer end part of the jaw is formed with a flat or plane surface 1229 across which shear blade 1208 slides when yoke 1220 is raised to position clamp housing 1223 directly under the shear housing 1210 for cutting the wire.

In order simultaneously to open and close the six pairs of clamping jaws 1224a and 1224b, clamp block 1223 carries a pair of juxtaposed slides 1231 and 1232 (see Figures 87) which are arranged to slide transversely in the block simultaneously in opposite directions relative to each other. The six jaws 1224a are connected to slide 1231 and jaws 1224b are connected to slide 1232. Slides 1231 and 1232 are reciprocated simultaneously in opposite directions by means of a double threaded screw 1233 having oppositely threaded parts 1234 and 1235 engageable respectively with slides 1231 and 1232. Rotation of screw 1233 in one direction causes slides 1231 and 1232 to move oppositely in the direction of the arrows in Figure 87 to separate or open each pair of jaws while rotation of the screw in the opposite direction closes the jaws. Screw 1233 is engaged by a downwardly extending lever 1237 (see Figure 86) connected to a longitudinally extending link 1238 (see Figure 82) which is reciprocated by a cam mechanism to open and close clamp jaws.

After the L-shaped negative terminal 52 is formed and cut, it is carried down by the clamps 1224 to the top of the cell can 5 until the short horizontal leg of the terminal engages the top flange of the cell can. Each negative terminal 52 is then soldered to the cell can by passage of an electric current through the short terminal leg and the external can part of the cell.

In order to solder the negative terminal to the cell can, a contact rotor 1240 (see Figures 82, 86 and 90) is supported adjacent and slightly above the periphery of combine table 846 within the open central part of U-shaped yoke 1220 by a pair of longitudinal laterally spaced support arms 1242 secured remote from the combine table to a transverse plate 1243 on top of cam housing 1182. Contact rotor 1240 is journalled in support arms 1242 for rotation about a horizontal axis, one end of rotor 1240, the upper end as viewed in Figure 82, being connected to a downwardly extending link 1244 which is rocked through approximately 90° by cam actuated linkage to pivot the rotor correspondingly.

Rotor 1240 carries six laterally spaced contacts 1245, preferably made of carbon, which project slightly from the front end of the rotor and which are electrically insulated from each other. A terminal plate 1247 for each carbon contact is mounted on the rotor and is connected to flexible electric cable 1248 which carries electric current from a suitable source to the contact for soldering the terminal wire to the can. Rotor 1242 pivots or rocks to move the contacts 1245 between an operative or soldering position shown in Figure 86 with the contacts horizontal and engaging the upper parts of the short legs of the negative terminals, and an inoperative position with the contacts extending up and offset from the vertical plane of the wires.

In order to complete the electric circuit through the cell can, an electrical connection is made to the bottoms of the cell cans by six contact pins 1250 (see Figure 86) mounted in a transverse bar 1251, preferably made of insulating material, connected at opposite ends to vertical cell lift rods 1253 which extend up from and are vertically reciprocated by cam mechanism in the cam housing. A flexible electric cable 1254 is connected to each contact pin by terminal connector 1255 on cross bar 1251, moves up and down with the bar and completes the circuit through the cell can. The contact pins 1250 are guided in vertical movement by apertures in cell track 1257 which preferably is made of suitable insulating material and which is supported on the cam housing.

The operations of cutting, bending, positioning and soldering the terminal wires are performed as follows: Initially, contact pins 1250 are lowered so that the upper ends of the pins are even with the top of cell support track 1257, both the shear housing 1201 and wire clamp block 1223 are raised and clamp jaws 1224 are closed to grip the wires directly under the shear blade 1208 (see Figure 88), and contact rotor 1240 is in the up or inoperative position. Combine plate 846 indexes and moves a set of six cell cans in front of the terminal soldering machine 53 and on top of pins 1250. Shear blade 1208 is actuated to move over the tops of clamp jaws 1224, transversely of the wires (see Figures 88 and 89) and simultaneously shears each wire to form a negative terminal of predetermined length and bends the cut end of the upper length of wire at a right angle against the bottom of the shear block. This forms the short horizontal leg on the next terminal wire to be cut, the short leg on the terminal wire that is gripped in clamp jaws 1224 having been formed on the next preceding wire cutting cycle. Yoke 1220 in which clamp block 1223 is mounted moves down carrying the six clamped terminal wires toward the cell cans, and contact pins 1250 simultaneously move up, raising the cell cans. This continues until the horizontal leg of each terminal wire engages the upper flange of the respective cell can. At the same time, the pressure points 1228 on the lower edge of the clamp jaws engage top caps 49 on carbon electrodes 39 of the cells and press the cell cans tightly against lower contact pins 1250 to make a good electrical contact between the pins and cell cans.

While wire clamps 1224 are moving down to position the terminal wires against the tops of the cell cans, brackets 1205 carrying shear housing 1201 also move down a predetermined distance to draw or feed the proper length of wire from reels 1187. This feeding action occurs because each wire is hooked under the bottom of the shear housing by the bend of the wire and accordingly the wire is pulled down around idler roll 1195, between pressure rolls 1198 and through guide unit 1199 when the shear housing is lowered on this feed stroke. The shear housing is then returned to the upper position, and since the wires are only loosely disposed in the shear block guide holes 1202, the housing passes up over the wires, leaving the proper length of wire, corresponding to the vertical travel of the shear housing, projecting from the bottom of the shear housing.

With the terminal wires engaging the tops of the cell cans, contact rotor 1240 is rotated, counterclockwise as viewed in Figures 79 and 86, until the projecting end of each contact 1245 engages the top side of the terminal short leg (see Figure 90), thereby making an electrically continuous path or circuit between contact 1245 and pin 1250 through the lower part of the terminal wire and the can part of the cell. Contacts 1245 and 1250 are connected to a circuit including a low voltage high amperage current source and a timing device, and electric current passes for a timed period through the junction of the wire and cell can, and the heat generated at this junction melts the solder on the wire. When the current flow stops, the solder hardens and firmly bonds the upright negative terminal wire to the cell can.

Clamps 1224 then open by rotation of jaw actuating screw 1233 until the jaws 1224a and 1224b of each clamp are laterally spaced by a distance slightly greater than the length of the bent leg on the terminal wire. Yoke 1220 is raised, and the opened clamp jaws pass up and over the length of uncut terminal wire depending from the bottom of shear housing 1201 until the upper surfaces 1229 of the jaws are adjacent the bottom of shear blade 1208. The clamp jaws close and tightly grip each wire directly below the shear blade. Simultaneously contact rotor 1240 is rocked clockwise, as viewed in Figures 79 and 90, about its axis to the inoperative position, contact pins 1250 are lowered and combine table 846 indexes to begin another cycle of operation.

The cams for operating the mechanism just described are rotated by shaft 1259 (see Figure 79) journalled in bearings 1260 in the lower section of cam housing 1182 and operatively connected to the drive mechanism of the combine table 845. Cell lift rods 1253, the transverse bar 1251 on top of the cell lift rods and the contact pins 1250 on bar 1251 are vertically reciprocated once during each revolution of shaft 1259, corresponding to one cycle of operation of the machine, by cell lift cam 1262 on shaft 1259 and a transverse cam follower bar 1263 connected at opposite ends to the cell lift rods. The track in the cam is formed so as to cause the cell cans to be lifted up by contact pins 1250 from the level of can track 1257 at the same time clamp block 1223 is lowered and immediately prior to the soldering operation.

Vertical reciprocation of shear housing 1201 for pulling or feeding terminal wire from each of the six reels 1187 is caused by wire feed cam 1265 which rotates with shaft 1259 and moves transverse follower bar 1266 up and down. This follower bar is connected at opposite ends to the lower parts respectively of vertical shear lift rods 1206 and 1207 which are connected at their upper ends by brackets 1205 to shear housing 1201. As cam 1265 rotates once during each cycle of operation, rods 1206 and 1207 move shear housing 1201 down to feed terminal wire from the reels and then return shear housing 1201 to its starting position. Rods 1206 and 1207 extend through and slide within tubular yoke actuating posts 1221 so that movements of rods 1206 and 1207 and of posts 1221 are independent of each other. While rods 1206 and 1207 move vertically together to lower and raise the shear housing, each rod is rotated in opposite directions about its axis independently of the other rod by cam mechanisms described below. Such rotation of rod 1206 is used to operate shear blade 1208, and rod 1207 is employed in a similar way to cause opening and closing of the clamps 1224.

Cams for operating the other parts of the machine are mounted on a transverse shaft 1268 (see Figures 79 and 81) which is rotated at the same angular velocity as shaft 1259 by a helical gear 1269 keyed to shaft 1268 and engaging a similar gear 1270 on shaft 1259.

Transverse movement of shear blade 1208 once during each cycle of operation is caused by shear cam 1272 mounted on the right end of transverse shaft 1268 as viewed in Figure 81. Cam 1272 drives vertically extending follower bar 1273 (see also Figure 79) which is pivoted at its upper end on transverse pivot bar 1274 mounted on opposite sides of the cam housing. The lower end of follower bar 1273 is pivotally connected to a forwardly extending link 1276 which in turn is pivotally connected to a vertically stationary rocker 1277 splined or keyed to the lower end of rod 1206. The splined connection of rocker 1277 to rod 1206 permits the rod to move vertically relative to rocker 1277 and to turn about its axis in response to rocking of the rocker. Rotational movements of rod 1206 are transmitted to shear screw actuating lever 1218 by a link 1279 (see Figure 79) pivotally connected to lever 1280 (Figure 84) secured to the upper part of rod 1206. The opposite or forward end of link 1279 is pivotally connected to screw actuating lever 1218 which causes shear blade 1208 to reciprocate transversely of the wires when rod 1206 is rotated in opposite directions by shear cam 1272.

The clamp actuating screw 1233 (see Figure 87) is rocked to open and close the wire clamps 1224 by clamp cam 1282 mounted on the left end of transverse shaft 1268 as viewed in Figure 81 and is operatively connected to clamp screw 1233 by linkage corresponding to the linkage associated with shear cam 1272 described above. Clamp cam follower bar 1283 is pivotally mounted at its upper end on pivot bar 1274 and is connected at its lower end to longitudinally extending link 1284 (see Figure 82). The opposite end of link 1284 is pivotally connected to rocker 1286 which is splined to the lower end of vertical rod 1207. Rod 1207, like rod 1206, is slidable vertically within rocker 1286 and is rotated about its vertical axis by rocker 1286 when link 1284 reciprocates longitudinally. This rotary motion of rod 1207 is transmitted to a similar upper rocker 1287 mounted on the yoke post 1221, shown at the lower part of Figure 82, so as to be movable vertically with this post relative to rod 1207, and for this reason upper rocker 1287 is splined or keyed to rod 1207. Upper rocker 1287 has its outer end pivotally connected to longitudinally extending link 1288 which transmits angular movements of the rocker to clamp screw actuating lever 1237 adjacent the clamp block. When clamp cam 1282 makes one revolution corresponding to a cycle of operation, rod 1207 rocks about its axis due to rocking of lower rocker 1286, and, through upper rocker 1287 and link 1288, causes screw 1233 to rotate correspondingly to open and close wire clamps 1224. It will be noted that lower rocker 1286 is vertically stationary while upper rocker 1287 rides up and down over rod 1207 with the associated yoke lifting post 1221 so that opening and closing of the wire clamps is independent of vertical movement of the clamps.

Vertical movement of clamp block 1223 for transferring the terminal wires to the cell cans for soldering same is caused by yoke cam 1289 (see Figures 81 and 82) which rocks follower bar 1290 in a vertical plane. Bar 1290 is pivotally connected at its rear end to a transverse pivot bar 1292 (see Figure 79) and at its opposite end to a short vertical link 1293 which connects to a transverse rigid strap 1294. The lower ends of yoke posts 1221 are fixed to opposite ends of strap 1294 so that the yoke posts move up and down with the strap and impart this movement to yoke 1220 connected to the upper ends of the posts. Clamp block 1223 with its clamp 1224 is mounted on and moves with the yoke. As yoke cam 1289 rotates, follower bar 1290 pivots down and up about pivot bar 1292 and thus causes yoke 1220 and clamp block 1223 to reciprocate vertically once during each revolution of the cam.

Rotation of contact rotor 1240 between operative and inoperative positions and actuation of electrical circuit energizing means for passing soldering current through the cell cans and terminal wires, is caused by rotor cam 1296 (see Figures 81 and 82) on transverse shaft 1268. This cam drives vertically extending follower bar 1297 pivoted at its lower end on pivot bar 1298 and connected at its upper end to a longitudinally extending adjustable link 1299 which reciprocates longitudinally in response to rocking of follower bar 1297 and transmits this motion to rotor actuating lever 1244 (see Figure 86) at the rotor 1240 through a link extension 1300. Actuation of the electric circuit energizing means is caused by a normally open snap switch 1302 (Figure 79) having an actuating plunger 1303 and being mounted on the rear of the cam housing with plunger 1303 in longitudinal alignment with rotor cam follower bar 1297. A switch actuating bar 1305 slidably mounted in bushing 1306 on the rear of the cam housing extends between switch plunger 1303 and the upper end of follower bar 1297 and is reciprocated longitudinally by the latter in response to rotation of rotor cam 1296. A concentric return spring 1307 between the front end of switch bar 1305 and bushing 1306 keeps bar 1305 in engagement with follower bar 1297 at all times.

Switch 1302 is in electrical series preferably with an alternating current power source (not shown) connected to a bank of six transformers 1309, one for each set of cell can contacts 1224 and 1250, which supply a large current at low voltage to the contacts. These transformers are mounted on top of the cam housing as shown in Figure 79 and are electrically connected respectively to contact cables 1248 and 1254 through a terminal block 1310. The power source to which switch 1302 is connected also preferably includes a timing mechanism for accurately controlling time during which soldering current flows.

As rotor cam follower bar 1297 pivots clockwise, as viewed in Figure 79, in response to rotation of cam 1296, link 1299 moves rearwardly, from left to right as viewed in Figure 79, and causes rotor 1240 to pivot in a counterclockwise direction, as viewed, to move contacts 1245 into the soldering position. The same movement of follower bar 1297 causes switch actuating bar 1305 to depress plunger 1303 of switch 1302 and close the connection of the power source to transformers 1309. Current then flows through the terminal wires and cell cans for a predetermined time to solder these parts together and is turned off by the timing mechanism associated with the power source. Thereafter cam follower bar 1297 pivots in the opposite direction causing contact rotor 1240 to rotate to the inoperative position and simultaneously opening switch 1302.

G. Cell wrapping and unloading mechanism (station 13)

In order to insulate and protect the outside of each cell can, a treated paper wrapper is placed around the cell can in such a manner as to enclose the side of the can while leaving its ends exposed. If the cells are to be used in battery packs comprising a plurality of electrically connected cells grouped closely together, the wrapper preferably is suitably impregnated and treated to effectively insulate adjacent cells in the battery pack. On the other hand, if the cells are to be used or marketed individually, the wrapper may take the form of a label bearing suitable identifying markings. In either case, the wrap paper preferably is coated with a thin layer of thermo-plastic or the like which, when heated, secures and seals the wrapper around the cell can.

Briefly, the operation of the cell wrap and unload mechanism is as follows: A group of six cell cans are moved by combine plate 846 into alignment with the cell wrap mechanism. Six paper strips, each having a width slightly greater than the circumference of the can, are fed in the shape of flat bands from supply rolls, over guide rolls on the top of the machine and down through tube forming devices which progressively and transversely bend and form each strip ultimately into the shape of a tube. The several tubular strips then are cut simultaneously into separate wrappers each having a length substantially equal to the height of a cell can, and each wrapper is carried down into a set of wrapping jaws into which a cell can to be wrapped is raised. The jaws close and press the tubular wrapper tightly around and into engagement with the side of the can, with the side edges of the wrapper overlapped. A heated bar disposed adjacent the wrapper then presses against the overlapped part of the wrapper, melting the thermo-sensitive coating on the overlapped edges and sealing and securing the wrapper around the can. The wrapped cans then are ejected outwardly from the combine table through the rear of the machine along a suitable conveyor platform.

The mechanism for forming tubular wrappers, for placing and securing them on the cell cans, and for ejecting the wrapped cans from rotatable combine plate 846 is shown in Figures 91–102 and comprises a cam housing 1315 supported adjacent the periphery of the combine plate 846 and containing the several cams for operating the components of the machine. A power takeoff shaft, not shown, which is driven by the drive mechanism associated with the cell combine table, is connected through bearing 1316 to cam drive shaft 1318 which extends longitudinally through the center of the cam housing and rotates the operating cams. In the following description the part or end of the can wrapping machine which is to the left in Figure 92 and which is adjacent to and faces the combine plate, is referred to as the front of the machine, and conversely, the rear of the machine is the end remote from the combine plate. Movements of the machine components in a direction toward and away from the combine plate are described as forward and rearward movements, respectively.

In order to support wrapper strip supply rolls, feed rolls and forming devices above the cam housing, an upright frame is mounted on and extends up from the top of the cam housing. This frame comprises a pair of laterally spaced frame members 1320 on opposite forward sides of the cam housing adjacent combine plate 846 and secured together by transverse brace 1321, and a single channel shaped strip roll support member 1323 at the rear and to one side of the cam housing. The front members 1320 are reinforced by rearwardly extending side plates 1324 secured to the top of the housing, and the rear member 1323 is interconnected with one of the front members by an upper longitudinal brace 1325 (see Figure 95) and by one of lower side plates 1324. Rear frame member 1323 preferably is channel shaped for rigidity and supports two horizontal arbors 1326 and 1327 (see Figures 94 and 95), one above the other, each arbor mounting three supply rolls indicated in broken lines at 1328 from which three continuous band-like strips 1329 of paper are fed to the wrapper forming devices on the front part of the machine. In order to facilitate replacement of rolls 1328 when the supply of paper has been depleted, one set of three rolls is press fitted on a spool 1330 (see Figure 94). This spool is rotatably mounted on the associated arbor and may be removed axially therefrom, to the right in Figure 94, for replacement of a roll when the spring-ball lock 1332, carried on the arbor and engageable with the inside of the sleeve, is released.

A pair of wrapper strip guide rolls 1334 and 1335 are journalled one above the other between the upper ends of front frame members 1320 (see Figures 91 and 95). Each roll engages three wrapper strips 1329 and directs them down over the front of the machine toward the cell cans. The wrapper strip preferably comprises relatively stiff paper and the strip is formed into a tube as it passes through several tube forming stages. That is, as each strip moves down from guide roll 1334 or 1335 to a final position around the cell can, the strip, which initially is a flat band (see Figure 101A), is progressively bent transversely of its direction of movement into a cylindrical tube having a vertical axis. This tube is cut to a suitable length and becomes the wrapper which fits around the can. The side edges of the tubular wrapper on the can are overlapped and accordingly the width of each wrapper strip is slightly larger than the circumference of the cell can.

Each strip, as it moves down from the guide roll, enters one of six upper forming tubes 1337 (see Figure 91) which are supported below the lower guide roll on a transverse bar 1338 extending between frame members 1320.

The six tubes 1337 preferably are vertically staggered on bar 1338, as shown. In order to prevent interference between adjacent strips that enter the tubes 1337, adjacent tubes are offset vertically from each other and the axes of adjacent tubes are offset horizontally. The uppermost set of tubes preferably are provided with upwardly extending preforming fingers 1340 which engage and initially slightly bow the three strips entering these tubes to facilitate the entry. The shape of the strip as it emerges from forming tube 1337 is shown in Figure 101B. The concavo-convex strips pass from tubes 1337 into a second set of forming devices comprising a transverse plate 1342 supported on front frame members 1320 and having six concavely shaped vertically extending channels 1343, the semi-cylindrical surfaces of which have radii smaller than the radii of the upper forming tubes. The strips 1329 pass through and engage the surfaces of these channels of plate 1342 and are curved to a greater degree as shown in Figure 101C.

Next, the strips engage the periphery of feed roll 1345 (see Figures 92 and 94) mounted below plate 1342 on a transverse axle 1346 journalled at its ends on front frame members 1320. Feed roll 1345 preferably comprises a tube having axially spaced integral annular ridges 1347 which engage the convex surfaces of the strips to positively feed a predetermined length of the strips down toward the cell cans once during each cycle of operation of the machine. To accomplish this, the feed roll is rotated in steps through a predetermined angle by a feed roll crank 1348 connected to the axle 1346 through a one-way slip clutch 1349 (see Figure 94); crank 1348 being oscillated vertically by mechanism described below and driving the roll on its upward movement while slipping relative to the axle on its downward movement. In order to facilitate positive feeding of the strips by feed roll 1345, a spring backed rubber rimmed backup roll 1350 (see Figure 93) is supported opposite each annular ridge 1347 and presses the associated strip into nonslip engagement with the feed roll flange. Preferably, the motion of feed roll 1345 is transmitted to both of the top guide rolls 1334 and 1335 by a chain 1351 (see Figures 91, 94 and 95) which passes around sprocket 1352 on the outboard end of feed roll axle 1346, and sprockets 1353 and 1354 on guide rolls 1334 and 1335, respectively. This eliminates drag of the paper during the feeding action.

Directly below the feed and backup rolls is another strip forming device comprising a concave back plate 1355 and a convex front block 1356 (see Figures 93 and 101D) for each strip; the back plate 1355 being supported on transverse member 1357, and front block 1356 on member 1358. The juxtaposed curved strip forming surfaces of plate 1355 and block 1356 are slightly spaced apart to define a transversely curved slot 1359 through which the strip passes as it is further bent into a closed tubular shape. A scallop shaped cutter blade 1361 is supported at the lower end of slot 1359 and is mounted on the front end of a longitudinally reciprocable generally rectangular carrier frame 1362 which is supported along its sides in guides 1363 (see Figure 94). When frame 1362 and blade 1361 are retracted to the right as viewed in Figure 93, the proper lengths of the six wrapper strips simultaneously are fed by feed roll 1345 from the bottom of forming slots 1359. Carrier frame 1362 then is moved to the left as viewed in Figure 93 and blade 1361 cuts each of the strips along the bottom surfaces of forming plate 1355 and block 1356 to form six separate wrappers simultaneously. Secured on top and near the forward end of each side of blade carrier frame 1362 is an upright tie plate 1364 formed with an elongated vertical slot 1365, the function and purpose of which is explained below.

Directly below cutter blade 1361 are final stationary forming dies 1366 comprising six inverted frusto-conical channels defined by surfaces 1367 which are U-shaped in cross-section and which are open at the rear of the die. The surface 1367 of each channel engages the front or open side of the wrapper, as the latter moves down, and wedges the side edges of the wrapper further together, until, as the wrapper passes from the bottom of die channel, its shape is substantially cylindrical and its side edges slightly spaced apart (see Figure 101E).

The actual closing of the tubular wrappers around the cell cans is accomplished by six sets of finger-like jaws 1368 (see Figures 96 and 98–100) mounted on the top front part of the cam housing and which extend forwardly therefrom over the cell cans in the combine table 846 and under wrapper forming dies 1366. As best shown in Figure 98, each set of jaws comprises two juxtaposed laterally spaced jaw elements 1368a and 1368b, each pivoted at laterally spaced points 1371 at their rear ends and normally urged together by laterally extending springs 1373 at their front ends. The inner surface of each jaw element proximate to pivot 1371 is formed with a shallow vertically extending open ended semi-cylindrical clamping face or recess 1374 having a radius generally corresponding to the radius of the cell can. The recesses 1374 of cooperating jaw elements of each set of jaws are opposed to each other and are concentric with the axis of the cell can that is located therebelow in rotatable combine plate 846. The front part of each jaw element has an upper lip 1375 which projects inwardly toward the opposite jaw element and which is formed with a concave bevelled recess 1376 to provide a means for opening or spreading and closing the jaws as explained below.

The height or vertical dimension of the jaw elements 1368 corresponds to or is slightly greater than the height of each cell can, and accordingly clamping recesses 1374 therein are adapted to press opposite portions of the periphery of a wrapper against the cell can over its full height during the final stage of the wrapping operation. The pivoted rear ends of the jaw elements are mounted on guide strips 1378 (see Figures 94, 96 and 98) which extend longitudinally and rearwardly over the top of the cam housing and which define six guide channels 1379 on a can receiving platform and along which the wrapped cells are moved or ejected from the combine table 846 as explained below. It will be noted the jaw elements 1368 diverge rearwardly and that the lateral spacing between rear edges of opposed clamp recesses 1374 is approximately equal to the diameter of a wrapped can. When the jaws are closed, the can is held in the clamp recesses, and when the jaws are opened, the wrapped cans are free to move from the clamp recesses through the rear of the jaws and along guide channels in the direction of the arrows in Figures 96 and 98 and away from cell combine plate 846. In order to induce offsetting of one edge of the cell wrapper from the opposite edge thereof to insure overlapping of these edges when the jaws press the wrapper around the cell can, a pin 1381 is provided in one of the jaw elements adjacent the forward end of arcuate recess 1374 and projects inwardly of the recess as shown in Figure 98.

In order to open and close the several sets 1368 of jaws, six spreader pins 1383 (see Figure 93) extend down from a vertically reciprocable transverse carrier bar 1384 in vertical alignment, respectively, with the spreader recesses 1376 of the several sets of jaws. Each pin 1383 is tapered at its lower end and when moved down by bar 1384 into recess 1376, causes the jaw elements to spread apart against the pressure of springs 1373 and thereby opening the rear recesses 1374 sufficiently to permit insertion of a cell wrapper and a cell can therein. The jaws close on the wrapper and can when pin 1383 is raised above the jaws.

After the wrapper has been pressed tightly around the periphery of each cell can by the jaw elements 1368, the overlapped wrapper edges, which are disposed between the spaced forward ends of opposed clamp recesses 1374, are heat sealed together. This heat sealing is accomplished by six heater bars 1386 which extend rearwardly from a horizontally reciprocable transverse carrier plate 1387 located forwardly of the jaws and which overlies the cell combine plate 846 (see Figures 92 and 96). Each heater bar 1386 is aligned with and extends between the front parts of the jaw elements of each set of jaws with the inner or rear end 1389 of the bar adjacent the front end of the clamp recesses 1374 of the associated jaws; the end 1389 of the bar preferably being curved to conform to the periphery of the cell wrapper as shown in Figure 98. A heating element 1390 within the rear end of each bar is electrically connected by terminals 1391 on carrier plate 1387 to a source of electric current intermittently heating the inner end of the bar. When the jaws clamp each wrapper about the cell can, each heater bar 1386 moves to the rear until bar end 1389 engages and presses against the overlapped edges of the wrapper. The bar dwells in this position as the wrapper edges are heat sealed together. Thereafter the jaws are opened and the heater bar continues to move to the rear through a long stroke and pushes the wrapped cell can out of the jaws and into guide channel 1379 toward the rear of the cam housing. The bar then returns to its starting position for another cycle of operation.

It has been noted above that after each wrapper strip is cut by blade 1361, the severed part which becomes the wrapper is located within the final forming die 1366 and above the jaws 1368. In order to move the severed wrapper down through die 1366 and into opposed clamp recesses 1374 of the jaw elements therebelow, there is provided a wrapper carrier device comprising a transverse vacuum manifold block 1392 (see Figures 93 and 94), above the front top portion of the cam housing, and six wrapper engaging fingers 1393 (see Figure 94) depending from the lower end of the manifold block in longitudinal alignment with the conical wrapper forming dies 1366, respectively. Block 1392 and fingers 1393 are movable as a unit in both vertical and longitudinal directions, and the front faces 1394 of the fingers are transversely arcuately shaped for engagement with the rear portion of the tubular wrapper. Vacuum apertures 1395 in each finger face 1394 communicate with a vertical vacuum channel 1396 in the body of the finger and which extends to a transverse vacuum channel 1399 in block 1392, which channel communicates by passage 1400 to a flexible hose 1401 (see Figures 93, 94 and 95). Vacuum in hose 1401 is controlled by a solenoid valve 1402 (see Figure 95) located on the rear of the cam housing and connected in series with hose 1401 and vacuum lines 1404 leading to a source of vacuum, not shown. Energization of the solenoid in valve 1402 is controlled by a switch 1407 (see Figure 95) supported on the front part of the machine and having a roller type switch arm 1408 engageable with the top of spreader pin carrier bar 1384. When bar 1384 moves down, arm 1408 turns on the switch which energizes the solenoid and opens the valve to connect hose 1401 to the vacuum source, and, conversely, when bar 1384 is raised to its upper limit, the vacuum is turned off.

Manifold block 1392 is supported above the top of the cam housing for horizontal movement on cutter blade carrier frame 1362 by opposite side pins, one of which is indicated at 1410 in Figure 93, which pins extend through the vertically elongated slots 1365 on vertical members 1364 secured to the cutter blade carrier frame 1362. The outer ends of pins 1410 connect to downwardly extending links 1411 (see Figures 91 and 95) pivotally connected to the upper ends, respectively, of vertical laterally spaced lift rods 1412 which move up and down to raise and lower manifold block 1392 relative to cutter blade carrier frame 1362. When the wrapper strip cutting blade 1361 is moved longitudinally, vacuum manifold block 1392 together with the six fingers 1393 thereon also move longitudinally by reason of engagement of block pins 1410 in slots 1365; links 1411 pivoting relative to lift rods 1412 to accommodate this movement. In other words, block 1392 and fingers 1393 are reciprocated vertically by rods 1412 and longitudinally by blade carrier frame 1362.

Initially, manifold block 1392 is in the upper and rear position, to the right as viewed in Figure 93, with fingers 1393 offset rearwardly from the vertical pass line of the wrapper strips. After wrapper strips of predetermined length have been fed into the conical forming dies 1366, cutter blade 1361 moves forward and cuts the six strips. Simultaneously manifold block 1392 and fingers 1393 move forward until the arcuate faces 1394 of the fingers engage the rear portions of the severed wrappers in dies 1366. When jaw spreader pin carrier bar 1384 moves down to open wrapper jaws 1368, vacuum to finger apertures 1395 is turned on by the action of vacuum control switch 1407 and the wrappers are held tightly against the fingers. Manifold block 1392 then moves down in response to downward movement of rods 1412 and fingers 1393 pull the wrappers down through dies 1366 and between clamping recesses 1374 of the jaw elements. Thereafter spreader pin carrier bar 1384 moves up and withdraws spreader pins 1383 from between the jaws which close around the respective wrappers and cell cans. The carrier bar 1384 continues moving to its upper limit at which time switch 1407 is engaged to turn off the vacuum. Next, cutter blade frame 1362 withdraws and manifold block lift rods 1412 move up to return the manifold block 1392 and fingers 1393 to the upper and rear position preparatory to starting another cycle of operation.

The final forming dies 1366, jaw element clamping recesses 1374, and the six cell cans in the combine plate 846 are vertically aligned and concentric with common vertical axes. Insertion of the bank of six cell cans into the open jaw recesses 1374 is accomplished by six vertically reciprocable cell lift pins 1414 which are adapted to move up through openings in a stationary can support track plate 1415 spaced below the marginal edge of combine plate 846 and over which the cans slide when the combine plate indexes to position the six cans to be wrapped in front of the wrapper machine. The tops of pins 1414 are flush with the top surface of track plate 1415 when the pins are in their lower position and the cans slide over and on the tops of the pins, respectively, when combine plate comes to rest. When jaws 1368 are opened and after the wrappers have been moved by manifold block fingers 1393 into the jaw clamp recesses 1374, pins 1414 are actuated to lift six cans simultaneously up and into the wrappers confined in the open jaws; the tops of the pins extending above the top of combine plate (see Figure 93) and in horizontal alignment with the bottom surfaces 1379a of rearwardly extending can guide channels 1379 when the pins are in their uppermost position. The cell lift pins remain in the raised position while the wrappers are secured around the cell cans and are lowered only after heater bars 1386 have moved the wrapped cans from the pins and rearwardly along guide channels 1379. In this manner, cell cans are removed from the combine plate and, after wrapping, are ejected from the machine. The combine plate then indexes and the empty can locater holes therein receive a set of cell cans from conveyor 36 which is adjacent the can wrapping machine.

The mechanism for operating the above described components of the cell wrap and unload machine comprises a plurality of cams mounted in cam housing 1315 and rotated by main drive shaft 1318. Cell lift pins 1414 are reciprocated vertically once during each cycle of operation of the machine by cell lift cam 1416 (see Figures 91 and 92) on drive shaft 1318 near the forward end of the cam housing. Cam 1416 raises and lowers transverse follower bar 1417 connected at its ends to vertically extending lift rods 1418 which mount at their upper ends a transverse plate 1420 from which the six lift pins 1414 extend upwardly.

The other operating cams are mounted on a transverse cam shaft 1422 journalled at its ends in bearings supported on the sides of the cam housing and driven by main drive shaft 1318 through a set of helical gears 1423. These cams are best shown in Figures 94 and 97 and comprise a paper feed cam 1425 which drives a follower bar 1426 pivoted at its rear end on pivot rod 1427 so that the opposite or front end of the follower bar moves up and down as the cam rotates. The front end of bar 1426 is connected by vertical link 1429 (see Figure 92) to a crank 1430 on transverse rock shaft 1432. The opposite end of shaft 1432, the right end as viewed in Figure 94, is connected by another crank 1433 (see Figure 95) to a forwardly and upwardly extending adjustable rod 1434, the upper end of which is operatively connected to feed roll crank 1348; the arm 1348a of crank 1348 normally extending to the rear and down from the feed roll axis. As rock shaft 1432 is rocked in a counterclockwise direction as viewed in Figure 95, crank arm 1348a is pushed up and drives feed roll 1345 by clutch 1349 through a predetermined angle in a clockwise direction (Figure 95), thus advancing or feeding the wrapper strip down. On the reverse or down stroke of crank arm 1348a, clutch 1349 slips relative to the feed roll which therefore remains stationary. The wrapper strips are thus fed down once during each cycle of operation of the machine.

Part of the actuating mechanism just described for the wrapper strip feeding roll is utilized to operate the heater bars 1336 for heat sealing the wrappers and for ejecting the wrapped cans out the rear of the machine.

Rock shaft 1432, midway between its ends, mounts an upwardly extending segment gear 1436 (see Figures 92, 94 and 95) which engages rack teeth formed on the bottom of the U-shaped transversely extending bracket 1439 (see Figure 94) secured at opposite ends to longitudinally extending heater bar shift rods 1440. These rods 1440 are supported in bearings on the top of the cam housing and extend forwardly of and on opposite sides of the several wrapper clamping jaws 1368 for engagement with the ends, respectively, of heater bar carrier plates 1387 (see Figure 95). The opposite or rear end of each rod 1440 is connected to an adjusting screw 1442 which facilitates fine adjustment of the position of the heater bars. Thus, it will be noted, rearward movement of heater bars 1386 and feeding of the wrapper strips occur simultaneously since the heater bars and paper feed roll are driven by the same cam.

Vertical movement of the vacuum manifold block 1392 is caused by cam 1444 (Figures 94 and 97) on transverse shaft 1422. Cam 1444 causes follower bar 1445 to rock up and down about rear pivot rod 1427 and thus to vertically reciprocate a transverse bar 1447 connected to the front end of the follower bar. The opposite ends of transverse bar 1447 are secured to the vertical block lift rods 1412, the upper ends of which are pivotally connected to the block engaging links 1411 (see Figure 91). Thus, rods 1412 move up and down in response to rotation of cam 1444, and vacuum manifold block 1392 is guided up and down in slots 1365 of members 1364.

Longitudinal movement of strip cutting blade 1361 and manifold block 1392 is caused by shear cam 1453, follower bar 1454 (see Figures 94 and 97), vertically extending link 1455 connected to the follower bar (see Figures 92 and 95), pinion shaft 1456 connected to the link by crank 1457, a pinion 1458 on shaft 1456, and rack 1459 engageable with the pinion and connected to the rear member of the cutting blade carrier frame 1362. Pinion 1458 is rocked about the axis of shaft 1456 in response to rotation of shear cam 1453 and imparts longitudinally reciprocable movement to blade carrier frame 1362 and the shear blade on the front end of the frame. As noted above, longitudinal movement of blade carrier frame 1362 also causes similar movement of vacuum manifold block 1392 because of engagement of block side pins 1410 in slots 1365 of upright members 1364 secured to the blade carrier frame.

Vertical reciprocation of jaw spreader pins 1383 for opening and closing the wrapper jaws 1368 is caused by jaw cam 1461 which pivots follower bar 1462 about rear pivot shaft 1427 for vertically reciprocating transverse bar 1464 connected to the front end of the follower bar. Opposite ends of transverse bar 1464 connect to vertical rods 1466 which extend upwardly through the top of the cam housing (see Figures 95 and 96) and engage the rearwardly extending ends of spreader pin carrier bar 1384. Spreader pins 1383 thus are reciprocated once during each revolution of the cam 1461 to open and close wrapper jaws 1368.

The chart shown in Figure 102 illustrates the sequence of operation of the several components of the cell wrapping and unloading machine just described. At the beginning of a cycle of operation of the machine, which is described hereinafter, a predetermined length of the six uncut wrapper strips have been advanced by feed roll 1345 into the final semi-conical forming dies 1366 below the plane of cutter blade 1361; the inner ends 1389 of heater bars 1386 are slightly forward of clamping recesses 1374 of jaws 1368; cutter blade 1361 is withdrawn rearwardly from the vertical pass line of the wrapper strips; vacuum manifold block 1392 and the wrapper transfer fingers 1393 are in the upper rear position; jaw spreader pins 1383 are raised and jaws 1368 are closed; vacuum control switch 1407 is off; and cell lift pins 1414 are down.

Combine plate 846 indexes and moves six unwrapped cell cans on top of cell lift pins 1414 and into vertical alignment with lower wrapper forming dies 1366. Simultaneously cutting blade carrier frame 1362 moves forward, the blade 1361 severs the wrapper strips and simultaneously vacuum manifold block 1392 moves forward until the faces 1394 of fingers 1393 engage the backs of the cut wrappers in dies 1366. Jaw spreader pin carrier bar 1384 then is moved down by rods 1466 and spreader pins 1383 enter between the respective jaw elements of the six wrapper jaws 1368 to open the jaws, and at the same time vacuum control switch 1407 is actuated by downward movement of carrier bar 1384 to turn on vacuum to wrapper transfer fingers 1393. The six wrappers are now held tightly on the faces 1394 of these fingers 1393. Next, block 1392 and fingers 1393 are moved down relative to the blade carrier frame by block lift rods 1412, and the fingers 1393 pull the wrapper down through forming dies 1366 and into the clamping recesses 1374 of the respective jaws 1368 which has been opened previously by spreader pins 1383. The wrappers are now in position in the jaws and ready to be closed and sealed around the cell cans.

Next, the cell lift pins 1414, on the tops of which the cell cans rest, are raised and lift the six cell cans above the top of combine plate 846 and into the wrappers within the open jaws 1368. Spreader pins 1383 move up, the jaws close, and the wrappers are closed and pressed tightly around outsides of the cans. When the spreader pins reach their upper limit, switch 1407 is actuated to cut off vacuum to the transfer fingers 1393. Thereupon manifold block 1392 and transfer fingers 1393 are raised by lift rods 1412 and at the same time are withdrawn rearwardly together with cutting blade 1361 by retraction of blade carrier frame 1362.

The heater bars 1386 then move rearwardly a slight amount to advance the heated ends 1389 of the bars into contact with the overlapped wrapper edges at the front of jaw clamping recesses 1374. The heater bars dwell while in contact with the wrapper edges in order to heat seal the edges, and during the dwell period, spreader pins 1383 move down and cause the wrapper jaws 1368 to open at approximately the end of the dwell period. The heater bars then move rearwardly through a long stroke to push the wrapped cans through cell guide channels 1379 along the top of the cam housing and away from the combine plate to complete the cell unloading function of the machine. Simultaneously, wrapper strips are fed down below the retracted cutter blade by feed roll 1345. Cell lift pins 1414 are lowered, heater bars are moved forwardly to the starting position, jaw spreader pins 1383 move up, and the machine is ready to begin another cycle of operation.

V. SUMMARY

From the foregoing description of a preferred form of cell making apparatus embodying my invention, it will be evident that the apparatus is capable of producing cells at a high rate of production and that the entire assembly operation requires no manual operations; attendants are required only to supply the cell components to the apparatus and to observe the operation of the apparatus and correct any malfunctioning that may occur. The high rate of production is attained with a small number of operating personnel as compared to the number that would be required for similar production using previous semi-automatic methods. In addition to economy of operation, the apparatus produces important benefits by way of improved quality of product. The improvement in quality results not only from the fact that the various assembly operations are carried out automatically and, hence, uniformly, by the apparatus without direct intervention by the operators also, and perhaps more importantly, from the fact that the elapsed time required for the assembly of a cell, beginning with the movement of an empty cell can to the lining machine and ending with a completed and wrapped cell, is very short and is uniform; in practice the time is approximately 12 minutes. With other methods and apparatus the elapsed time was much greater and was not uniform; more or less evaporation of moisture took place between the time when the electrolyte and the mix were introduced into the cans and the cans were sealed up. In the present apparatus, the time that elapses between the loading of the can with the depolarizer mix and the sealing of the can is so short that the problem of drying of the cells that was encountered in previous methods of assembly is substantially eliminated. Cells of uniformly high quality are produced even under changing atmospheric conditions.

An important factor in the attainment of a high rate of production in a comparatively small space is the arrangement of the apparatus wherein a plurality of cells are operated on simultaneously at each station and the cells are conveyed in parallel paths or in groups between the several stations. While the entire cell making apparatus normally is operated as a unit for continuous and progressive assembly of the cells, the can feed and liner forming apparatus (stations 1 and 2), the cell loading apparatus (stations 3, 4, and 5), and the cell combine (stations 6 to 13 inclusive) are provided with separate controls so that each of the three groups of stations can be operated independently of the others. The independent controls together with the variable capacity of the linear conveyors give flexibility of operation which is desirable and advantageous. For example, in the event of a temporary shutdown of one of the groups of stations, the other groups may be operated without interruption until the cause of the shutdown has been remedied. When the cause of the shutdown has been remedied, the group that has been shut down may be operated at a higher speed until balance of production is again attained. Also, when a production run is being concluded, the can feed and liner forming apparatus can be stopped as soon as the last cell of the run has been lined. The cell loading apparatus is continued in operation until the last cell has passed through it and finally, the cell combine is shut down when the production run is concluded. The reverse operation takes place when a run is started.

Those skilled in the art will appreciate that various changes and modifications can be made in the invention without departing from the spirit and scope thereof. The essential features of the invention are defined in the appended claims.

I claim:
1. Apparatus for sequentially assembling dry cells comprising a plurality of mechanisms constituting cell assembly stations arranged in series, each station having means for operating simultaneously on a plurality of cells in a group, means for automatically transferring said cells successively and in steps from station to station comprising at least two revoluble tables, certain of said stations being mounted adjacent and spaced around the periphery of one table and others being similarly arranged around the other table, means for mounting said cells in groups at one location on the periphery of each of said tables, means for discharging said cells in groups from each table at a location angularly disposed from said mounting location, independent drive means for rotating each of said tables in steps through predetermined displacement angles, said drive means for each table also driving said assembly mechanisms associated with the table, and conveyor means for transferring cells in parallel paths equal in number to the number of cells in a group from the cell discharge location of said one table to the cell mounting location on the other table.

2. Apparatus for sequentially assembling dry cells comprising a plurality of mechanisms constituting cell assembly stations arranged in series, each station having means for operating simultaneously on a plurality of cells in a group, means for automatically transferring said cells successively and in steps from station to station comprising first and second revoluble tables and cell conveyor means interconnecting said tables, certain of said stations being spaced around the periphery of said first table and certain others of said stations being similarly arranged around said second table, independent indexing means for successively rotating each of said tables in steps, means for mounting cells in groups on the periphery of each table ahead of the first station therewith and prior to indexing of the table, means for discharging cells in groups from the periphery of each table following the last station associated therewith and prior to indexing the table, said conveying means receiving cells discharged from said first table and delivering cells to said second table and comprising a platform adjacent said first table, belt means extending between said platform and said second table and guides providing a number of parallel paths equal to the number of cells in a group, means to drive said cell discharging means on said first table between successive indexing movements of the table to deliver said cells to said platform in steps, and means to drive said belt means continuously to move cells from said platform to said second table.

3. Apparatus for continuously assembling dry cells comprising means for inserting liners into a cell can, means for transferring the lined can to a first revoluble table, means for mounting said can adjacent the periphery of said table and simultaneously inserting a disc into and against the bottom of said can, means for indexing said table, to position said can successively at assembly stations spaced around the periphery of said first table, said assembly stations comprising, in order, means for inserting a charge of cell mix into said can, and means for inserting a washer on top of the mix in said can, means for detaching said can from said table and transferring said can to a second revoluble table, means mounting said can on the periphery of said second table, means for successively indexing said second table to position said can at assembly stations spaced around the periphery of said second table, said stations comprising in succession means for inserting a carbon electrode through said washer and said mix and against said disc in the bottom of the can, means for folding the top end of said liner inwardly from the side of the can, means for placing a top washer over said carbon electrode and against the folded part of the liner and compressing the mix in the can, and means for inserting a seal over the carbon electrode and into the top of the can and crimping the can tightly around said seal.

4. Apparatus for continuously assembling dry cells comprising means for orienting a plurality of empty cell cans into groups each having several cans, means for inserting liners simultaneously into the cans in each group, a conveyor for transferring groups of lined cans to a first revoluble table, means for transferring the groups of cans to said first table and simultaneously inserting discs into and against the bottoms of said cans, means for indexing said table to position said groups successively at assembly stations spaced around the periphery of said first table said assembly stations comprising means for inserting charges of mix into said cans, and means for inserting washers on top of the mix in said cans, means for transferring said groups of cans from said first table to a second conveyor leading to a second revoluble table, means for transferring said groups of cans to said second table, means for indexing said second table to position said group of cans successively as to assembly stations spaced around the periphery of said second conveying means, said stations comprising in succession means for inserting carbon electrodes through said washers and said mix and against said discs in the bottoms of the cans of the group, means for folding the top ends of said liners inwardly from the sides of the cans, means for placing top washers over said carbon electrodes and against the folded parts of the liners and compressing the mix in the cans, and means for inserting seals over the carbon electrodes and into the tops of the cans and crimping the cans tightly around said seals.

5. Apparatus for assembly of dry cells each having a cell can open at one end, including mechanism for measuring and inserting simultaneously a plurality of charges of cell mix into a corresponding number of cans, comprising a cylinder containing a supply of cell mix, a feed piston in said cylinder, means for advancing said piston longitudinally of said cylinder, an extrusion head on one end of said cylinder, said head having a plurality of horizontal openings through which mix from said cylinder passes, a charging head on said extrusion head, said charging head having separate cavities corresponding to the number of and being aligned respectively with said extrusion openings, a gate extending transversely of said extrusion openings, means to actuate said gate alternately to open and to close said extrusion openings whereby said charging head cavities are filled successively with mix, a reciprocable plunger positioned above each cavity, said charging head having a discharge opening below each cavity, means for locating said plurality of cell cans below said discharge openings respectively, a valve in said discharge openings, means to actuate said valve to open and to close said discharge openings, means to synchronize said gate actuating means and said valve actuating means whereby neither said gate nor said valve is open when the other is open, and means to reciprocate said plungers to move vertically through said cavities when said gate is closed and said valve is open to eject said charges of mix from said cavities through said discharge openings and into said cell cans.

6. Apparatus for forming and measuring a bobbin of paste-like cell mix and for inserting said bobbin into a cell can which is open at one end, comprising a container holding a supply of cell mix, a piston in said container, means for continuously advancing said piston toward one end of said container and compressing said mix therein, said one end of said container having a set of transversely spaced outlet ports, a charging head mounted on said end of the container, said head having a set of separate cavities communicating with said outlet ports, respectively, a gate having a plurality of transversely spaced openings and extending between said end of said container and said charging head, means to reciprocate said gate transversely of said outlet ports to move said gate openings alternately into and out of alignment with said outlet ports for opening and closing the passages between said container and said cavities, said head having a set of discharge ports aligned respectively with said cavities, valve means for opening and closing said discharge ports, and plunger means for ejecting mix from said cavities through said discharge ports when said valve means are open and said gate is closed, and means for actuating said valve means in synchronism with said gate reciprocating means to open one of said sets of ports only when the other set of ports is closed, said gate reciprocating means comprising a linkage connected to said gate, a rotatable cam operatively connected to said linkage, and means to rotate said cam for reciprocating said linkage, said linkage including a cylinder and a piston member movable relative to said cylinder, said piston member normally being hydraulically locked at one limit of its movement relative to said cylinder, and hydraulic means responsive to stopping of said cam rotating means for energizing said cylinder to move said piston to the other limit of movement and thereby always close said gate.

7. Apparatus for successively filling cell cans with cell mix comprising a charging head, means for continuously supplying mix under pressure to said charging head, gate means for alternately permitting and blocking the flow of mix into said head, valve means for alternately permitting and blocking discharge of mix from said head, power means for operating said gate means and said valve means, and a linkage between said power means and said gate means for actuating said gate means, said linkage comprising a hydraulic motor having a normally fixed piston member adapted to change position in the linkage to vary the effective length of said linkage and to thereby actuate said gate means always to block the flow of mix to said head, and means responsive to de-energization of said power means to operate said hydraulic motor whereby said gate means is moved to block said flow of mix when said power means is de-energized.

8. Automatic apparatus for assembling dry cells each having a cell can open at one end, comprising, means for orienting said cans in successive groups, each group comprising a plurality of cans, means for forming liners and for inserting said liners into said cans, means for cutting discs from a strip of disc material and for inserting a disc into the bottom of each of the lined cans, means for measuring and inserting a predetermined quantity of mix into each can, and means for forming perforate mix washers from a strip of mix washer material and for placing one of said washers on top of the mix in each can, said washer forming and placing means comprising a stationary annular die having a central opening, means for guiding said strip of mix washer material across said die, punch means aligned with said opening, means to reciprocate said punch means through said strip of mix washer material and said opening to cut an imperforate washer from said strip, sleeve means aligned with said die opening and disposed on the side of said die opposite from said punch means, means to vertically reciprocate said sleeve whereby the end of the sleeve enters said die opening when said washer is cut by said punch means, a vertically stationary punch rod within said sleeve, said punch rod piercing the center of said washer on the return stroke of said sleeve means, means to reciprocate said sleeve and said punch rod transversely of said strip whereby said washer is carried beyond said die and into alignment with a cell can, said first named sleeve reciprocating means actuating said sleeve to deposit said washer within said cell can.

9. Apparatus for assembling dry cells sequentially comprising a revoluble table and a plurality of cell assembly stations located at fixed positions around the periphery of said table, said table having a plurality of vertical cell receiving holes adjacent the periphery of the table, track means below said holes for supporting said cells in the said holes, means for inserting said cells into said holes at one location, means for indexing said table to move said cells in one direction to and from said stations, and means for removing several cells simultaneously from said table at another location comprising a block below said table and having an upper surface lying in the plane of said cell supporting track means, means to reciprocate said block radially of said table between positions directly under and offset inwardly from said holes in the table, and platform means spaced below the table and under said holes by a distance greater than the height of the cells and over which said block is adapted to move, said block reciprocating means being synchronized with said table indexing means whereby said block is reciprocated between indexing movements of said table to permit cell cans resting on said block surface to drop by gravity from said table holes to said platform means and thereafter to be pushed from under the table along said platform means on return movement of said block.

10. In apparatus of the type described, a table rotatable about a vertical axis and having a plurality of vertical cell locating holes adjacent the periphery thereof, track means below said holes for supporting said cells in the said holes, means for indexing said table, and means for removing cells from said table comprising a cell support element below said table and adjacent said track means, means to reciprocate said element between positions directly under and offset inwardly from said holes, and stationary support means spaced below the table and under said holes by a distance greater than the height of the cells, said element reciprocating means being synchronized with said table indexing means whereby said element is reciprocated between indexing movements of said table.

11. Apparatus for assembling dry cells each having a can comprising mechanism for successively inserting said carbon electrodes into a series of said cans, said mechanism comprising a hopper adapted to containing a supply of said electrodes, a magazine supported for limited rotation between horizontal and vertical positions, reciprocable electrode feed means below said hopper for feeding an electrode from hopper toward said magazine and in a direction extending transversely of said axis, means for supporting a cell can adjacent said magazine, said magazine having an electrode receiving recess, ejector means in said magazine for ejecting an electrode from said recess, and ejector actuating means above said magazine for actuating said ejector means to discharge an electrode into a cell can when said magazine is in the vertical position.

12. Apparatus according to claim 11 in which said magazine has a vacuum channel communicating with said recess, and a source of vacuum connected to said channel for holding said electrode in said recess when the magazine is rotated to the vertical position.

13. Apparatus according to claim 11 in which said magazine has an annular external seat formed concentrically of said recess, and lift means for lifting said cell can to engage the open end of the can against said seat and thereby to locate said can concentrically of said electrode in the magazine recess.

14. Apparatus for assembling dry cells each having a can, and carbon electrodes adapted to be disposed coaxially of and within said cans, respectively, comprising mechanism for inserting a plurality of said electrodes simultaneously into as many cans, said mechanism comprising a vertical hopper adapted to contain a supply of said electrodes, a plurality of laterally spaced guide slots at the lower end of the hopper, said slots being adapted to arrange said electrodes into vertical rows with the axes of the electrodes horizontal, means to vibrate the lower part of the hopper to feed said electrodes through said slots, a horizontal pocket below each slot to receive electrodes one at a time, a magazine supported for limited rotation about a transverse axis between horizontal and vertical positions, means for supporting said cell cans in laterally spaced relation to each other and in vertical alignment with said axis, a feed bar aligned with each of said pockets, means to reciprocate said bars through said pockets and toward said magazine whereby simultaneously to feed a plurality of electrodes to the magazine, said magazine having a plurality of laterally spaced electrode receiving recesses, the axes of said recesses lying in a plane through said axis and being axially aligned respectively with said feed rods when the magazine is in the horizontal position, a plurality of reciprocable ejectors in said magazine and aligned respectively with said recesses for ejecting said electrodes from said recesses, and ejector actuating means above said magazine for moving said ejectors through said recesses when said magazine is in the vertical position to eject simultaneously the electrodes from the magazine and into the respective cell cans therebelow.

15. Apparatus for assembling dry cells each having a can open at one end, comprising, means for orienting said cans in successive groups, each group comprising a plurality of cans, a means for forming liners from strips of material and for inserting said liners into said cans, means for inserting a disc into the bottom of each of the lined cans, means for measuring and inserting a predetermined quantity of said mix into each can, means for forming perforate mix washers and for placing one of said washers on top of the mix in each can, means for inserting a carbon electrode into the mix in each can, means for folding the end of said liner adjacent the open end of each can inwardly from the side of the can, and means for forming top perforate washers and for inserting one of said top washers into each can with the carbon extending through the perforation and the washer disposed against the folded top end of said liner comprising a die having a central opening with a diameter approximately equal to the inside diameter of said can, means for supporting a strip of flexible material under said die, a punch under said strip, means to reciprocate said punch vertically through said strip and said die opening to cut an imperforate top washer, a vertically reciprocable sleeve over said die in alignment with said die opening, means to reciprocate said sleeve vertically and in synchronism with said punch whereby to engage the opposite side of said washer and to carry same upwardly with said punch, a vertically stationary punch rod with said sleeve for punching a center hole in said top washer during the final increment of upward movement of said sleeve, means to shift said sleeve laterally of and offset from said die and into vertical alignment with said cell can, said sleeve reciprocating means actuating said sleeve to insert said top washer over said electrode and against said folded liner end within said can.

16. In an apparatus for assembling dry cells each having a can open at the top end, a liner in said can, a charge of cell mix within said liner with the top of the mix spaced inwardly from said top end of the can, an electrode disposed in said mix and projecting through said washer, the portion of the liner above said mix having been folding inwardly from the side of the can, means for forming a top perforate washer and for inserting said top washer into said can with said carbon extending through the perforation and the washer disposed against the folded top end of said liner comprising stationary die means, means to support said can with the open end up and adjacent to the side of said die means, means for supporting a strip of washer material under said die means, a punch under said strip and vertically aligned with said die means, means to reciprocate said punch vertically through said strip and said die means to cut an imperforate top washer, a vertically reciprocable sleeve over and vertically aligned with said die means, means to reciprocate said sleeve vertically and in synchronism with said punch whereby to engage the upper side of said washer and to carry same upwardly with said punch, punch rod means within said sleeve for punching a center hole in said top washer during the final increment of upward movement of said sleeve, and means to shift said sleeve laterally of and offset from said die and into vertical alignment with said cell can, said sleeve reciprocating means actuating said sleeve to insert said top washer over said electrode and against said folded liner end within said can, the length of the washer inserting stroke of said sleeve being sufficient to cause said sleeve to tightly compress said mix within said liner and against said electrode.

17. Apparatus for assembling dry cells each embodying a can open at one end, comprising means for supporting said can with its open end up, a mechanism for inserting a seal into the open end of said can and for crimping said can around said seal, said mechanism comprising a vertically reciprocable pickup tube above and in vertical alignment with said cans, means to reciprocate said tube through alternate short and long strokes, a plate having a seal cavity on its upper surface and having a crimping roller on its lower surface, seal supply means over said plate and laterally offset from said tube, means to reciprocate said plate to position said cavity alternately under said seal supply means and under said tube, means for actuating said seal supply means to discharge a seal into said cavity when said plate is disposed to position said cavity under said seal supply means, means for reciprocating said pickup tube through a short stroke to pick up a seal from said cavity when said plate is disposed to position said cavity under said tube, rotatable collet means vertically aligned with said tube and located under said can support means, means to actuate said collet means to grip and rotate said can about its axis, means for reciprocating said tube through a long stroke when said plate is disposed to position said cavity under said seal supply means and away from said tube whereby to insert a seal into the open end of said can, said crimping roller engaging and crimping the upper side of said can around said seal when said plate is again moved to position said cavity under said tube.

18. Apparatus for assembling dry cells each embodying a can open at one end, comprising means for supporting said can with its open end up, a mechanism for inserting a seal into the open end of the can comprising a vertically reciprocable pickup tube above and in vertical alignment with said cans, vacuum means communicating with said tube, means to reciprocate said tube vertically through alternate short and long strokes, a plate supported for reciprocable movement in a plane spaced below said tube, means to reciprocate said plate into and out of vertical alignment with said tube, seal supply means over said plate and laterally offset from said tube, said plate transferring a seal from said supply means to said tube on each reciprocation of said plate, means for reciprocating said pickup tube being through to engage a seal and to withdraw said seal from said plate, and means to reciprocate said tube through a long stroke when said plate is offset from the tube whereby to insert a seal into the open end of said can.

19. Apparatus according to claim 18 with sleeve means projecting below the lower end of and reciprocable with said tube, and an annular seat in the lower end of said sleeve means, the top of said can being engageable in said seat at the end of the long stroke of said tube whereby to locate said can concentrically of said tube and the seal thereon.

20. Apparatus for assembling dry cells each having a can open at one end, means for supporting said can with its open end up, means for inserting a seal into said open end of the can, and a mechanism for crimping said can around said seal, said mechanism comprising a plate, a crimping roller rotatably mounted on said plate, means to support said plate for lateral movement relative to said can with said roller at the level of the upper end of the can, means to reciprocate said plate to and from said can, rotatable collet means vertically aligned with said can and located under said can support means, means to rotate said collet means, and means to actuate said collet means to grip and rotate said can about its axis, said roller engaging and crimping the upper side of said can around said seal when said plate is moved toward said can.

21. Apparatus according to claim 20 with a pair of backup rolls supported on the side of said can opposite from and on a level with said crimping roller whereby to rollingly engage the upper end of said can.

22. Apparatus for assembling dry cells each having a can open at one end, can support means for supporting said cans with their open ends up, a mechanism for inserting a plurality of seals simultaneously into the open ends of as many cans and for crimping said cans around the inserted seals, said mechanism comprising a vertically reciprocable head supported above said cans, a plurality of laterally spaced tubes carried on said head and in vertical alignment with said cans, means to reciprocate said head vertically through alternate short and long strokes, a plate supported for lateral movement relative to said head and in a plane between the lower ends of said tubes and the upper ends of said cans, said plate having a plurality of laterally spaced seal cavities on the upper surface and having a plurality of crimping rollers rotatably supported thereon, said rollers being laterally aligned with the upper ends of said cans, seal supply means over said plate and laterally offset from said tube, means to horizontally reciprocate said plate to position said cavities alternately under said seal supply means and under said ends of the tubes, means to discharge simultaneously one seal at a time into each of said cavities when said plate is positioned under said seal supply means, said head being reciprocated through a short stroke to cause said tubes to engage the seals in said cavities when the plate is at its other limit of movement, a source of vacuum communicating with said tubes for holding said seals against said tubes, rotatable collet means vertically aligned with said tubes and located under said can support means, means to actuate said collet means for simultaneously gripping and rotating said cans about their respective axes, said head being reciprocated through a long stroke to move said tubes to insert said seals into the open ends of the cans, said crimping rollers engaging and crimping the upper sides of said cans around said seals after said seals have been inserted.

23. Apparatus for assembling dry cells each having a carbon electrode projecting from one end of said cell, comprising cell support means for holding said cell with the projecting end of said electrode facing up, and mechanism for placing a terminal cap over the end of said electrode comprising a magazine supported for limited rotation about an axis above said cell, a cap receiving cavity in said magazine, cap supply means for successively feeding caps adjacent said magazine, means for rotating said magazine between limits at which said cavity is respectively aligned with said supply means and with the electrode of said cell, means to feed one cap at a time from said supply means into said cavity, vacuum means for releasably retaining said cap within said cavity and means to eject the cap from said cavity and over said electrode.

24. Apparatus for assembling dry cells each having an electrode projecting from one end of said cell, comprising cell support means for holding said cell with the projecting electrode facing up, and mechanism for placing a terminal cap over the end of said electrode comprising a magazine supported for limited rotation about an axis and above said cell, a cap receiving cavity in the exterior of said magazine, a hopper containing a supply of caps, track means for successively feeding caps from said hopper to a location adjacent the exterior of said magazine, means for rotating said magazine between limits at which said cavity is respectively aligned with said supply means and with the electrode of said cell, means to feed one cap at a time from said location into said cavity, a plunger in said magazine and aligned with said cavity, and plunger actuating means above said magazine for reciprocating said plunger through said cavity whereby to eject the cap from said cavity and over said electrode.

25. Apparatus according to claim 24 in which said cell support means comprises a lift rod, said cell resting on top of said rod, and means to vertically reciprocate said rod for positioning the upper end of said electrode against said magazine to receive said cap from said cavity.

26. Apparatus for continuously assembling dry cells comprising means for orienting a plurality of empty cell cans into groups each having several cans, means for inserting single thickness paper liners simultaneously into the cans in each group, a conveyor for transferring the group of lined cans to a first revoluble table around the periphery of which certain cell assembly stations are located, means for transferring said group of cans to said table, means for inserting and compressing moist electrolyte-impregnated mix into said lined cans while they are mounted on said first table, means for slowly transferring said group of cans from said conveying means to a second revoluble table to permit the moisture and electrolyte in the mix to wet the liners of the cans while the cans are being transferred, means for transferring said group of cans from said conveyor to said second table, means for indexing said second table to move said group of cans to assembly stations spaced around the periphery of said second conveying means, means for inserting carbon electrodes into said mix while said cans are mounted on said second conveyor, and means for inserting a seal into the top of each can and for crimping the top edge of each can around the seal therein while the cans are mounted on the second conveyor.

References Cited in the file of this patent

UNITED STATES PATENTS

| | | | |
|---|---|---|---|
| 407,943 | Nichols | July 30, | 1889 |
| 987,876 | Harmon | Mar. 28, | 1911 |
| 1,130,630 | Remington | Mar. 2, | 1915 |
| 1,210,577 | Williams | Jan. 2, | 1917 |
| 1,309,122 | Escobales | July 8, | 1919 |
| 1,365,415 | Lawrence | Jan. 11, | 1921 |
| 1,385,783 | Gillette | July 26, | 1921 |
| 1,669,054 | Hodge | May 8, | 1928 |
| 1,899,114 | Schmidt | Feb. 28, | 1933 |
| 1,910,687 | Freeburg | May 23, | 1933 |
| 2,024,597 | Pfeiffer | Dec. 17, | 1935 |
| 2,026,780 | Frostad | Jan. 7, | 1936 |
| 2,115,799 | Brandet | May 3, | 1938 |
| 2,465,390 | Mueller | Mar. 29, | 1949 |
| 2,589,583 | Thompson | Mar. 18, | 1952 |
| 2,684,423 | Hepple | July 20, | 1954 |
| 2,695,484 | Wilmer | Nov. 30, | 1954 |